United States Patent
Olason

(10) Patent No.: US 12,338,886 B2
(45) Date of Patent: *Jun. 24, 2025

(54) CONTINUOUSLY VARIABLE TRANSMISSION FOR RECREATIONAL VEHICLES AND RELATED COMPONENTS

(71) Applicant: Arctic Cat Inc., Thief River Falls, MN (US)

(72) Inventor: Kyle Douglas Olason, Thief River Falls, MN (US)

(73) Assignee: Arctic Cat Inc., Thief River Falls, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/195,163

(22) Filed: May 9, 2023

(65) Prior Publication Data

US 2023/0279937 A1    Sep. 7, 2023

Related U.S. Application Data

(63) Continuation of application No. 16/893,752, filed on Jun. 5, 2020, now Pat. No. 11,680,635.

(Continued)

(51) Int. Cl.
*F16H 55/56* (2006.01)
*B62M 27/02* (2006.01)
*F16H 63/06* (2006.01)

(52) U.S. Cl.
CPC ......... *F16H 55/563* (2013.01); *F16H 63/067* (2013.01); *B62M 27/02* (2013.01)

(58) Field of Classification Search
CPC ......... F16H 55/563; F16H 55/56; F16H 55/52

(Continued)

(56) References Cited

U.S. PATENT DOCUMENTS 3,733,918 A * 5/1973 Domaas ................ F16H 55/563
                                                        474/14
3,759,111 A * 9/1973 Hoff ...................... F16H 55/563
                                                        474/14

(Continued)

OTHER PUBLICATIONS

Office Action mailed on Oct. 11, 2023 for U.S. Pat. No. 3,082,688, 7 pages.

(Continued)

*Primary Examiner* — Henry Y Liu
(74) *Attorney, Agent, or Firm* — Billion & Armitage

(57) ABSTRACT

Embodiments of the present disclosure describe a drive pulley for a continuously variable transmission including a stationary sheave with a stationary shaft, a movable sheave axially movable relative to the stationary sheave and in contact with the stationary shaft; a spider in contact with at least the moveable sheave and stationary shaft; a spring member, biasing the movable sheave axially away from the stationary sheave; at least one centrifugal actuator including an arm pivotally connected to one of the movable sheave and the spider, the arm pivoting away from the one of the movable sheave and the spider as a speed of rotation of the drive pulley increases, the arm pushing against another one of the movable sheave and the spider as the arm pivots away from the one of the movable sheave and the spider, thereby moving the movable sheave axially toward the stationary sheave, the at least one centrifugal actuator being disposed radially outward of the stationary sheave shaft; and a torque transfer assembly operatively connected to at least one of the spider and the movable sheave, the torque transfer assembly transferring torque between the spider and the movable sheave, the torque transfer assembly including, a torque bearing assembly and at least one roller assembly, positioned on a helixed torque pin, the torque pin connected to the spider; wherein as the roller assembly wears, the at least one (Continued)

roller assembly tracks along a helixed path of the torque pin in a distal direction from the bearing assembly.

15 Claims, 93 Drawing Sheets

Related U.S. Application Data

(60) Provisional application No. 62/981,090, filed on Feb. 25, 2020.

(58) Field of Classification Search
USPC .......................................................... 474/14
See application file for complete search history.

(56) References Cited

U.S. PATENT DOCUMENTS

| | | | | |
|---|---|---|---|---|
| 3,777,584 A * | 12/1973 | Domaas | ............ | F16H 61/66245 474/14 |
| 3,939,720 A * | 2/1976 | Aaen | ............ | F16H 55/563 474/46 |
| 3,961,539 A * | 6/1976 | Tremblay | ............ | F16H 55/563 474/46 |
| 4,464,144 A * | 8/1984 | Kobayashi | ............ | F16H 55/563 474/43 |
| 4,483,686 A * | 11/1984 | Kobayashi | ............ | F16H 55/563 474/93 |
| 4,575,363 A * | 3/1986 | Burgess | ............ | F16H 55/563 474/14 |
| 5,209,703 A * | 5/1993 | Mastine | ............ | F16H 55/563 474/70 |
| 5,326,330 A * | 7/1994 | Bostelmann | ............ | F16H 55/563 474/14 |
| 5,421,784 A * | 6/1995 | Robert | ............ | F16H 55/563 474/13 |
| 5,529,544 A * | 6/1996 | Berto | ............ | F16H 61/66245 474/11 |
| 5,597,060 A * | 1/1997 | Huddleston | ............ | F16H 55/563 474/14 |
| 5,647,810 A * | 7/1997 | Huddleston | ............ | F16H 55/563 384/126 |
| 6,120,399 A * | 9/2000 | Okeson | ............ | F16H 55/56 474/14 |
| 6,309,317 B1 * | 10/2001 | Joss | ............ | F16D 43/06 474/14 |
| 6,334,826 B1 * | 1/2002 | Takagi | ............ | F16H 55/563 474/14 |
| 6,569,043 B2 * | 5/2003 | Younggren | ............ | F16H 55/56 474/19 |
| 6,743,129 B1 * | 6/2004 | Younggren | ............ | F16H 55/56 474/19 |
| 6,955,622 B2 * | 10/2005 | Bachmair | ............ | F01L 1/46 474/140 |
| 7,726,927 B2 * | 6/2010 | Cook | ............ | F16B 35/005 411/398 |
| 8,496,551 B2 * | 7/2013 | Mueller | ............ | F16H 7/02 474/17 |
| 8,668,623 B2 * | 3/2014 | Vuksa | ............ | F16H 63/067 477/80 |
| 9,500,264 B2 * | 11/2016 | Aitcin | ............ | F16H 9/14 |
| 10,066,729 B2 * | 9/2018 | Aitcin | ............ | B62M 27/02 |
| 10,174,827 B2 * | 1/2019 | Eck | ............ | F16C 21/005 |
| 10,767,745 B2 * | 9/2020 | Zauner | ............ | F16H 55/563 |
| 11,306,809 B2 * | 4/2022 | Aitcin | ............ | B62M 27/02 |
| 11,339,866 B2 * | 5/2022 | Eck | ............ | F16H 29/12 |
| 2002/0123400 A1 * | 9/2002 | Younggren | ............ | F16H 63/067 474/14 |
| 2004/0214668 A1 * | 10/2004 | Takano | ............ | F16H 55/563 474/14 |
| 2009/0227404 A1 * | 9/2009 | Beyer | ............ | F16H 55/563 474/14 |
| 2010/0069186 A1 * | 3/2010 | Conneely | ............ | F16H 7/24 474/130 |
| 2013/0157794 A1 * | 6/2013 | Stegelmann | ............ | F16H 63/067 474/8 |
| 2013/0288833 A1 | 10/2013 | Mueller et al. | | |
| 2013/0294856 A1 | 11/2013 | Mueller et al. | | |
| 2014/0235382 A1 * | 8/2014 | Tsukamoto | ............ | F16H 63/067 474/14 |
| 2016/0069434 A1 * | 3/2016 | Aitcin | ............ | B62M 9/08 180/54.1 |
| 2016/0160989 A1 * | 6/2016 | Millard | ............ | F16H 55/563 474/14 |
| 2017/0030454 A1 * | 2/2017 | Aitcin | ............ | F16H 55/36 |
| 2018/0037212 A1 * | 2/2018 | Beyer | ............ | F16H 63/067 |
| 2018/0080554 A1 * | 3/2018 | Simpson | ............ | F16H 55/566 |
| 2018/0202533 A1 * | 7/2018 | Zauner | ............ | F16H 9/18 |
| 2018/0363748 A1 * | 12/2018 | Okeson | ............ | F16H 61/66245 |
| 2019/0063582 A1 * | 2/2019 | Aitcin | ............ | B62M 27/02 |
| 2020/0166115 A1 * | 5/2020 | Aitcin | ............ | F16H 9/18 |

OTHER PUBLICATIONS

Aaen, "High-horsepower Sleds Squeeze Tranny Technology Again", Feeling Pressure/American Snowmobiler Magazine, Mar. 16, 2007, 1-5.

* cited by examiner

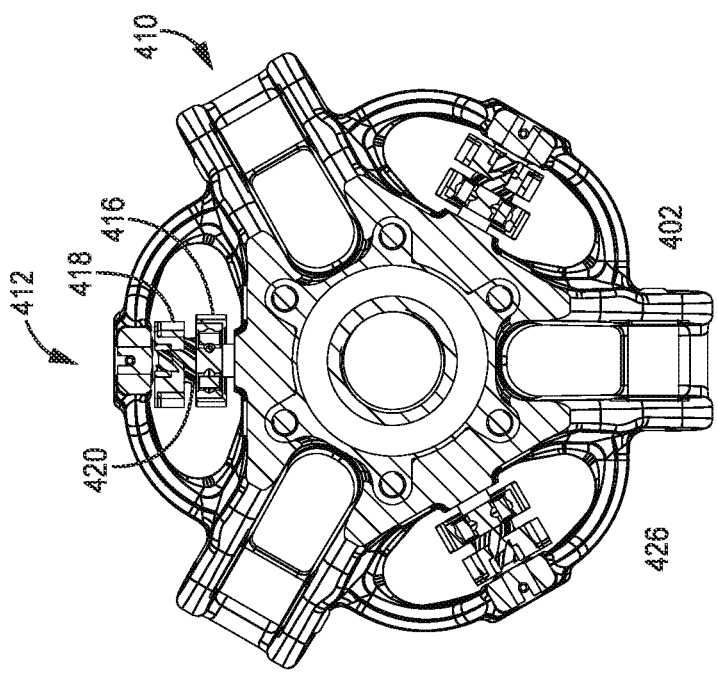
FIG. 4D SECTION B-B
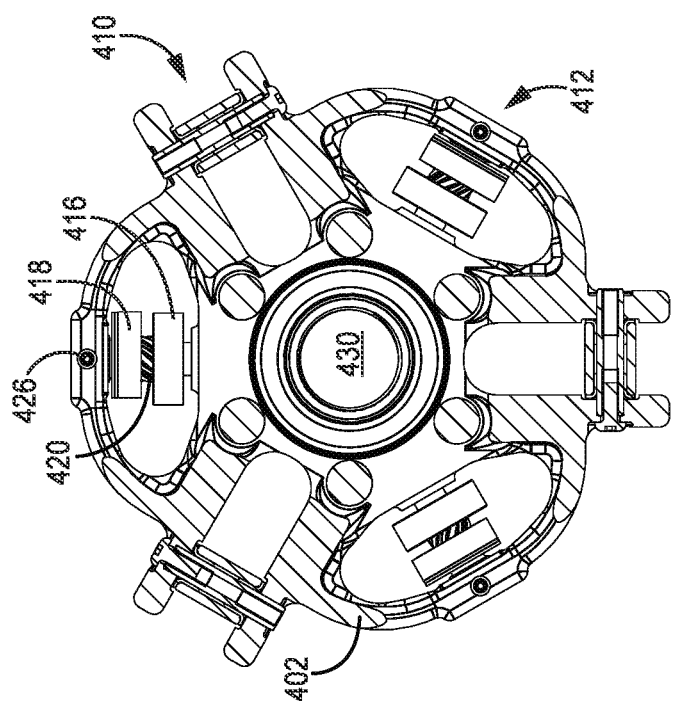
FIG. 4C SECTION A-A
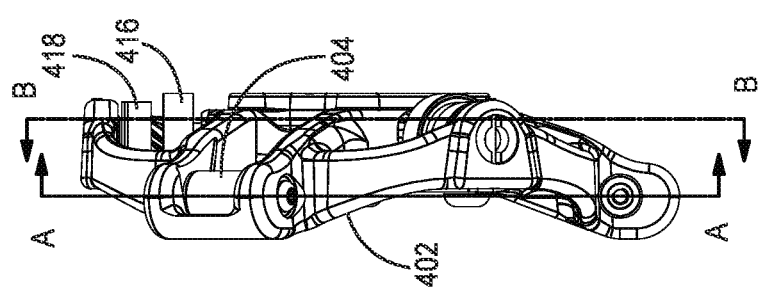
FIG. 4B

SECTION B-B

SECTION A-A

SECTION C-C

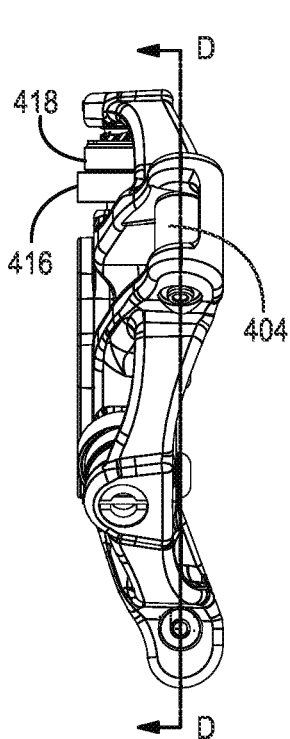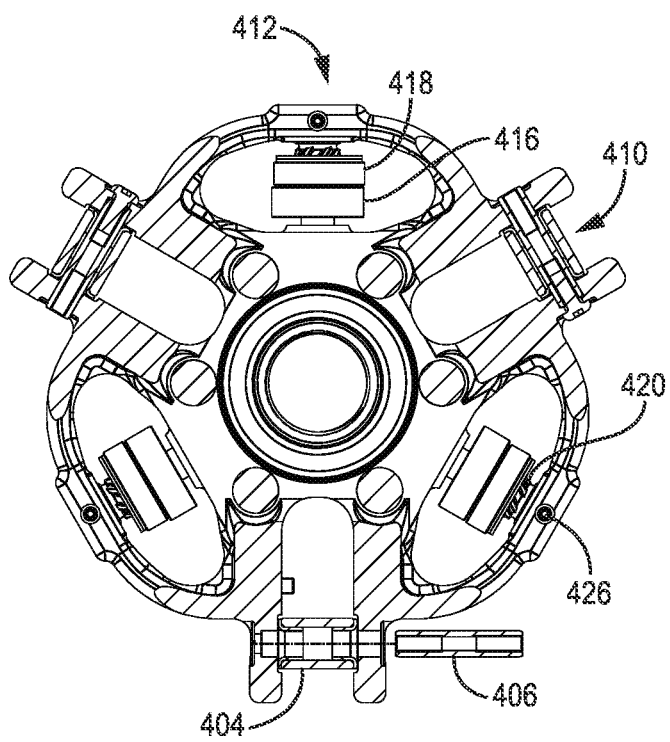
FIG. 5G
SECTION D-D
FIG. 5H

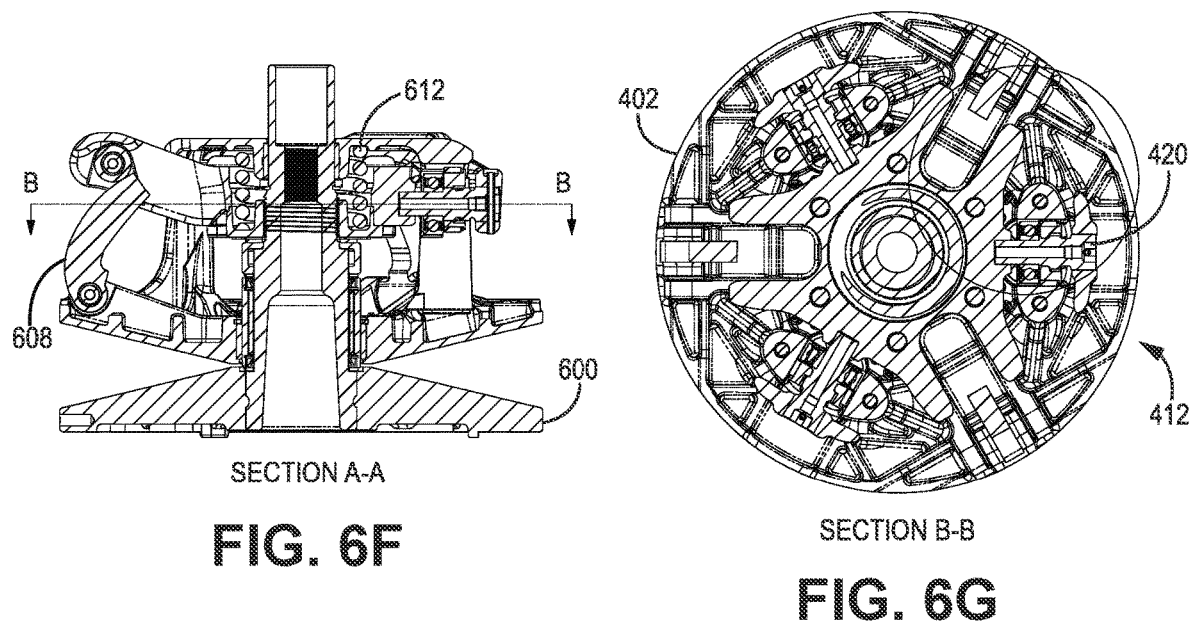
FIG. 6F SECTION A-A
FIG. 6G SECTION B-B

SECTION A-A

SECTION B-B

SECTION A-A

SECTION B-B

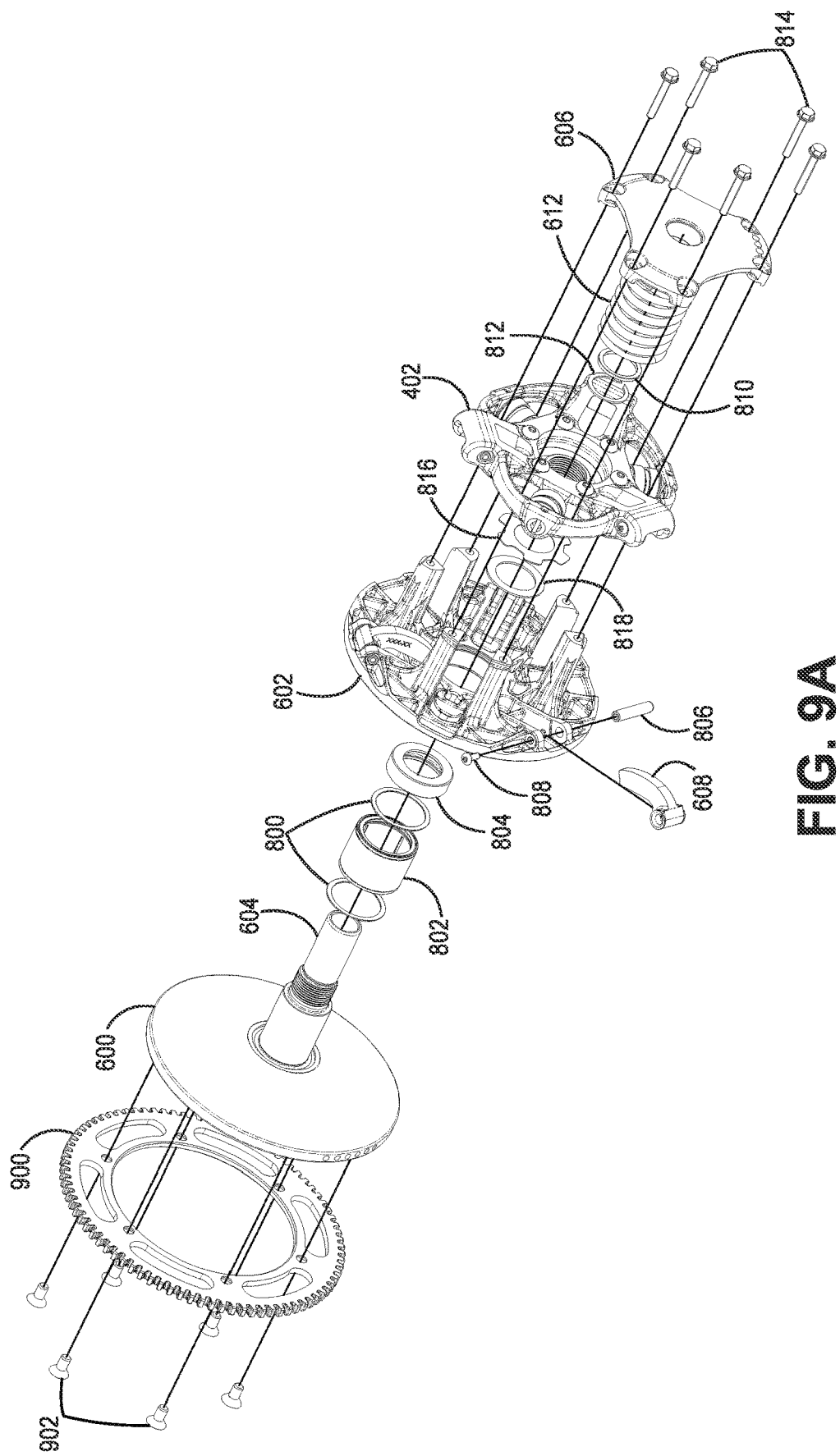

SECTION A-A

SECTION B-B

SECTION D-D

SECTION A-A

SECTION B-B

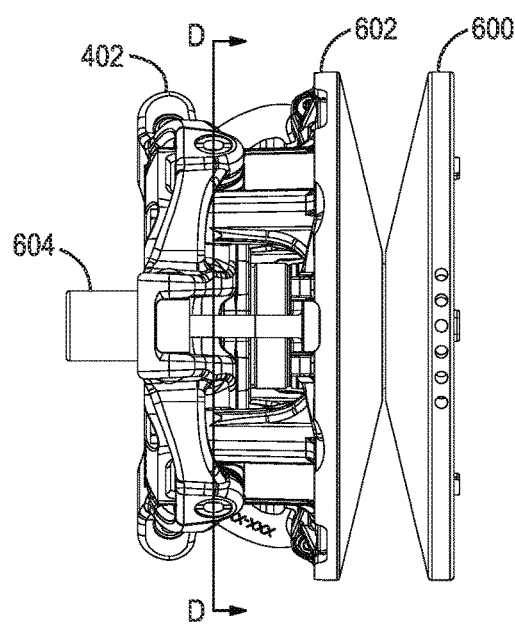
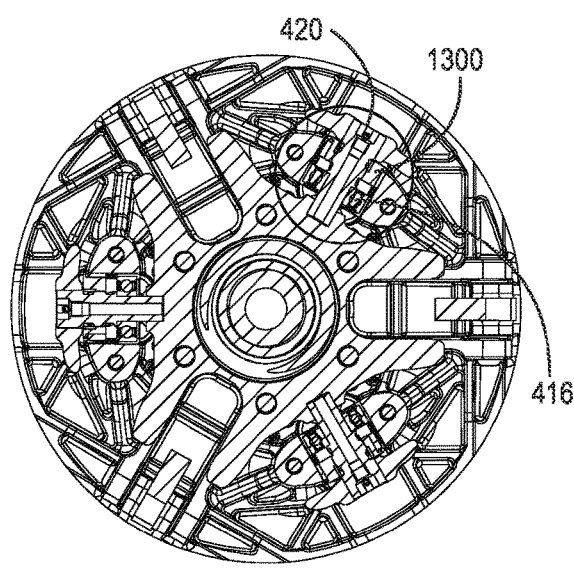
FIG. 13B
FIG. 13C
SECTION D-D

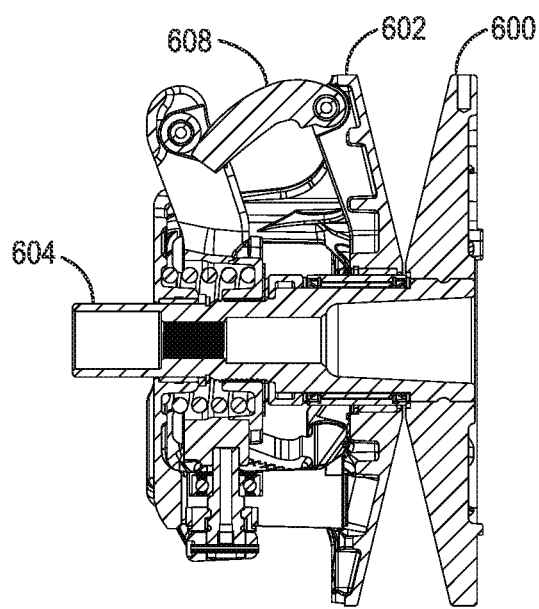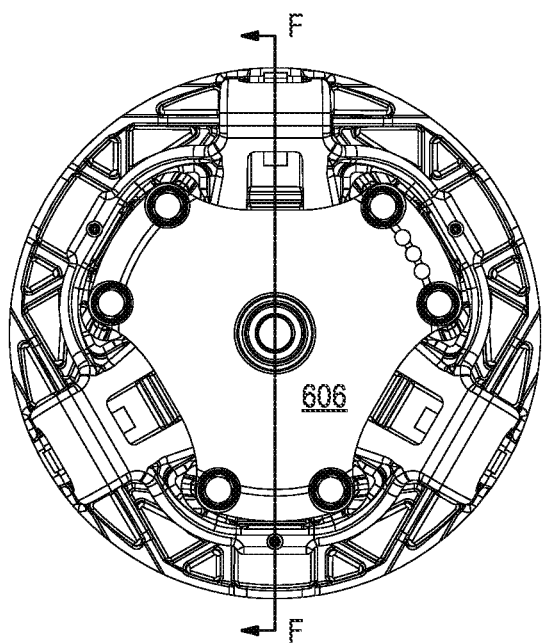
SECTION F-F
FIG. 13D  FIG. 13E

SECTION F-F

SECTION D-D

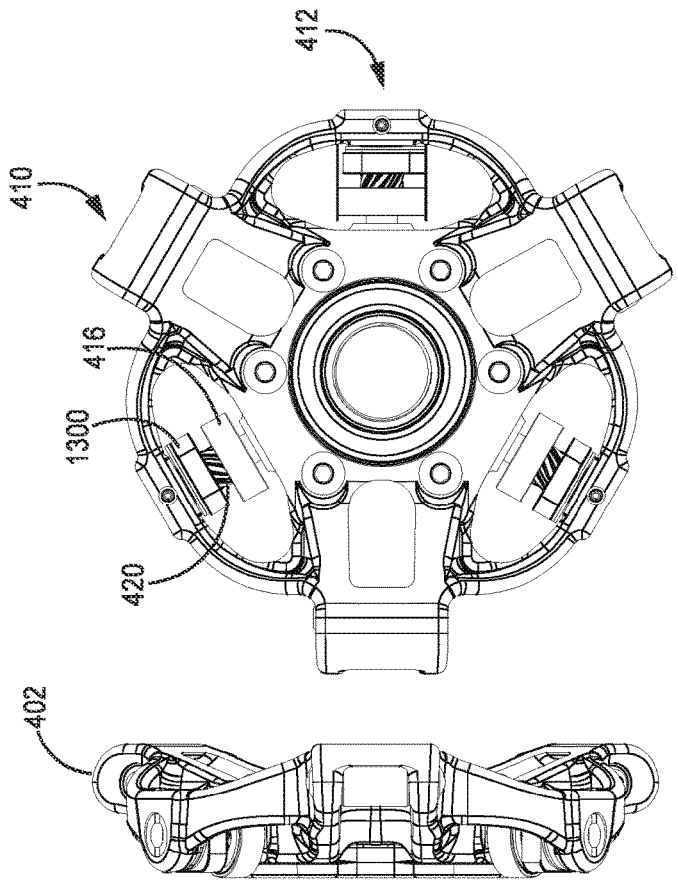
FIG. 15D
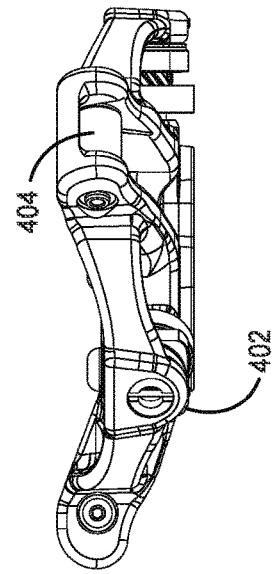
FIG. 15E
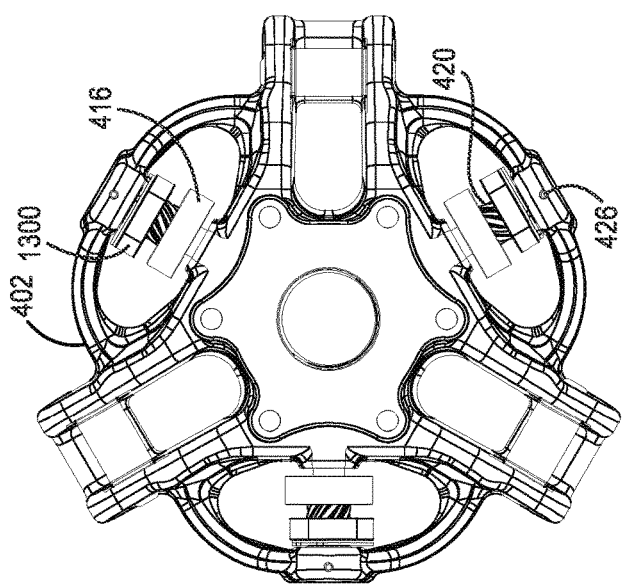
FIG. 15C
FIG. 15B

SECTION A-A

SECTION C-C

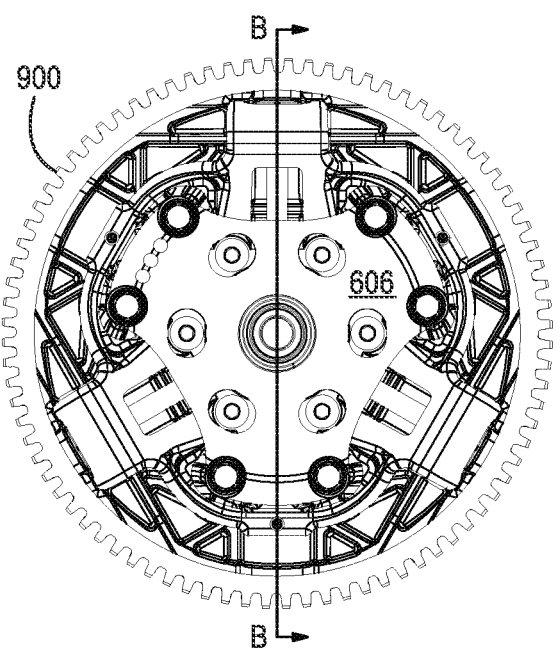
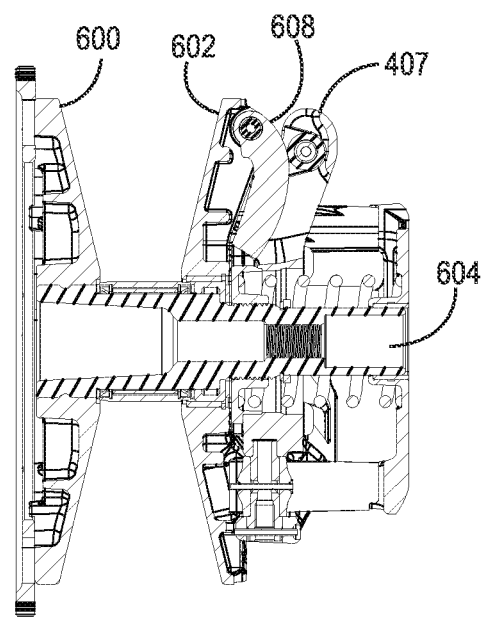
FIG. 16B
SECTION B-B
FIG. 16C

SECTION E-E

SECTION B-B

SECTION E-E

SECTION C-C

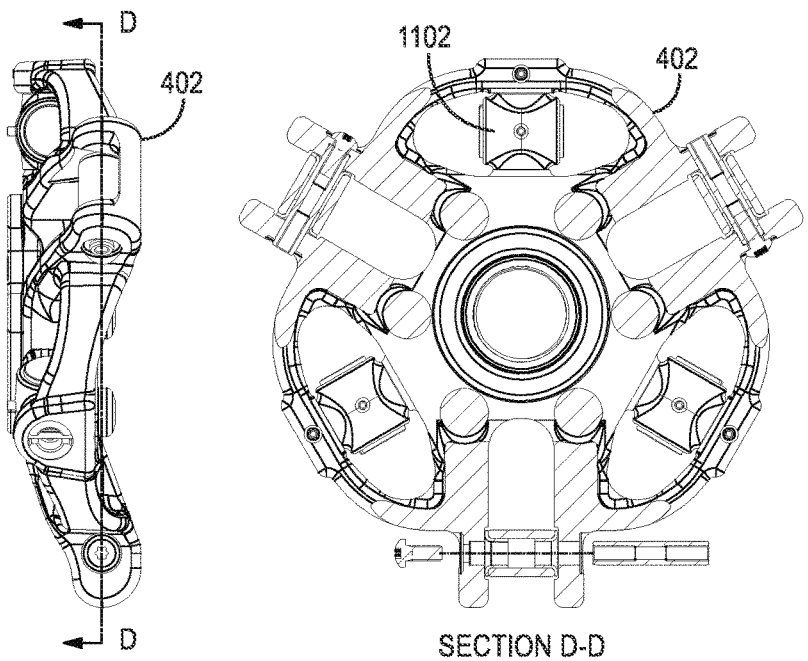
FIG. 17G   FIG. 17H
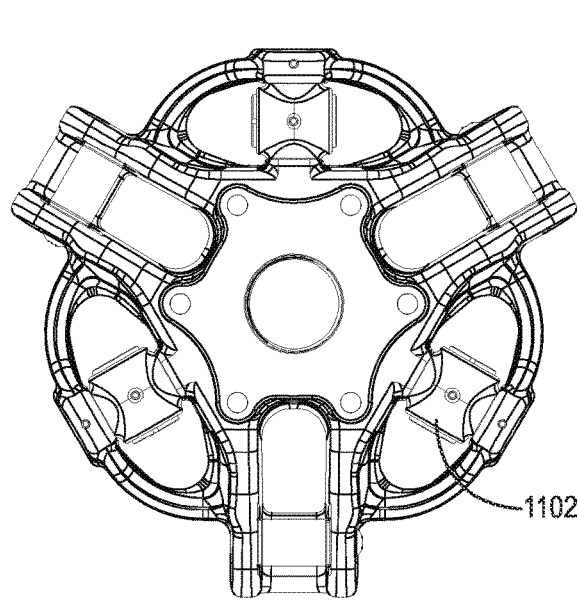   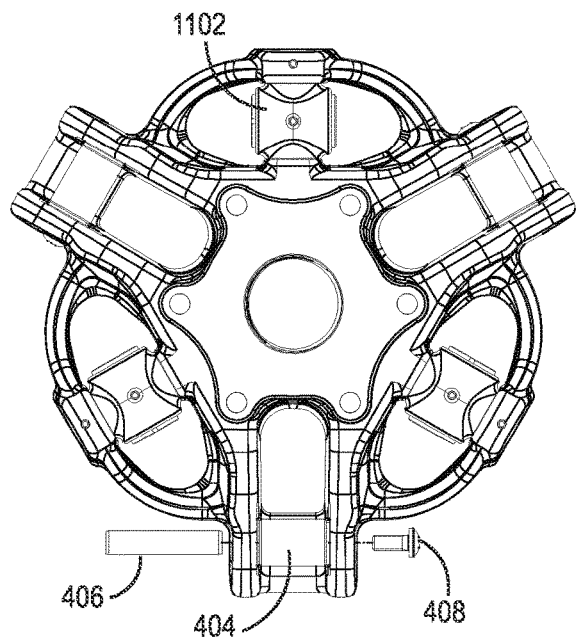
FIG. 17I   FIG. 17J

SECTION B-B

SECTION E-E

SECTION B-B

SECTION E-E

SECTION B-B

SECTION E-E

SECTION B-B

SECTION E-E

SECTION B-B

SECTION E-E

SECTION B-B

SECTION C-C

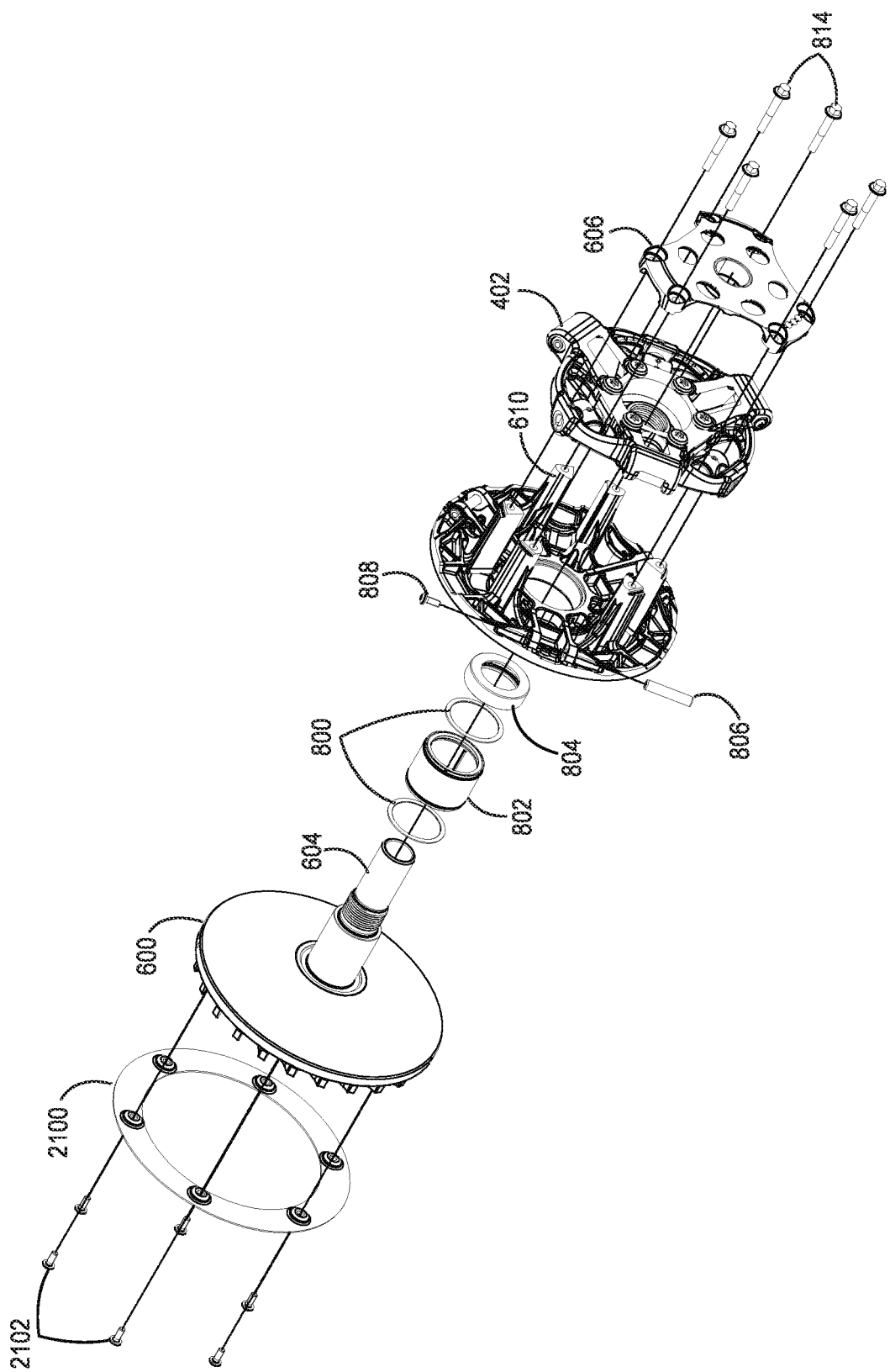

SECTION B-B

SECTION C-C

SECTION A-A

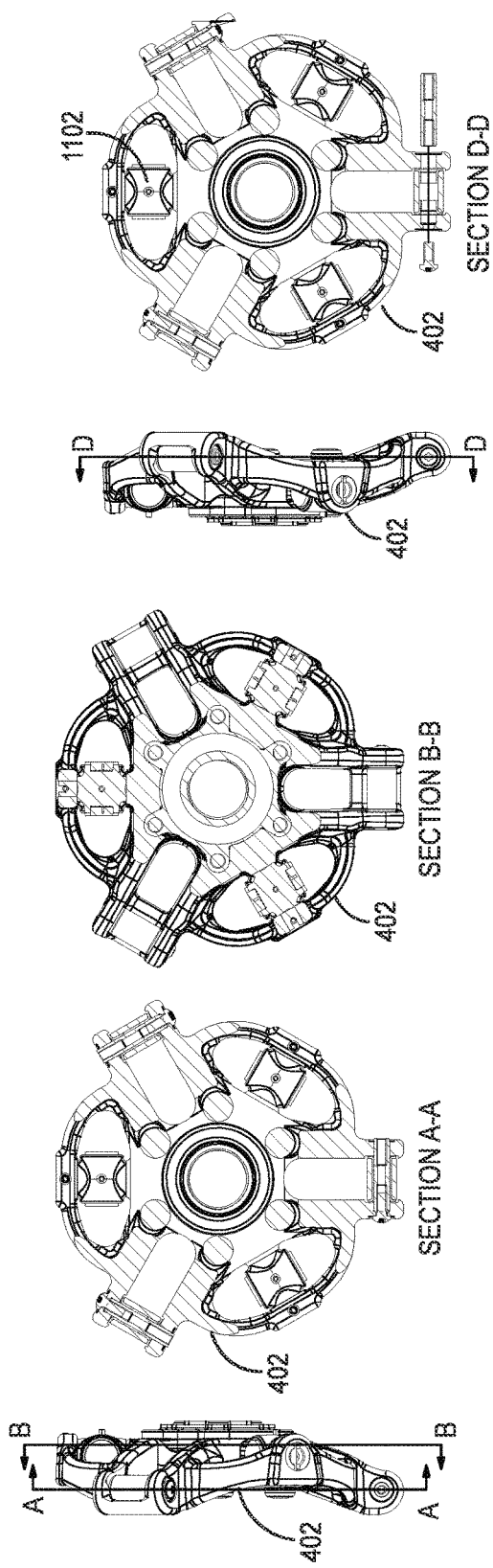

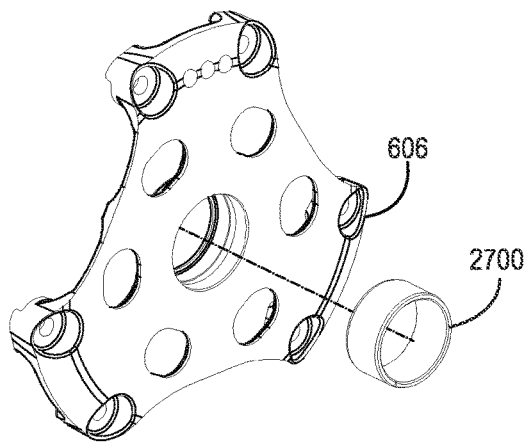
FIG. 27A
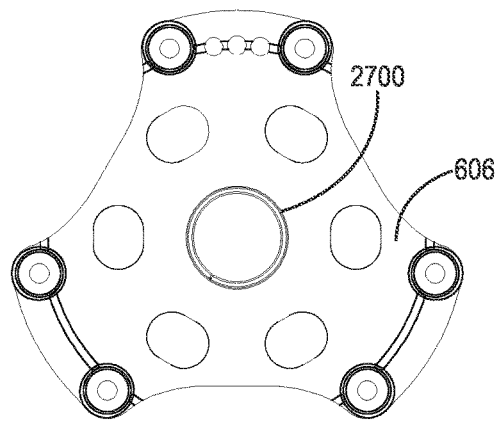
FIG. 27B
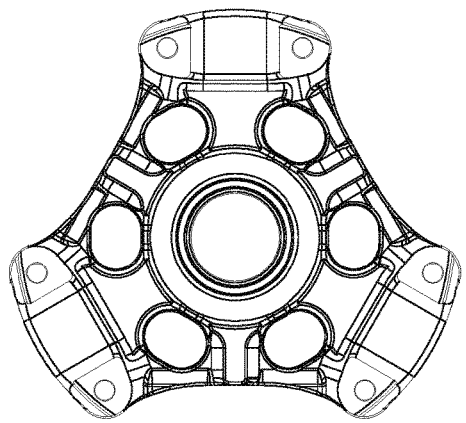
FIG. 27C
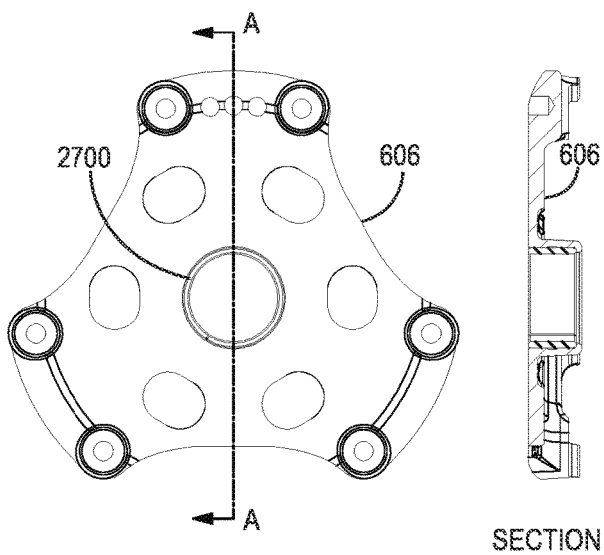
FIG. 27D    FIG. 27E

SECTION A-A

SECTION B-B

SECTION C-C

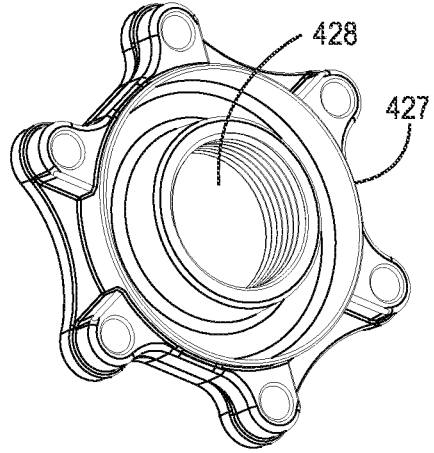
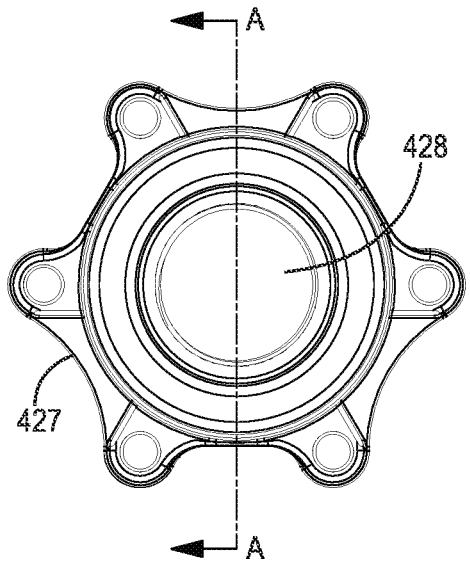
FIG. 30A  FIG. 30B
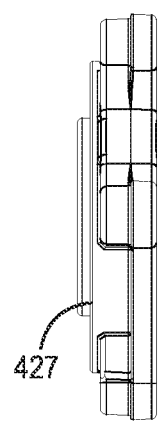
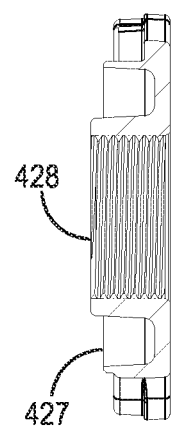
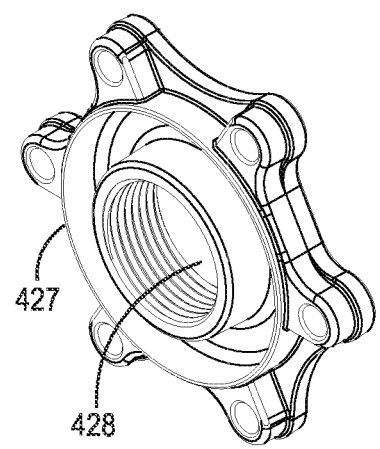
FIG. 30C  FIG. 30D  FIG. 30E

SECTION A-A

SECTION A-A

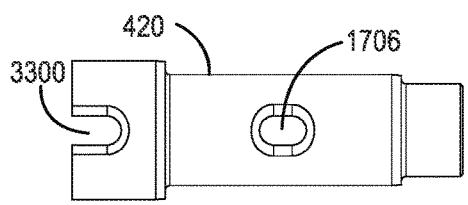
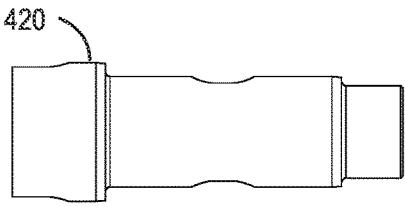
FIG. 33A　　　　　FIG. 33B
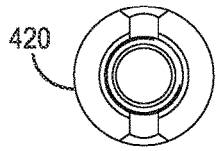
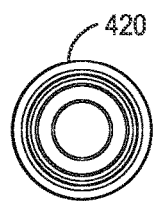
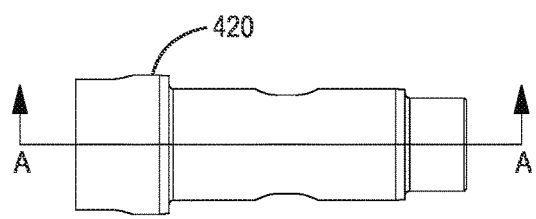
FIG. 33C　　　FIG. 33D　　　FIG. 33E
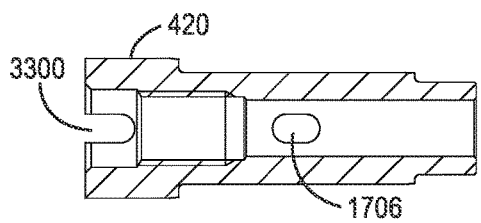
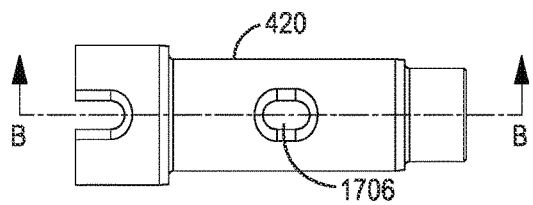
FIG. 33F　　　　　FIG. 33G
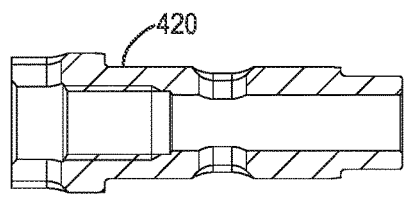
SECTION B-B
FIG. 33H

SECTION A-A

SECTION B-B

SECTION A-A

SECTION A-A

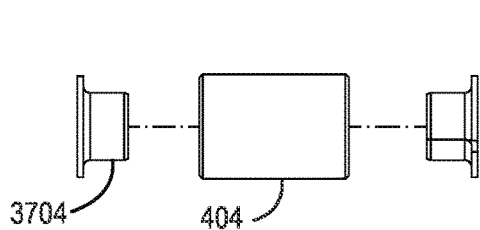 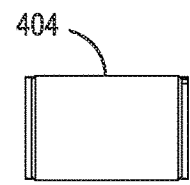 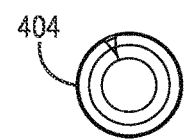
FIG. 37A  FIG. 37B  FIG. 37C
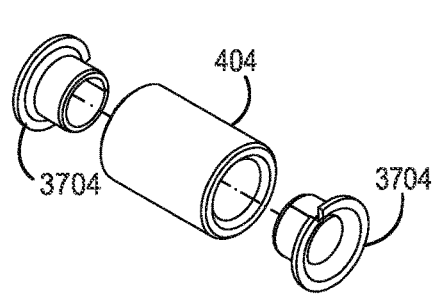 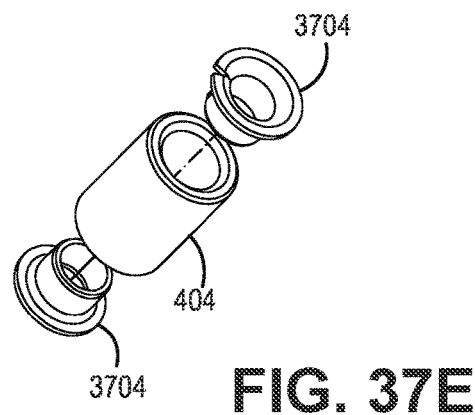
FIG. 37D  FIG. 37E

SECTION A-A

CONTINUOUSLY VARIABLE TRANSMISSION FOR RECREATIONAL VEHICLES AND RELATED COMPONENTS

This application is a continuation of U.S. application Ser. No. 16/893,752, filed on Jun. 5, 2020, which claims the benefit of U.S. Provisional Application No. 62/981,090, filed on Feb. 25, 2020, and which applications are incorporated herein by reference. A claim of priority to all, to the extent appropriate, is made.

BACKGROUND

Snowmobiles are popular land vehicles used as transportation vehicles or as recreational vehicles in cold and snowy conditions. Generally, snowmobiles are available for various applications such as deep snow, high performance, luxury touring, and trail riding, for example. In general, a snowmobile has a chassis on or around which the various components of the snowmobile are assembled. Typical snowmobiles include one or more skis for steering, a seat, handlebars, and an endless track for propulsion mounted to a central chassis. The engine drives a ground-engaging endless track disposed in a longitudinally extending drive tunnel. The skis serve to facilitate steering as well as to provide flotation of the front of the snowmobile over the snow in which it is operated. A handlebar assembly, positioned forward of the seat, is operatively linked to the skis for steering the snowmobile. The skis may be pivoted to steer the snowmobile, for example, by turning the handlebars.

At least some snowmobile frames include a tunnel and a front chassis portion which retains the power train, and a front suspension that mounts skis to the frame. A drive shaft is typically mounted to the front chassis portion and includes drive sprockets for powering a belt. A chain case, belt drive case, or gear box is also typically provided to transfer power from an engine or CVT (continuously variable transmission) to the drive shaft. A typical snowmobile may include a drivetrain with a drive shaft and an upper jack shaft that drives the drive sprocket(s) through the chain case, belt drive case, or gear box. CVTs are also utilized for snow bikes, motorcycles, and all-terrain vehicles (ATVs).

SUMMARY

Embodiments of the present disclosure describe a drive pulley for a continuously variable transmission including a stationary sheave with a stationary shaft, a movable sheave axially movable relative to the stationary sheave and in contact with the stationary shaft; a spider in contact with at least the moveable sheave and stationary shaft; a spring member, biasing the movable sheave axially away from the stationary sheave; at least one centrifugal actuator including an arm pivotally connected to one of the movable sheave and the spider, the arm pivoting away from the one of the movable sheave and the spider as a speed of rotation of the drive pulley increases, the arm pushing against another one of the movable sheave and the spider as the arm pivots away from the one of the movable sheave and the spider, thereby moving the movable sheave axially toward the stationary sheave, the at least one centrifugal actuator being disposed radially outward of the stationary sheave shaft; and a torque transfer assembly operatively connected to at least one of the spider and the movable sheave, the torque transfer assembly transferring torque between the spider and the movable sheave, the torque transfer assembly including, a torque bearing assembly and at least one roller assembly, positioned on a helixed torque pin, the torque pin connected to the spider; wherein as the roller assembly wears, the at least one roller assembly tracks along a helixed path of the torque pin in a distal direction from the bearing assembly.

Embodiments also describe a drive pulley for a continuously variable transmission including a stationary sheave with a stationary shaft; a movable sheave axially movable relative to the stationary sheave and in contact with the stationary shaft; a spider in contact with at least the moveable sheave and stationary shaft; a spring member, biasing the movable sheave axially away from the stationary sheave; at least one centrifugal actuator including an arm pivotally connected to one of the movable sheave and the spider, the arm pivoting away from the one of the movable sheave and the spider as a speed of rotation of the drive pulley increases, the arm pushing against another one of the movable sheave and the spider as the arm pivots away from the one of the movable sheave and the spider, thereby moving the movable sheave axially toward the stationary sheave, the at least one centrifugal actuator being disposed radially outward of the stationary sheave shaft; and a torque transfer assembly operatively connected to at least one of the spider and the movable sheave, the torque transfer assembly transferring torque between the spider and the movable sheave, the torque transfer assembly including, a torque bearing assembly and at least one slider block assembly, positioned on a helixed torque pin, the torque pin connected to the spider; wherein as the slider block assembly wears, the at least one slider block assembly tracks along a helixed path of the torque pin in a distal direction from the bearing assembly.

Embodiments further include a drive pulley for a continuously variable transmission including a stationary sheave, with a stationary shaft; a movable sheave axially movable relative to the stationary sheave and in contact with the stationary shaft;

a spider in contact with at least the moveable sheave and stationary shaft; a spring member, biasing the movable sheave axially away from the stationary sheave; at least one centrifugal actuator including an arm pivotally connected to one of the movable sheave and the spider, the arm pivoting away from the one of the movable sheave and the spider as a speed of rotation of the drive pulley increases, the arm pushing against another one of the movable sheave and the spider as the arm pivots away from the one of the movable sheave and the spider, thereby moving the movable sheave axially toward the stationary sheave, the at least one centrifugal actuator being disposed radially outward of the stationary sheave shaft; and a torque transfer assembly operatively connected to at least one of the spider and the movable sheave, the torque transfer assembly transferring torque between the spider and the movable sheave, the torque transfer assembly including, a button slider block assembly, positioned on a torque pin, the torque pin connected to the spider; wherein the button slider block assembly is removeable.

BRIEF DESCRIPTION OF DRAWINGS

This written disclosure describes illustrative embodiments that are non-limiting and non-exhaustive. Reference is made to illustrative embodiments that are depicted in the figures, in which:

FIGS. 4A-J illustrate perspective and cross-sectional views of CVT spider with roller-roller torque transfer assembly in a wear configuration, according to some embodiments.

FIGS. 5A-J illustrate perspective and cross-sectional views of CVT spider with roller-roller torque transfer assembly in a no wear configuration, according to some embodiments.

FIGS. 6A-H illustrate perspective and cross-sectional views of CVT drive clutch with roller-roller torque transfer assembly in a no wear and full shift configuration, according to some embodiments.

FIGS. 9A-I illustrate exploded, perspective and cross-sectional views of CVT electric start drive clutch with roller-roller torque transfer assembly in a wear and no shift configuration, according to some embodiments.

FIGS. 13A-K illustrate exploded, perspective and cross-sectional views of CVT drive clutch with slider-roller torque transfer assembly in a wear and full shift configuration, according to some embodiments.

FIGS. 15A-K illustrate perspective and cross-sectional views of CVT spider with roller-slider torque transfer assembly in a wear configuration, according to some embodiments.

FIGS. 16A-I illustrate exploded, perspective and cross-sectional views of CVT drive clutch calibrated for use in a two-stroke engine, according to some embodiments.

FIGS. 17A-J illustrate perspective and cross-sectional views of CVT spider with button block torque transfer assembly for use in a two-stroke engine, according to some embodiments.

FIGS. 24A-I illustrate exploded, perspective and cross-sectional views of an ATV, side by side (SXS), snowbike, or motorcycle CVT drive clutch with windage plate for use in a two-stroke or four-stroke engine in a no shift, no shift stop configuration, according to some embodiments.

FIGS. 26A-I illustrate perspective and cross-sectional views of an ATV or motorcycle CVT spider with button block assembly for use in a four-stroke engine, according to some embodiments.

FIGS. 27A-E illustrate perspective and cross-sectional views of a CVT cover assembly, according to some embodiments.

FIGS. 30A-E illustrate perspective and cross-sectional views of a CVT spider hub according to some embodiments.

FIGS. 33A-H illustrate perspective and cross-sectional views of a CVT torque pin, according to some embodiments.

FIGS. 37A-E illustrate perspective and cross-sectional views of a CVT roller assembly, according to some embodiments.

DETAILED DESCRIPTION

Figure 1:
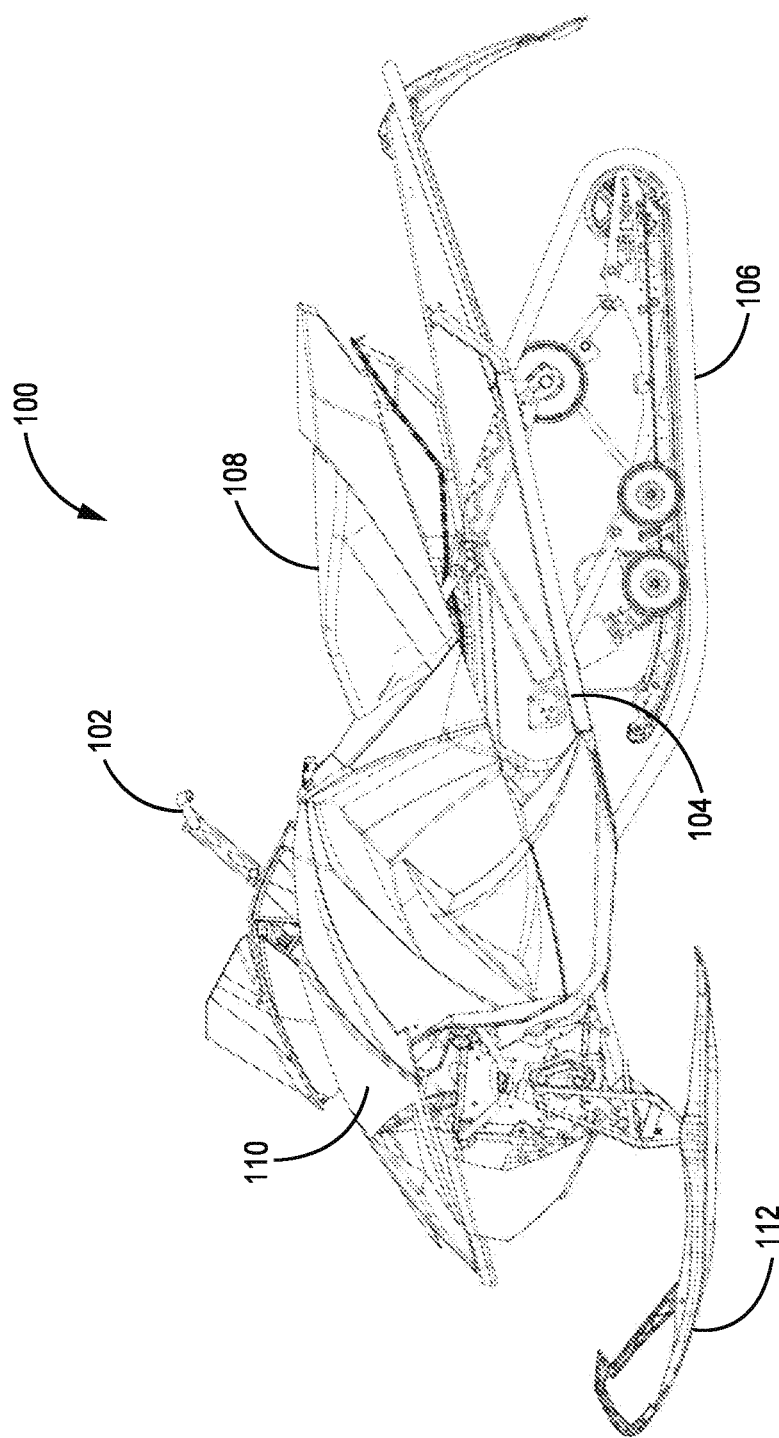
FIG. 1 illustrates a perspective view 100 of a snowmobile, according to some embodiments.

Conventional snowmobile powertrains incorporate a continuously variable transmission (CVT) having a drive pulley that is operatively coupled to the engine crankshaft and a driven pulley coupled to a driven shaft. The drive pulley transfers torque to the driven pulley via a drive belt looped around both pulleys. Typically, the driven shaft is a transverse jackshaft which drives the input member of a chain and sprocket reduction drive. The output of the reduction drive is coupled to one end of an axle on which are located one or more drive track drive sprockets.

The drive pulley includes centrifugal actuators through which the drive ratio of the drive pulley is varied progressively as a function of the engine speed and load. The centrifugal actuators are connected to a movable sheave of the drive pulley. The drive pulley also includes a fixed sheave which is axially fixed. The fixed sheave and the movable sheave are rotatable together. The movable sheave is movable axially toward the fixed sheave by the action of the centrifugal actuators and away from the fixed sheave by a biasing spring. The centrifugal actuators generally include centrifugal weights in the form of adjusting arms. Each of the arms is connected to the movable sheave of the drive pulley by a pin, and pivots outwards about its corresponding pin. As they pivot, the arms are in contact with corresponding rollers disposed on a spider fixed relative to the fixed sheave. When the adjusting arms pivot outwards as a result of centrifugal force, they slide against their corresponding roller and the axially movable sheave is pushed towards the fixed sheave.

Due to manufacturing tolerances and the type of connection used, it is possible that the spider and movable sheave can rotate slightly relative to one another during acceleration and deceleration of the drive pulley. As a result, the adjusting arms move slightly in a direction generally parallel to an axis of rotation or their corresponding rollers. This is sometimes referred to as backlash. This slight movement causes rubbing of the adjustable arms against their respective rollers and can result in portions of the arms, the rollers or both to wear.

Embodiments of the present disclosure provide wear adjusting torque transfer devices, such as roller, slider, and button (solid or damped) block assemblies. In some embodiments, the wear adjusting feature is optional or removeable. In one embodiment, a spider in a primary drive clutch of a CVT system uses rollers to transfer torque. Two rollers can be utilized, one for primary forward torque and one for reverse and engine braking torque. In addition to reverse engine braking, the secondary roller (or button or slider, in other embodiments) can be engaged when slowing down. The secondary roller can become the primary forward torque roller during engine reverse operation. The primary torque roller can be on the centerline axis of its locating pin. The secondary torque roller can be located on an eccentric cam on the centerline axis of the locating pin. The eccentric cam has a one-way clutch to allow adjustment of slack from component wear, but not the return to a slack condition. To aide the wear adjustment, a method of providing rotatory force to the cam, such as with a torsional spring, can be utilized.

In another embodiment, a method for adjustment relies on a mass for the reverse torque roller. This mass would be a part of the eccentric cam feature. The centrifugal force acting on the mass would move the cam mass outward, and by having this cam in contact and guided by a helixed spline or helixed track, causes the cam to rotate as the mass moves outward radially to adjust for wear in the primary and secondary rollers.

By separating the torque transfer device and the cam actuation portion of the drive clutch to different locations (such as a 60 degree offset), a roller to transfer torque can be utilized, as compared to a sliding button, in one embodiment. The torque transfer system can be utilized in a forward and reverse torque transfer roller system. The forward or primary torque transfer roller can be on the axial centerline of the locating/torque transfer pin. The reverse or secondary torque transfer roller can be located on an eccentric cam. This eccentric cam is free to rotate about the axial centerline of the torque transfer pin, but with the addition of a one-way bearing/clutch it can only rotate in one direction to take up the slack/wear of the rollers. The eccentric cam can be coaxially located on the torque transfer pin with a bushing. The eccentric cam can be aided in wear slack take-up by a member that provides torque to the cam, such as a torsion spring. The rollers can transfer torque between the spider (fixed to the post or stationary shaft of the drive clutch) and the moveable sheave. The moveable sheave travels axially up and down the stationary shaft post to change the ratio of the CVT system. The rollers can be cylindrical in the radial direction to the centerline of the clutch along the axis of the torque transfer pin. The spider design can allow for slight movement radially from the centerline of the drive clutch to ease in assembly, but not in a manner to take up the slack in the fit of the spider to moveable sheave.

Such example embodiments provide a quieter, narrower drive clutch, with fewer parts, allowing for narrower body shrouding on the vehicle. The CVT drive clutch can be reduced in width or thickness by 25-30 mm for example. The embodiments described herein also provide for easier servicing or replacement of worn parts, while maintaining performance and durability of the CVT system.

Figure 2A:
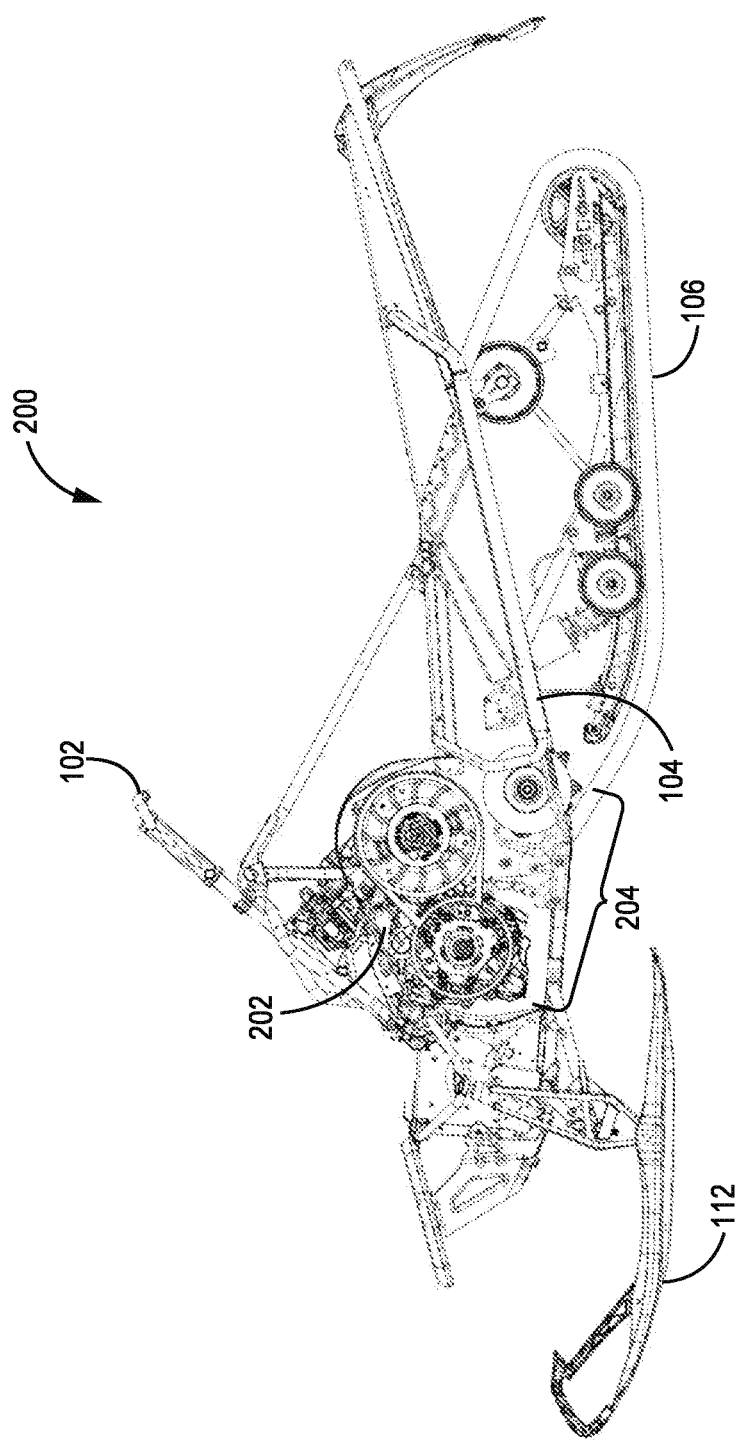
FIGS. 2A-B illustrate perspective views 200 of a snowmobile without a shroud and seat, according to some embodiments.
Figure 2B:
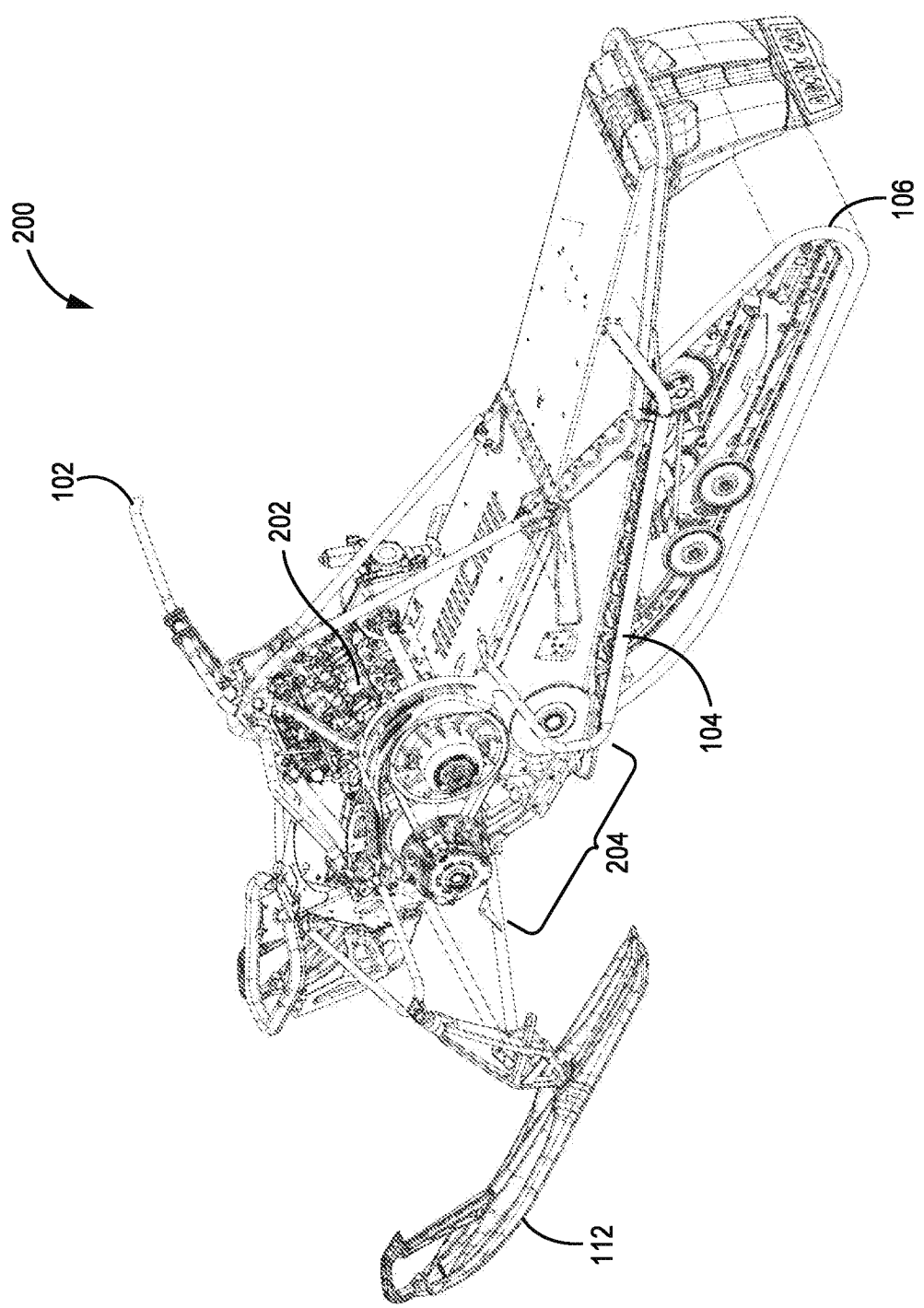
Figure 3A:
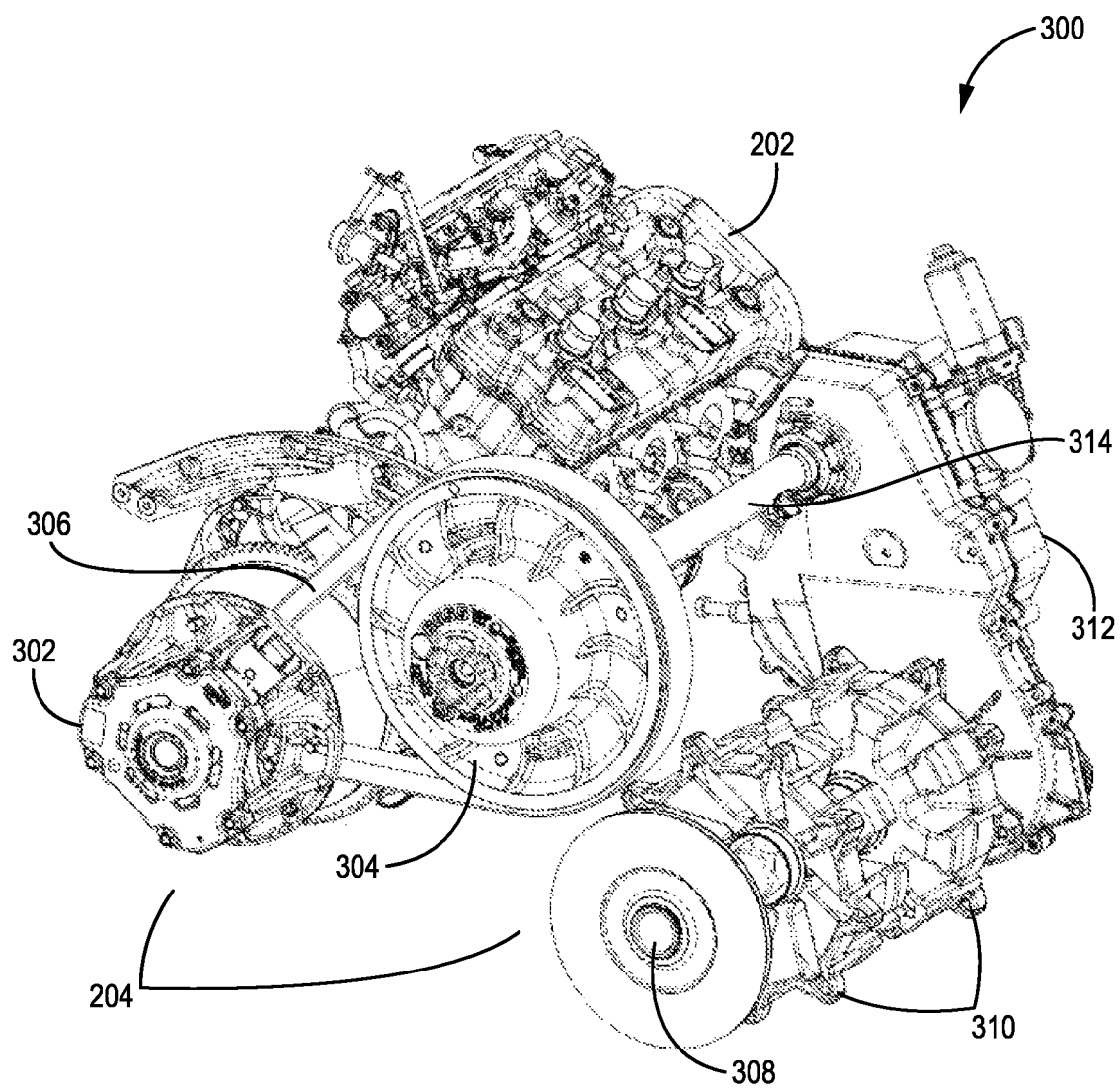
FIGS. 3A-D illustrate perspective views 300 of snowmobile engine and drive train components, according to some embodiments.
Figure 3B:
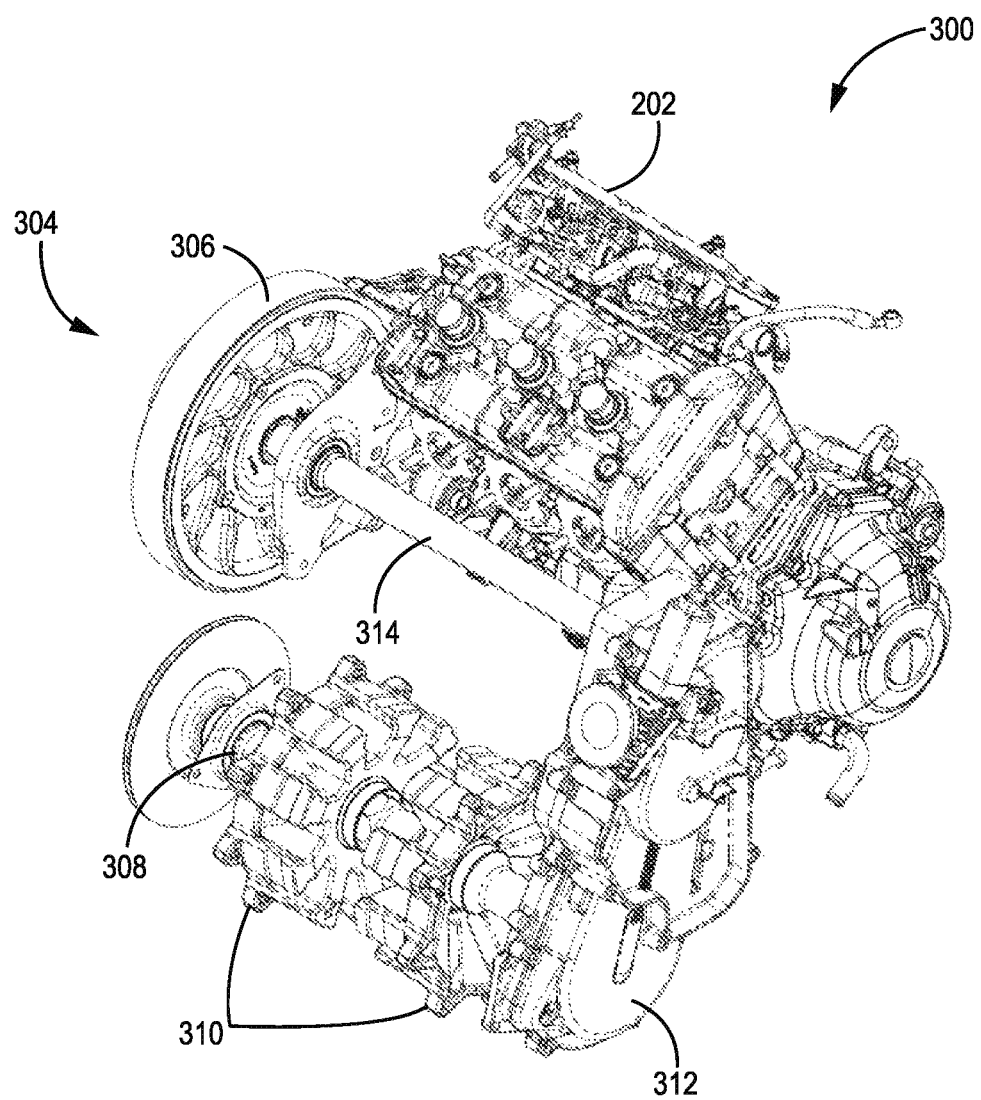
Figure 3C:
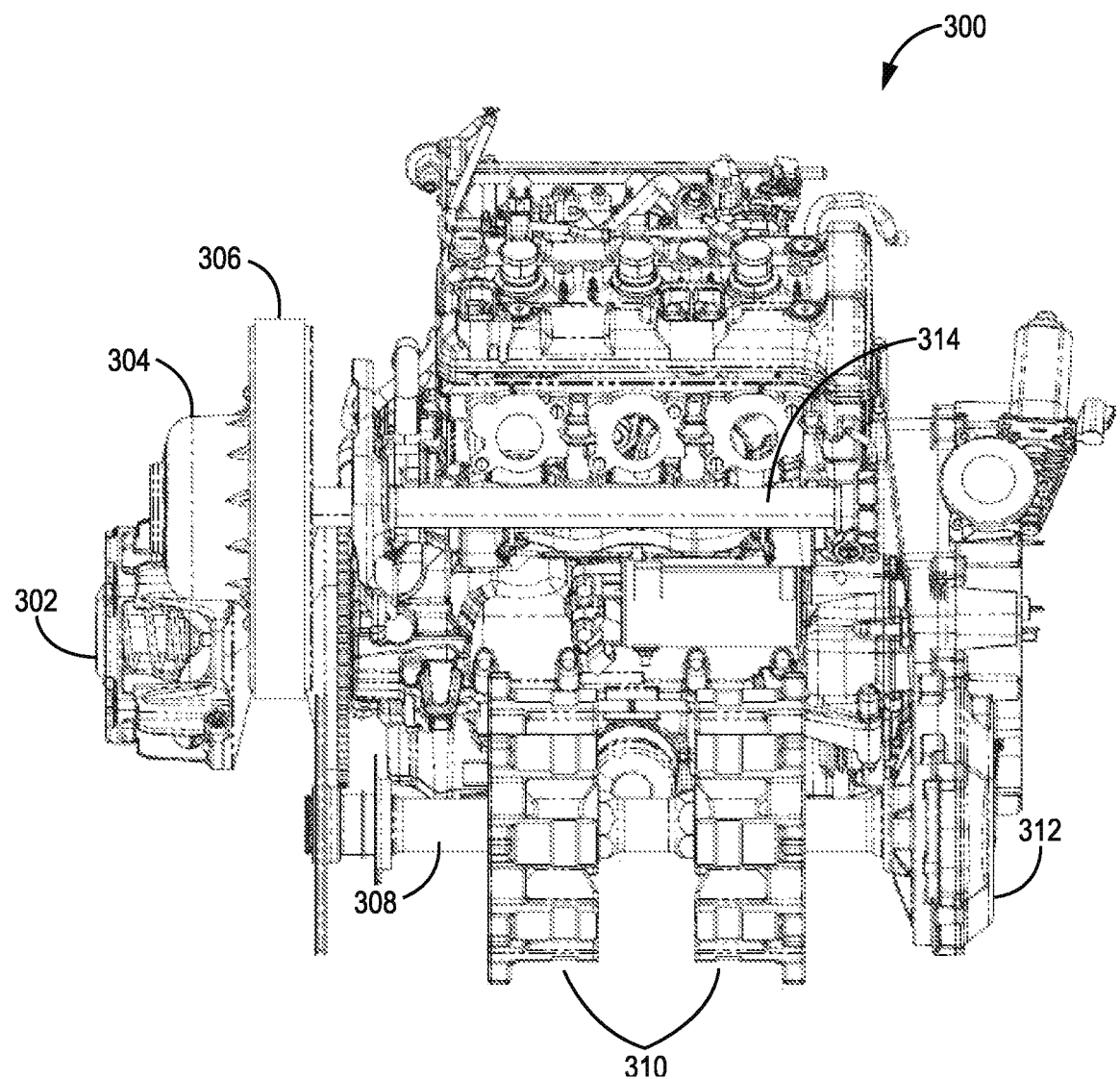
Figure 3D:
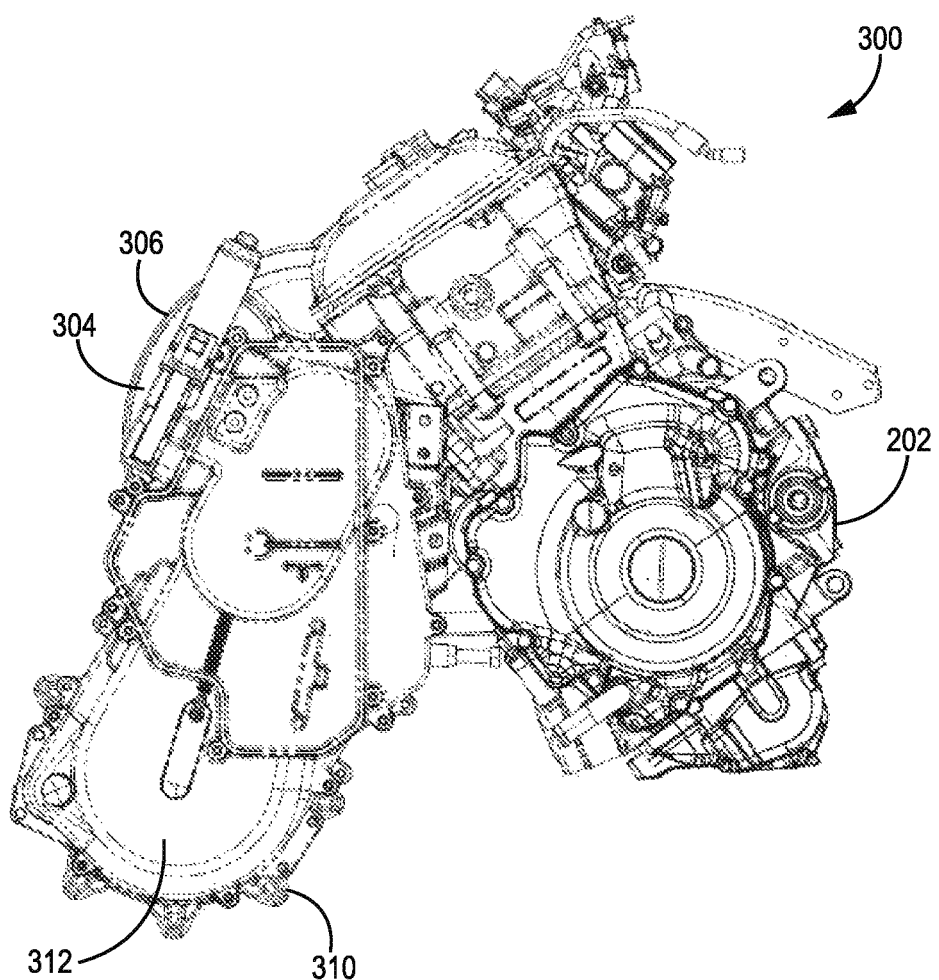

Referring to FIG. 1, a perspective view 100 of a snowmobile is shown, according to some embodiments. A chassis 104 or frame supports an engine (see FIG. 2A), drive or power train (see FIG. 2A), a drive track 106, handlebars 102 and skis 112. A shroud 110 or fairing in contact with the chassis covers and protects various components of the vehicle. A seat 108 is positioned rearward of the handlebars 102. With the shroud 110 and seat 108 removed (see FIGS. 2A-B), the engine 202 is shown in contact with a drive train 204. The drive train 204 includes a continuously variable transmission (CVT), for transferring power from the engine 202 to the drive track 106.

Referring to FIGS. 3A-D, perspective views 300 of snowmobile engine and drive train 204 components are shown, according to some embodiments. An engine 202 converts chemical energy to mechanical energy via a rotating input shaft in contact with a transmission or drive train 204, such as a CVT. The CVT includes a rotatable drive (or primary) clutch 302 connected to the input shaft. The CVT also includes a rotatable driven (or secondary) clutch 304 connected to an output shaft or jack shaft 314, the driven clutch 302 having a laterally stationary sheave and a laterally movable sheave that is normally biased toward the stationary sheave. An endless flexible drive belt 306 is disposed about the drive 302 and driven clutches 304. Typically, the CVT transmission is connected to the output shaft of the vehicle's engine, the transmission providing continuously variable gear reduction from the relatively higher rotation speed of the engine to the relatively lower rotation speed of the vehicle drive axle. A CVT may be used in conjunction with an additional gear box/transmission 312, if desired. For example, it may be desirable to provide a gear box 312 to permit the driver to shift between forward and reverse gears. In such cases, a neutral position may also be provided, along with, e.g., an optional low gear for extra power at low speeds. Typically, such a gear box 312 is connected to the jack shaft 314 of the CVT, the gear box 312 in turn having a drive shaft 308 connected by suitable linkages (sprockets 310, for example) to the drive track 106.

The endless, flexible, generally V-shaped drive belt 306 is disposed about the clutches 302, 304. Each of the clutches has a pair of complementary sheaves, one of the sheaves being laterally movable with respect to the other. The effective gear ratio of the transmission is determined by the positions of the movable sheaves in each of the clutches. The secondary driven clutch 304 has its sheaves normally biased together (e.g., by a compression spring working in combination with a helix-type cam, as described below), so that when the engine is at idle speeds the drive belt rides near the outer perimeter of the driven clutch sheaves.

The spacing of the sheaves in the primary drive clutch 302 usually is controlled by centrifugal flyweights (such as a cam arm). As the drive clutch 302 rotates faster (in response to increased engine rpm) the flyweights urge the movable sheave toward the stationary sheave. This pinches the drive belt 306, causing the belt 306 to begin rotating with the drive clutch 302, the belt in turn causing the driven clutch 304 to begin to rotate. Further movement of the drive clutch's 302 movable sheave toward the stationary sheave forces the belt 306 to climb outwardly on the drive clutch sheaves, increasing the effective diameter of the drive belt path around the drive clutch 302. Thus, the spacing of the sheaves in the drive clutch 302 changes based on engine rpm. The clutch therefore can be said to be speed sensitive.

As the sheaves of the drive clutch 302 pinch the drive belt 306 and force the belt 306 to climb outwardly on the drive clutch sheaves, the belt 306 (not being stretchable) is pulled inwardly between the sheaves of the driven clutch 304, decreasing the effective diameter of the drive belt path around the driven clutch 304. This movement of the belt 306 inwardly and outwardly on the drive 302 and driven clutches 304 smoothly changes the effective gear ratio of the transmission in infinitely variable increments.

FIGS. 4A-J illustrate perspective and cross-sectional views of CVT snow spider with roller-roller torque transfer assembly in a wear configuration, according to some embodiments. Spider body 402 includes torque transfer device assemblies 412 and actuator assemblies 410. Each torque transfer device assembly 412 and actuator assembly 410 are offset about 60 degrees from the adjacent assembly or about 120 degrees from an adjacent similar assembly. Actuator rollers 404 can be secured to the spider body 402 by a cam roller pin 406 and cam roller cap or fastener 408. In this embodiment, the torque transfer device assembly 412 includes a torque bearing assembly 416, an eccentric roller assembly 418 and torque pin 420. The torque pin 420 fastens to the spider body 402 and can be further secured by securing pin 422 through securing pin aperture 426. The torque pin 420 can be positioned in torque pin aperture 424. A hub 427 can be secured to the spider body 402 with fasteners 428, and an interference fit. The hub 427 includes a shaft aperture 431, in line with aperture 430 for integration with a stationary sheave post or shaft (such as by threading). The optional interference fit can be facilitated by conical shaped points (i.e., the taper of the parts fit together like two cones stacking) of contact at the hub 427 and spider body 402. Load can then be further transferred through the hub 427 and less through the fasteners 428. The walls surrounding hub aperture 431, walls surrounding spider aperture 430, or both can be tapered. The walls of apertures, 431, 430 can be tapered about 0.5% to 2%, or about 1% to about 1.5%, for example. A wear configuration describes a CVT configuration after substantial wear of the indicated parts. A no wear configuration describes new or nearly new parts before any substantial wear has occurred. Wear can include about a 0.1% to about a 10% reduction by mass or surface area of a part. Wear can include 0.5% to about 5%, about 1% to about 7%, or about 2% to about 8% reduction in mass or surface area.

The spider body 402 can be manufactured of aluminum or be substantially manufactured of aluminum, for example. The hub 427 may be manufactured of steel to provide additional strength to the spider body 402 and reduce the overall width or thickness of the assembly. Optionally, the hub 427 can be integrated as part of the spider body 402, if made of the same material. The aluminum spider body 402 and steel hub 427 can be secured together with fasteners 428, but torque is transmitted through a combination of the fastener bolted joint, as well as the interference fit between the aluminum and steel components, such as with a press fit. The interference fit and bolt clamp load help transfer torque.

The unique shape of having the actuator assembly 410 60 degrees offset to the torque transfer device 412 (slider or roller) allows for a more compact design and width of the drive clutch by tucking the torque transfer mechanism into the casting profile, and profiling the cam arm roller support structure of the actuator assembly 410 to the moveable sheave casting profile. Torque transfer device 412 is positioned further centrally than on traditional spiders and provides additional reduction in diameter and overall weight.

Figure 4A:
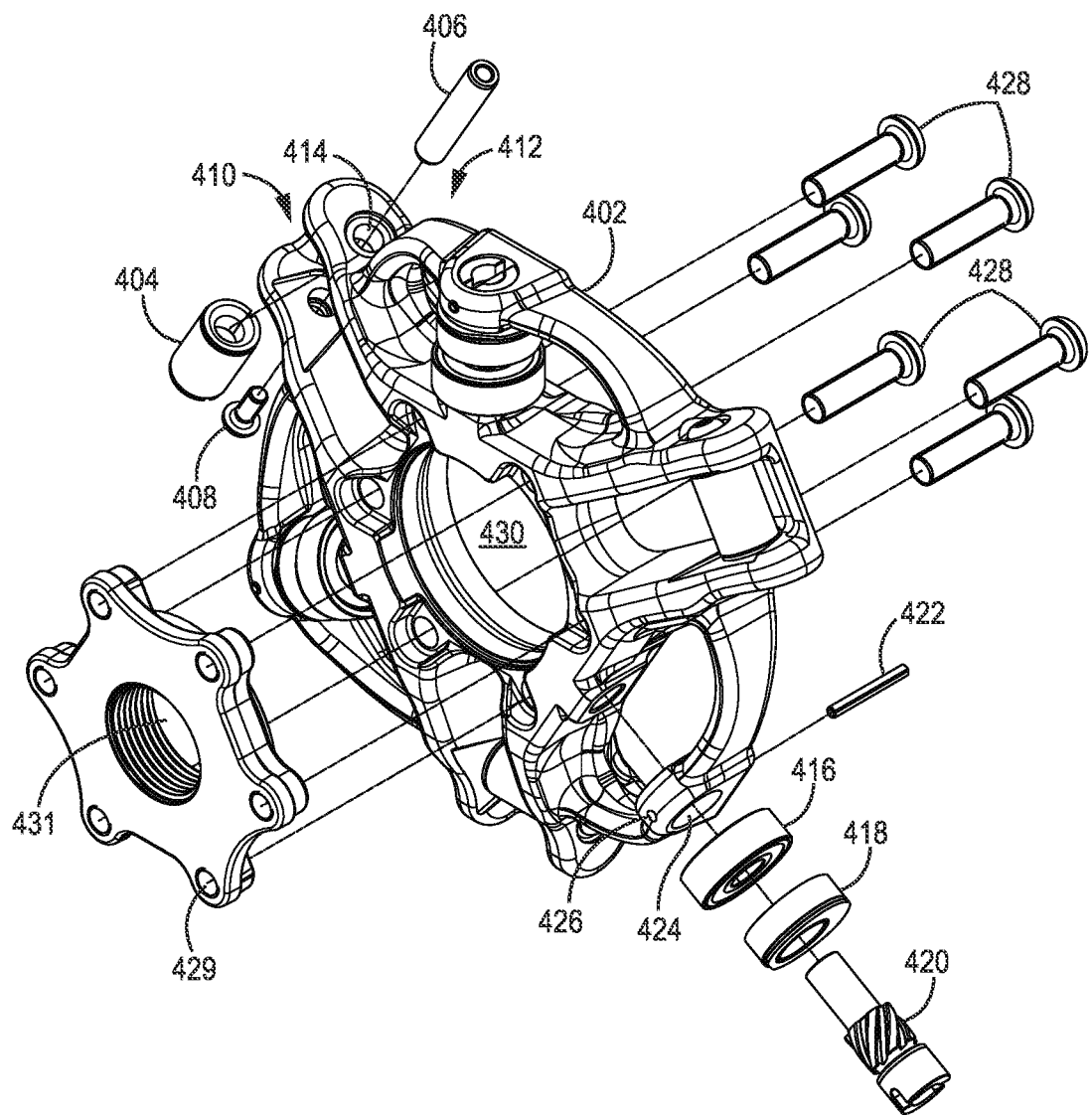
Figure 4E:
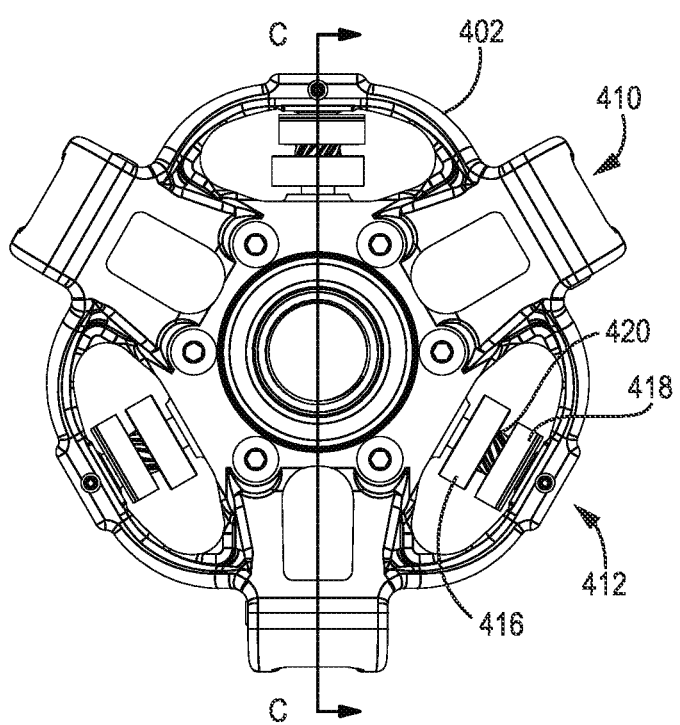
Figure 4F:
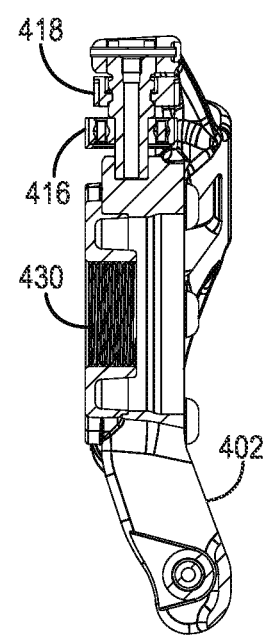
Figures 4G, 4H:
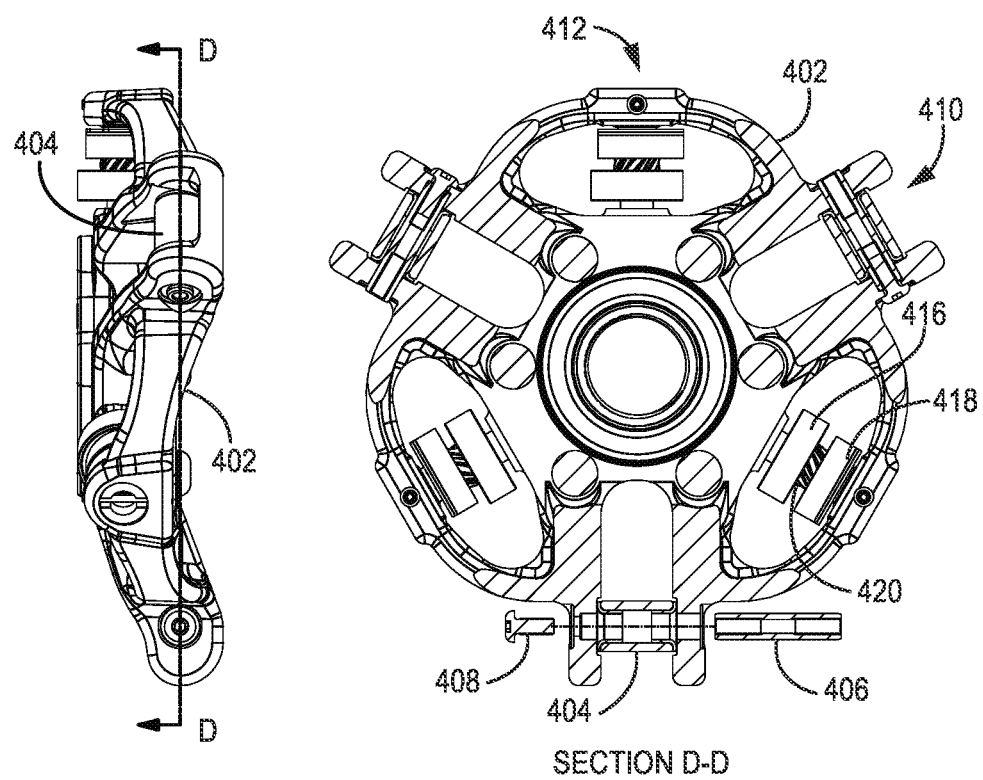
Figure 4J:
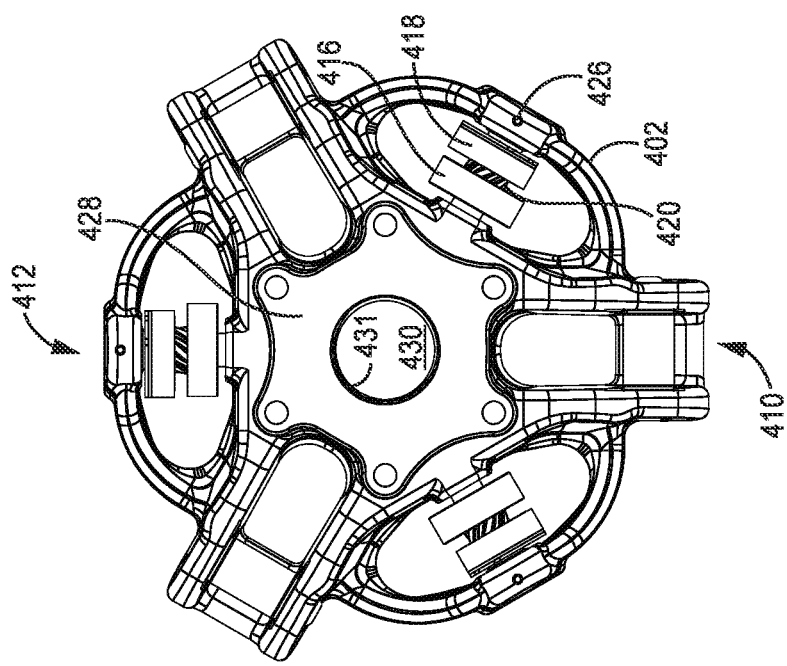
Figure 4I:
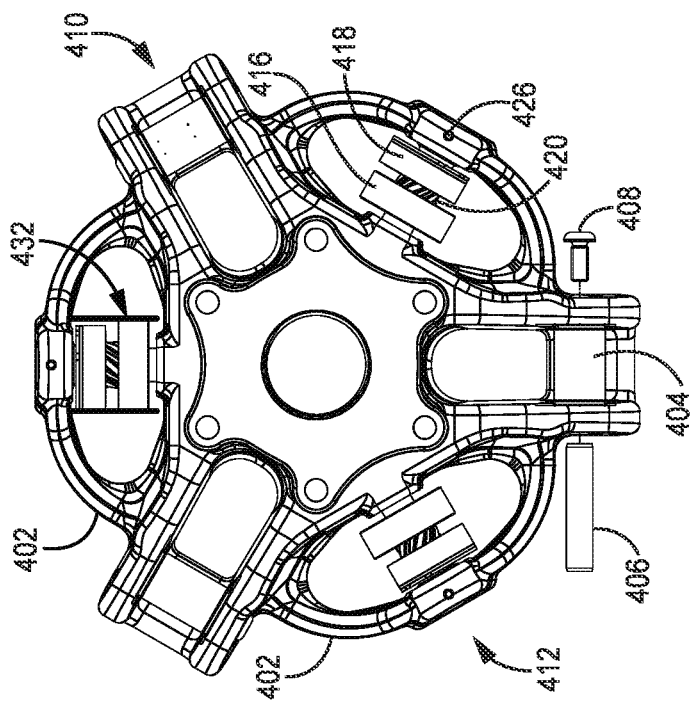

The eccentric roller assembly 418 separates from the torque bearing assembly 416 as the roller follows the helixed path of the torque pin 420 as wear occurs. The eccentric path provides alternating contact between the torque bearing assembly 416 and eccentric roller assembly 418, extending the life of the system while allowing easier access for service and replacement. As the primary assembly 418 wears from travel up and down the tower or post, the secondary assembly 416 moves up the one-way helixed path, forcing a closer fit against a tower face in a forward moving configuration or against an opposite tower face in a reverse (or slowing down) configuration, or both. Line 432 of FIG. 4I shows the offset contact of the rollers with a tower or post. Rollers 404 can be easily removed and replaced as wear occurs by contact with a cam arm.

Figure 5A:
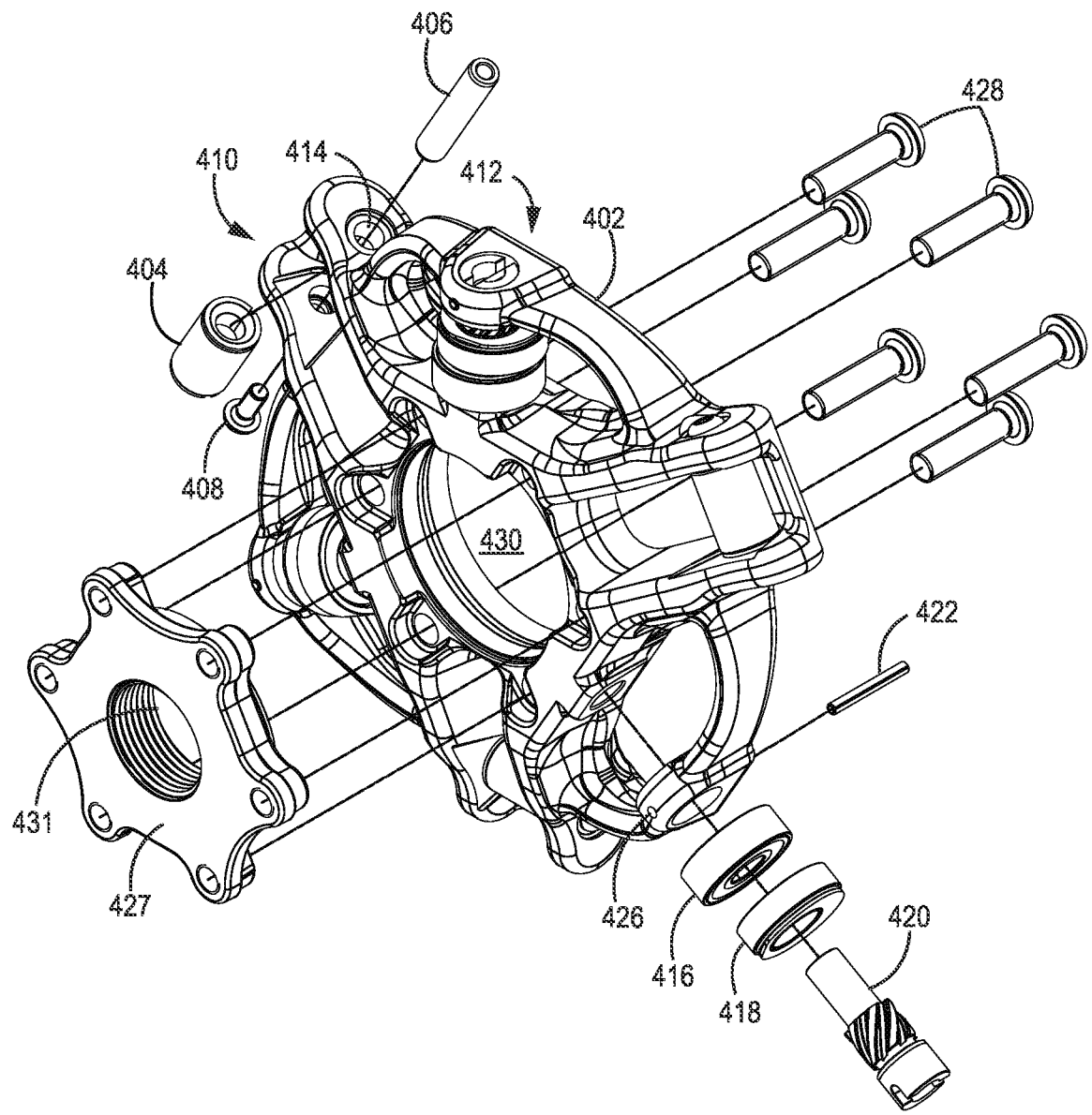
Figure 5D:
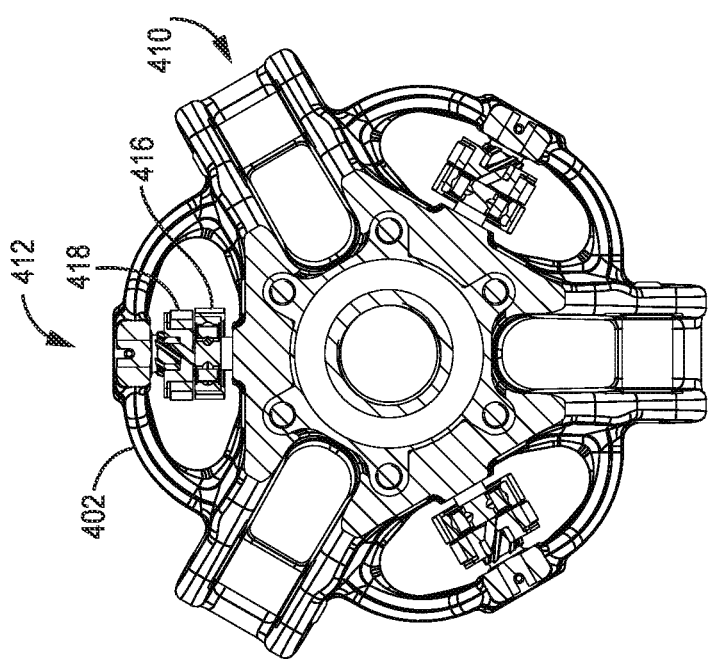
Figure 5C:
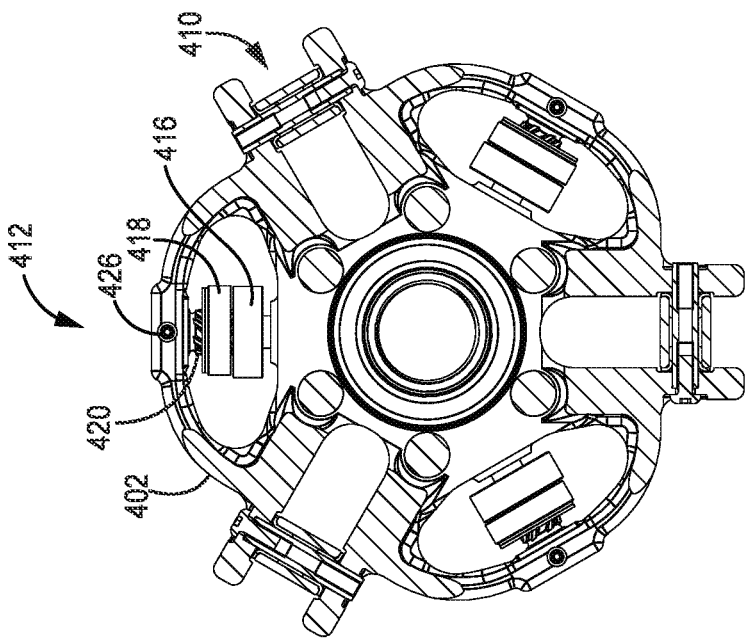
Figure 5B:
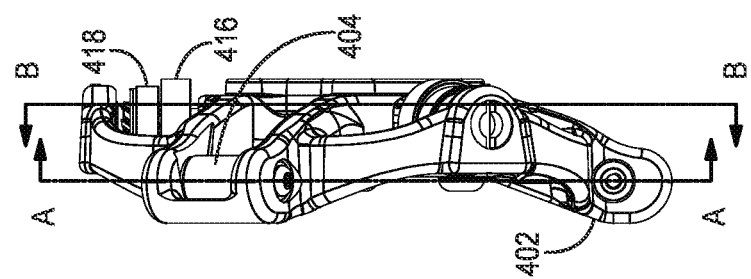
Figure 5E:
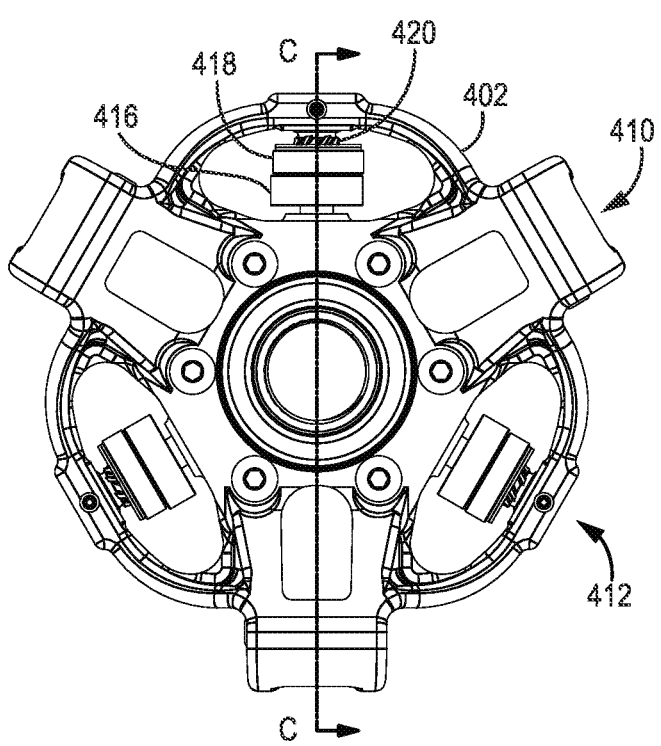
Figure 5F:
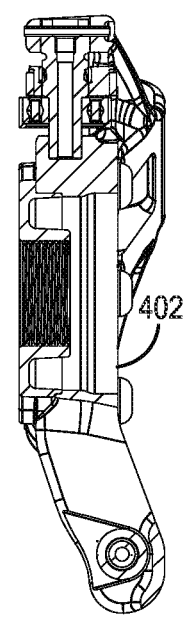
Figure 5I:
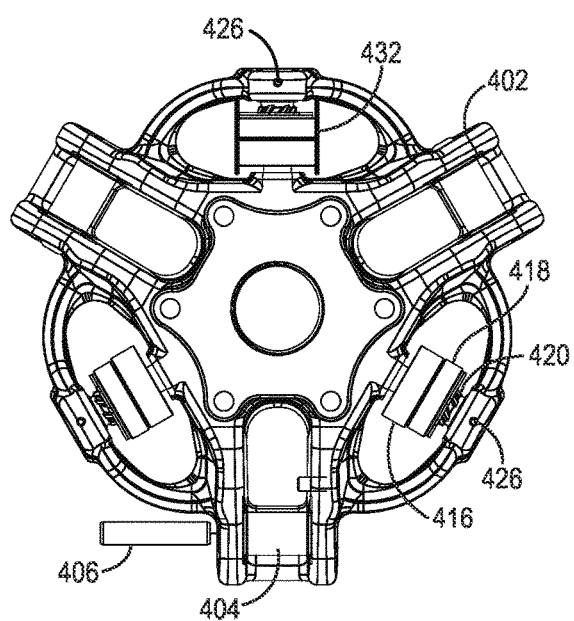
Figure 5J:
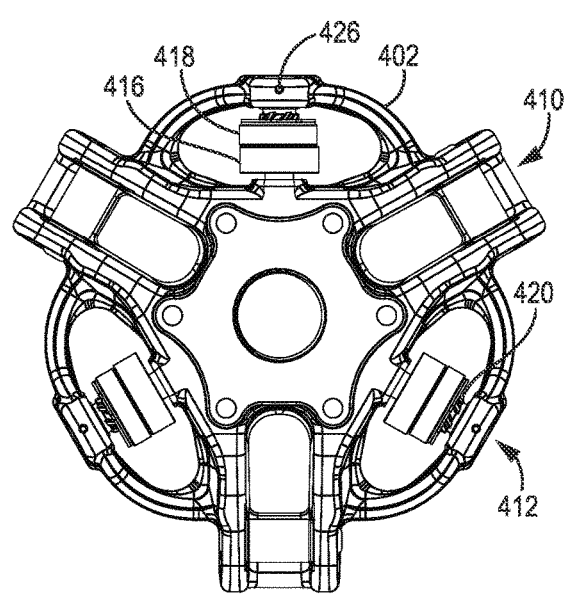

FIGS. 5A-J illustrate perspective and cross-sectional views of CVT snow spider with roller-roller torque transfer assembly in a no wear configuration, according to some embodiments. In the no wear configuration, the positioning of the torque bearing assembly 416 and eccentric roller assembly 418 are immediately adjacent, as the eccentric roller assembly 418 has not started climbing the helixed path of the torque pin 420. Line 432 of FIG. 5I shows the offset, but with new or nearly new parts showing no substantial wear.

Figure 6A:
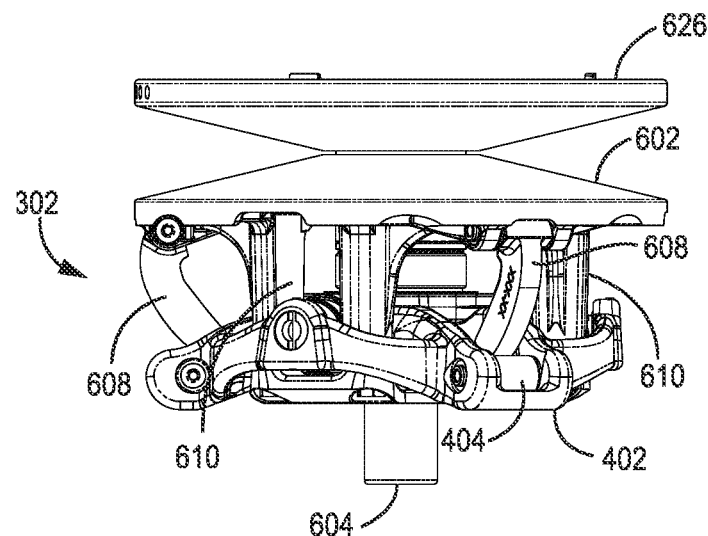
Figure 6B:
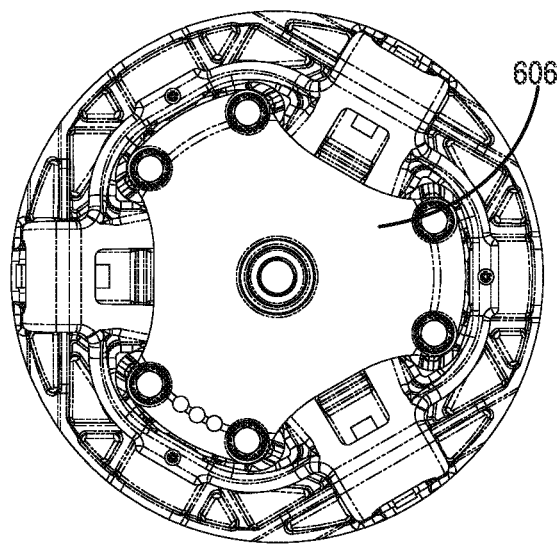
Figure 6C:
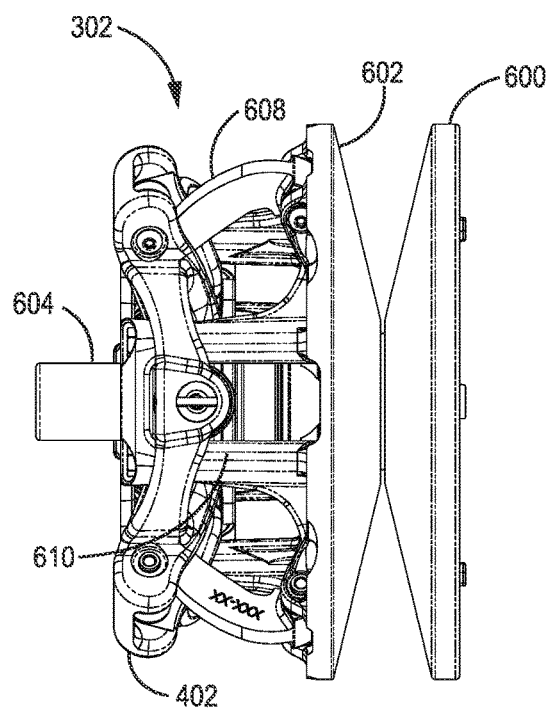
Figure 6D:
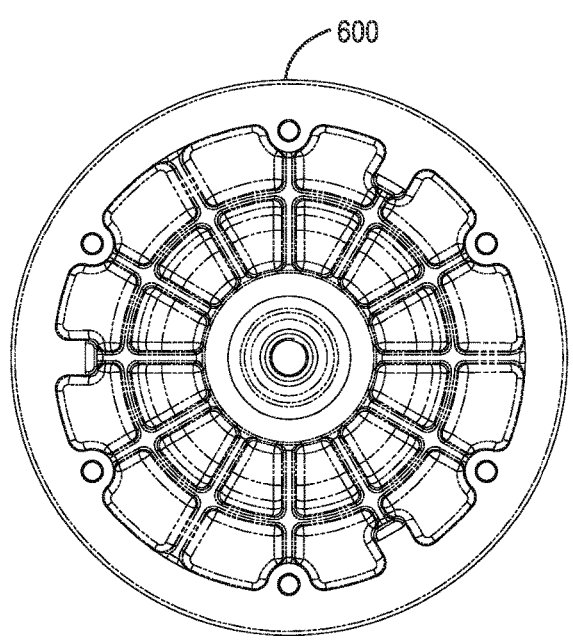
Figure 6E:
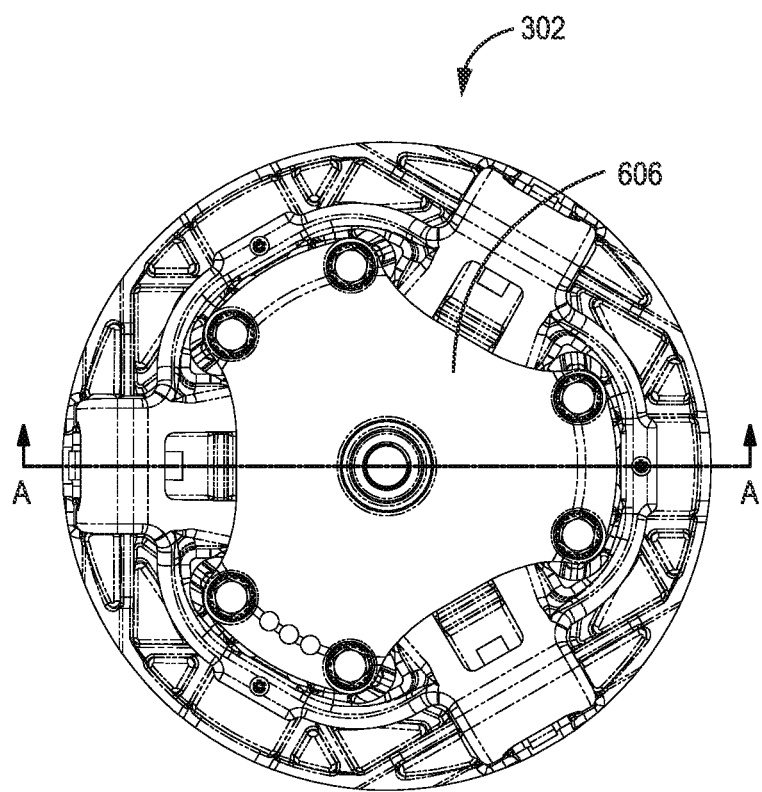
Figure 6H:
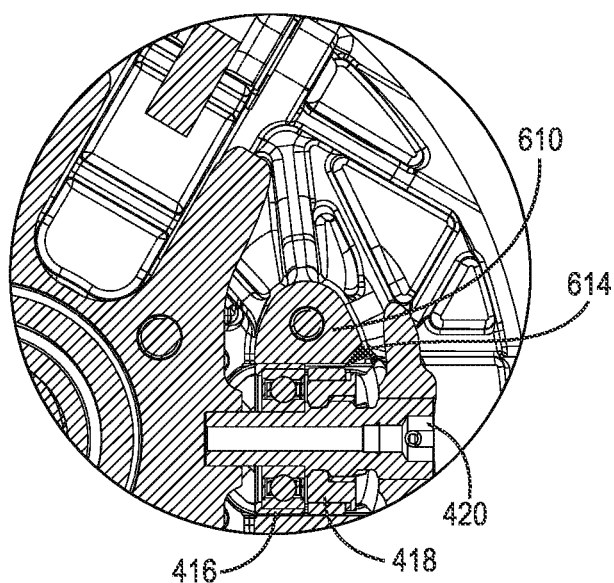
Figure 7D:
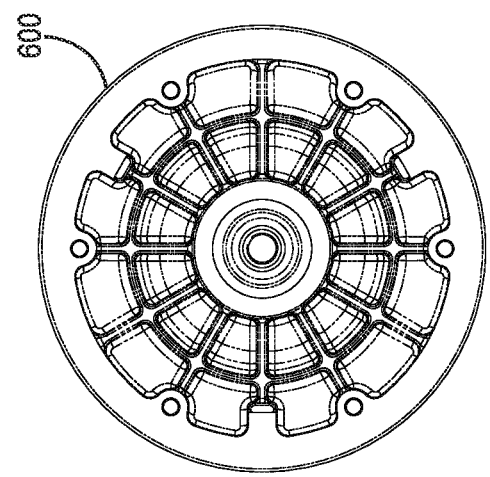
FIGS. 7A-H illustrate perspective and cross-sectional views of CVT drive clutch with roller-roller torque transfer assembly in a wear and full shift configuration, according to some embodiments.
Figure 7C:
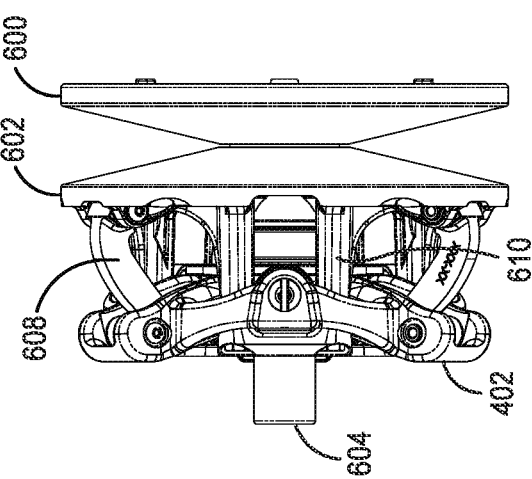
Figure 7A:
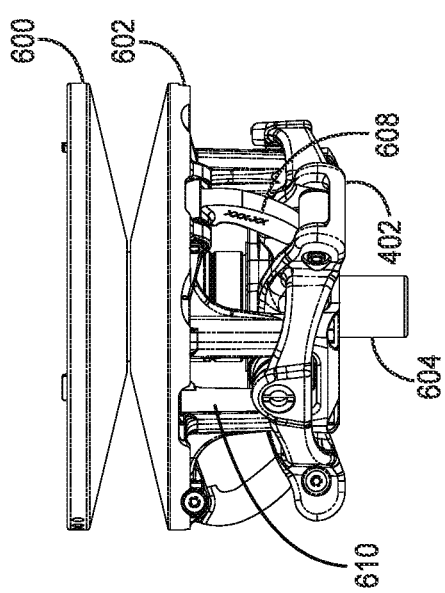
Figure 7B:
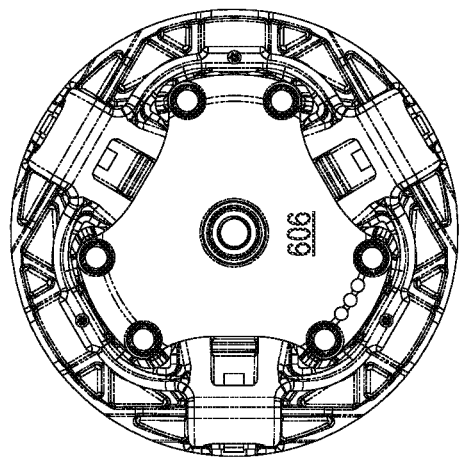
Figure 7E:
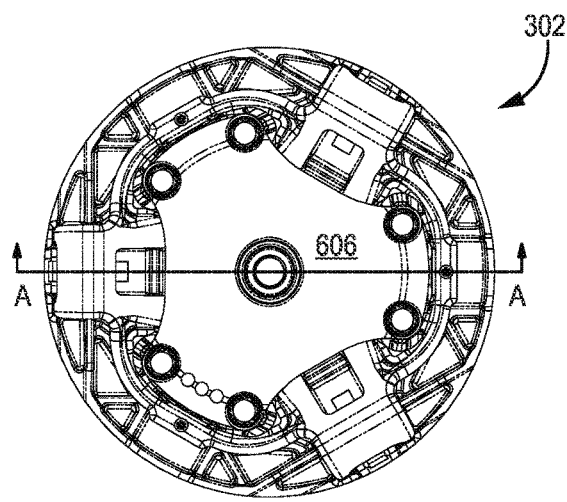
Figure 7F:
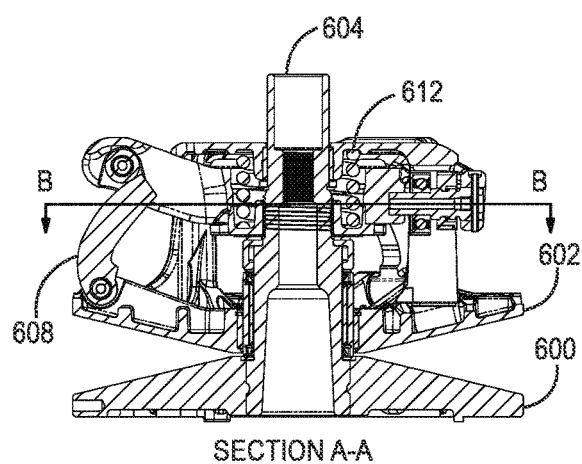
Figure 7G:
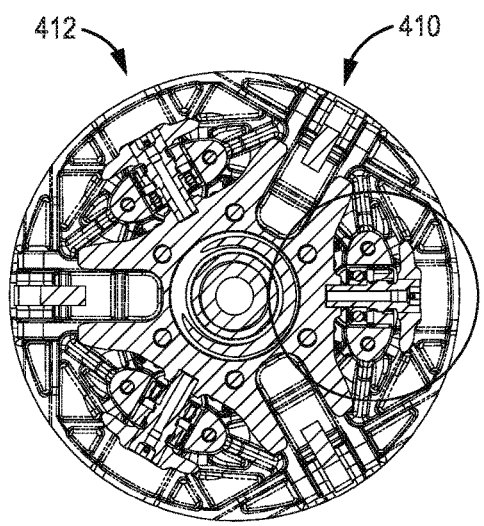
Figure 7H:
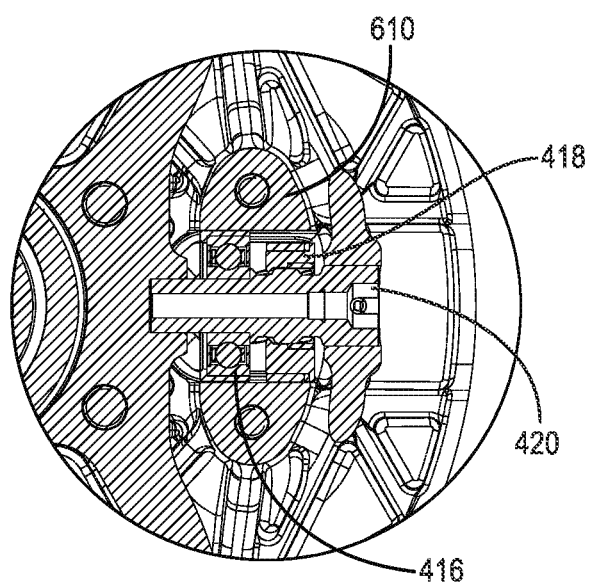
Figure 8A:
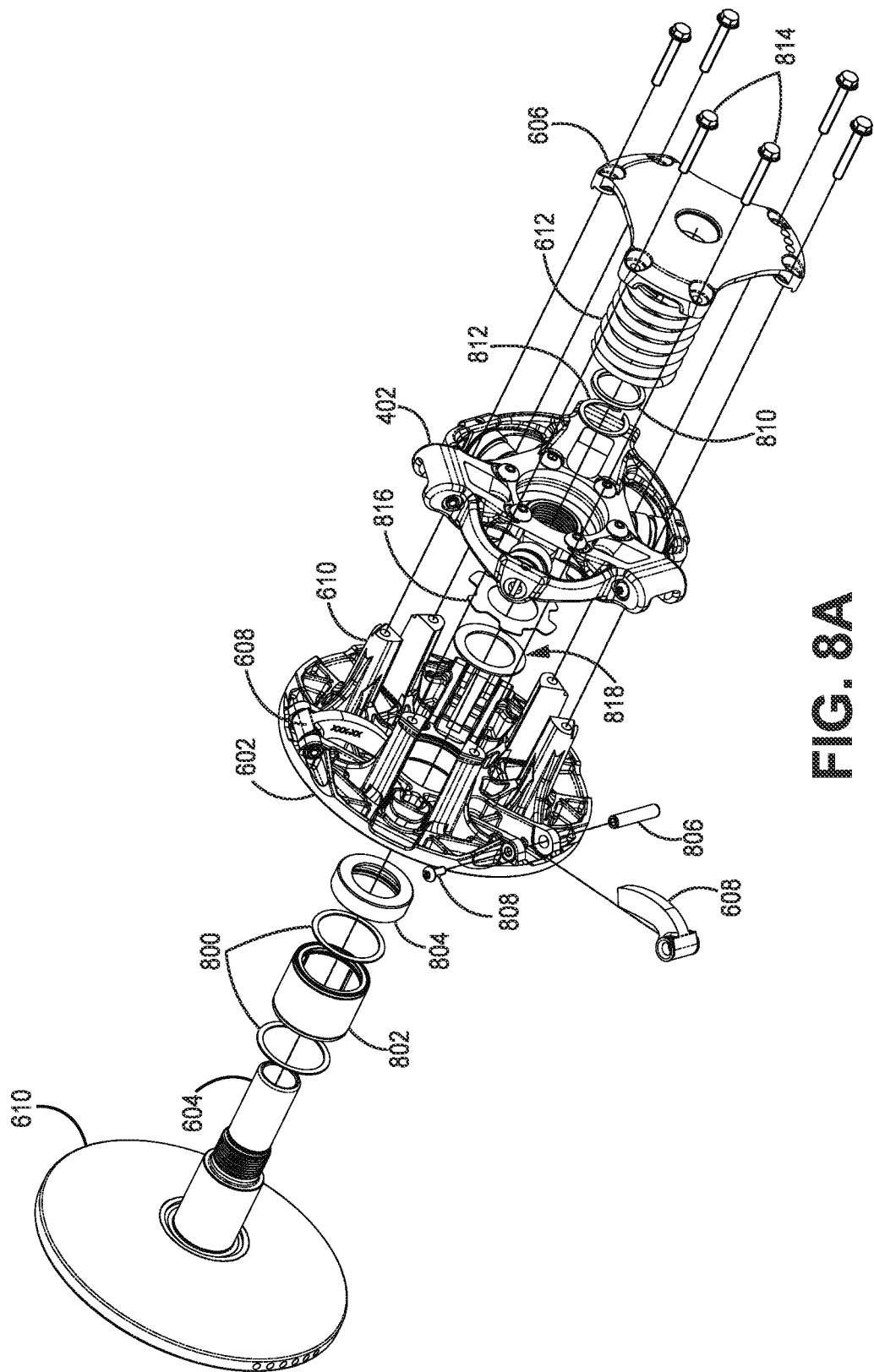
FIGS. 8A-I illustrate exploded, perspective and cross-sectional views of CVT drive clutch with roller-roller torque transfer assembly in a wear and no shift configuration, according to some embodiments.
Figure 8E:
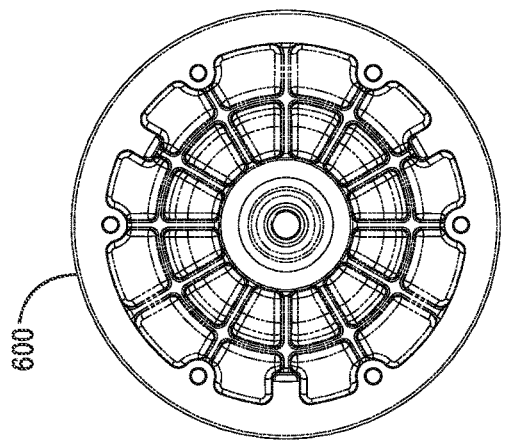
Figure 8D:
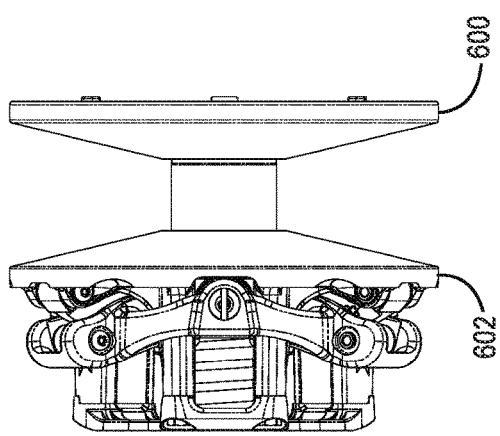
Figure 8B:
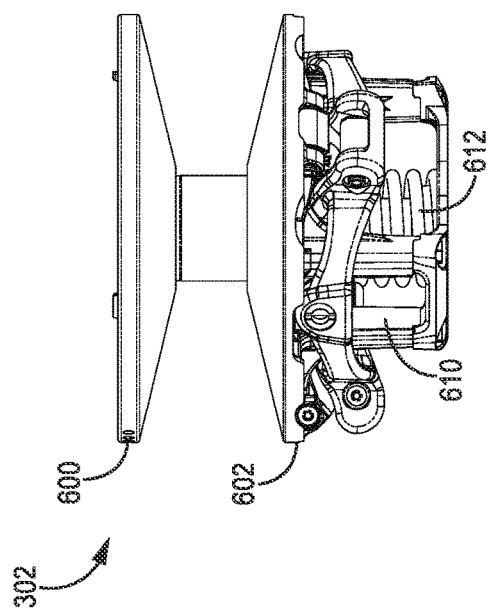
Figure 8C:
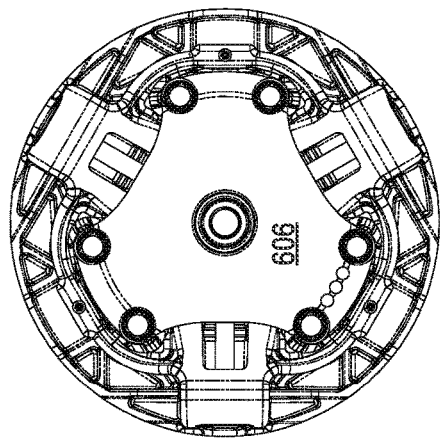
Figure 8F:
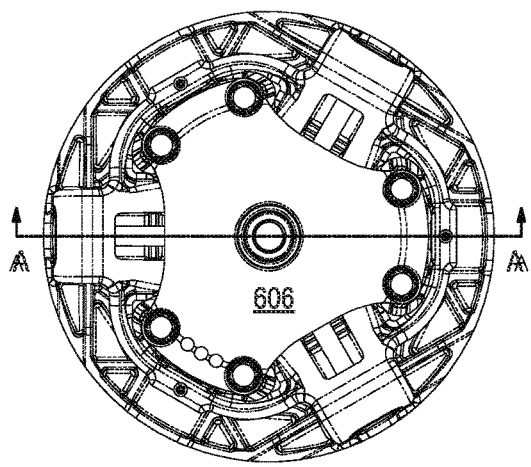
Figure 8G:
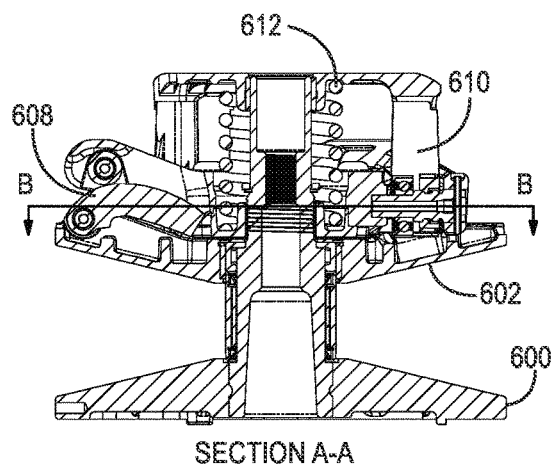
Figure 8H:
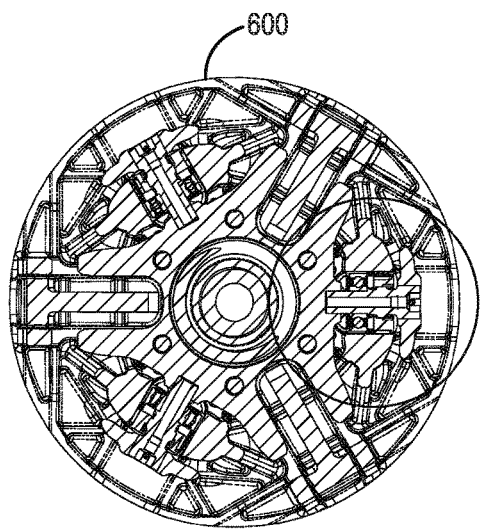
Figure 8I:
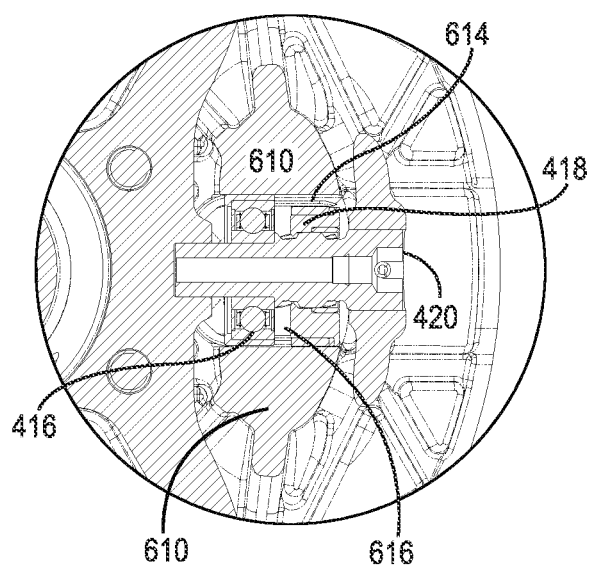
Figure 9B:
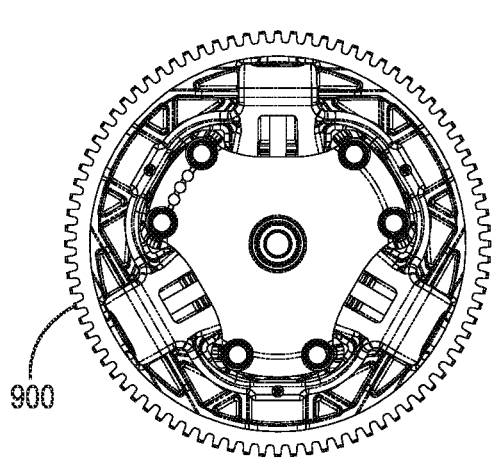
Figure 9E:
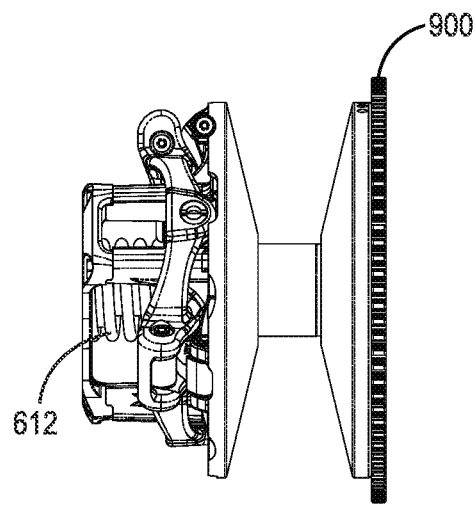
Figure 9C:
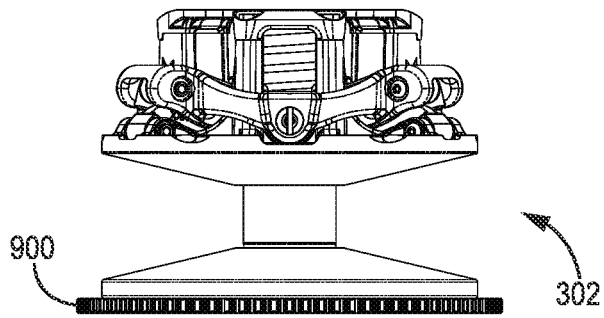
Figure 9D:
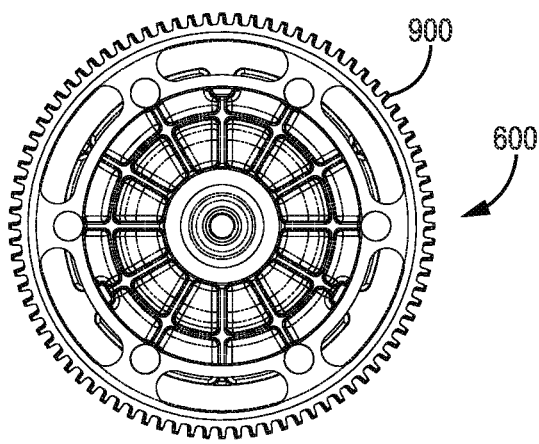
Figure 9F:
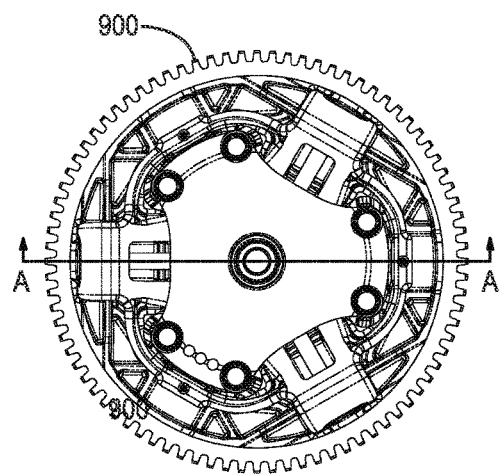
Figure 9H:
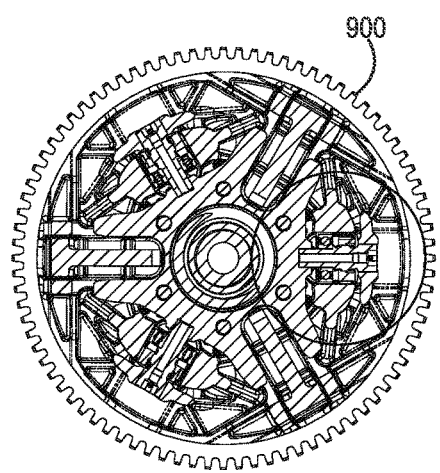
Figure 9G:
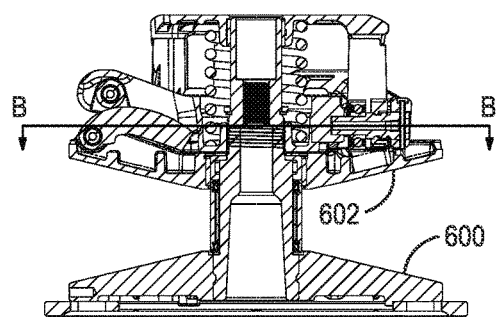
Figure 9I:
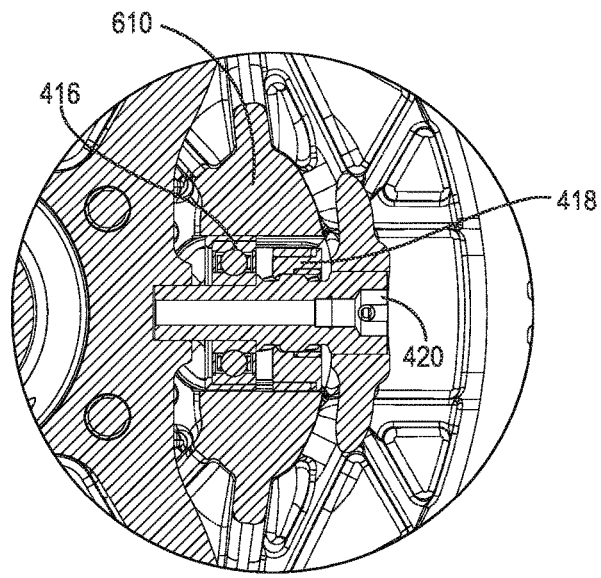
Figure 10A:
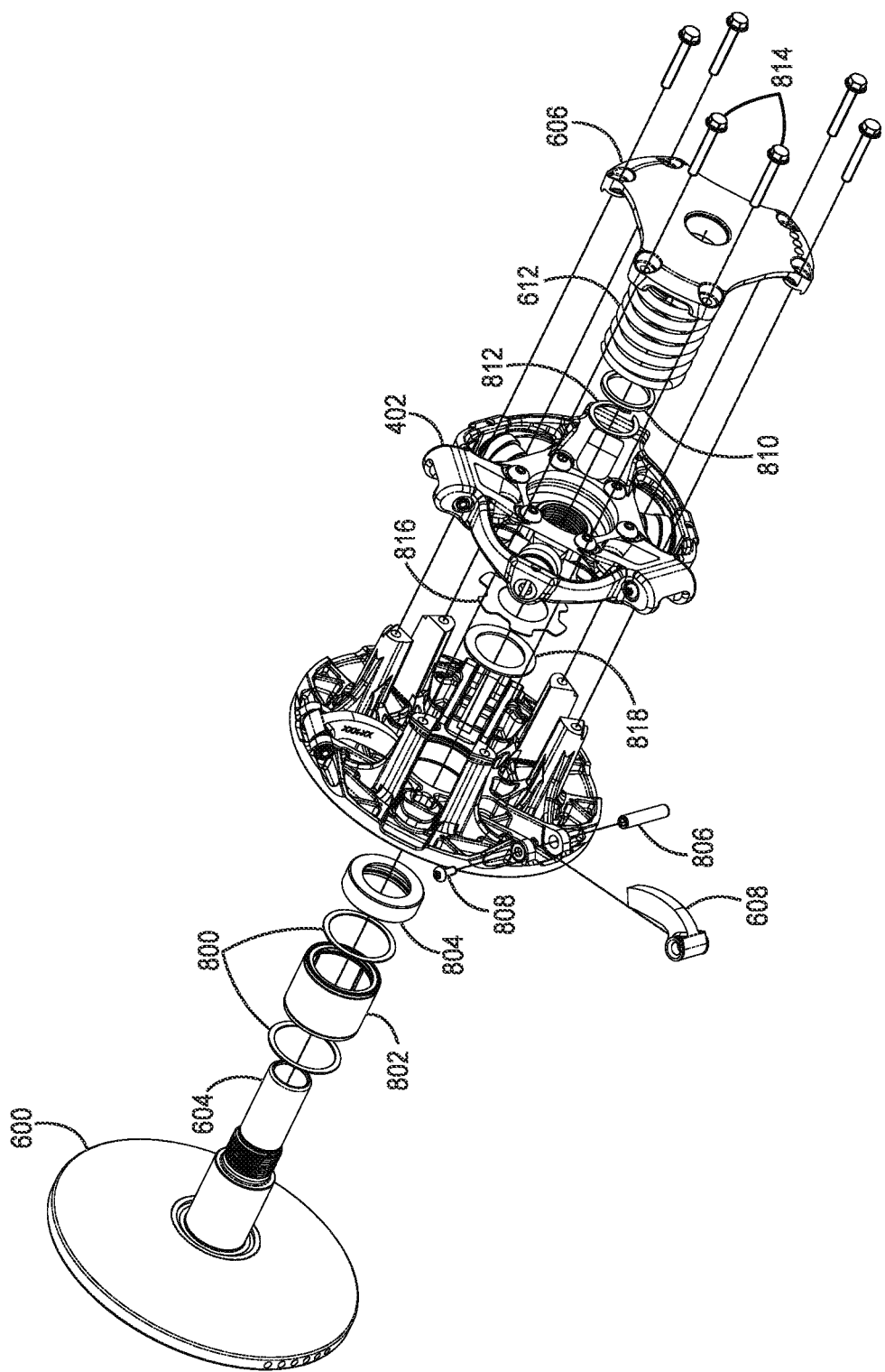
FIGS. 10A-J illustrate exploded, perspective and cross-sectional views of CVT drive clutch with roller-roller torque transfer assembly in a no wear and no shift configuration, according to some embodiments.
Figure 10B:
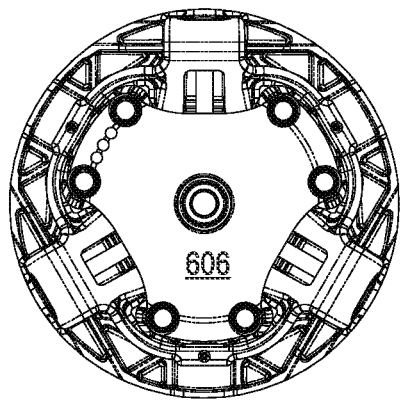
Figure 10E:
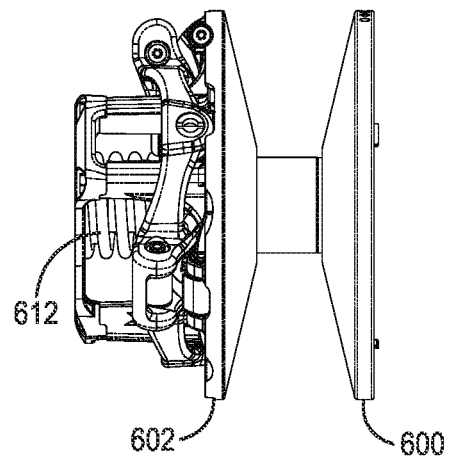
Figure 10C:
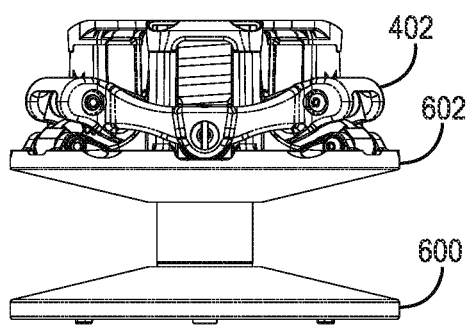
Figure 10D:
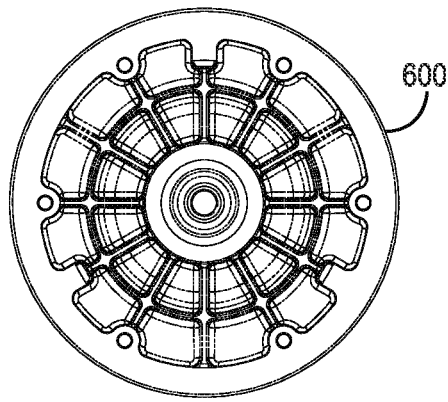
Figure 10F:
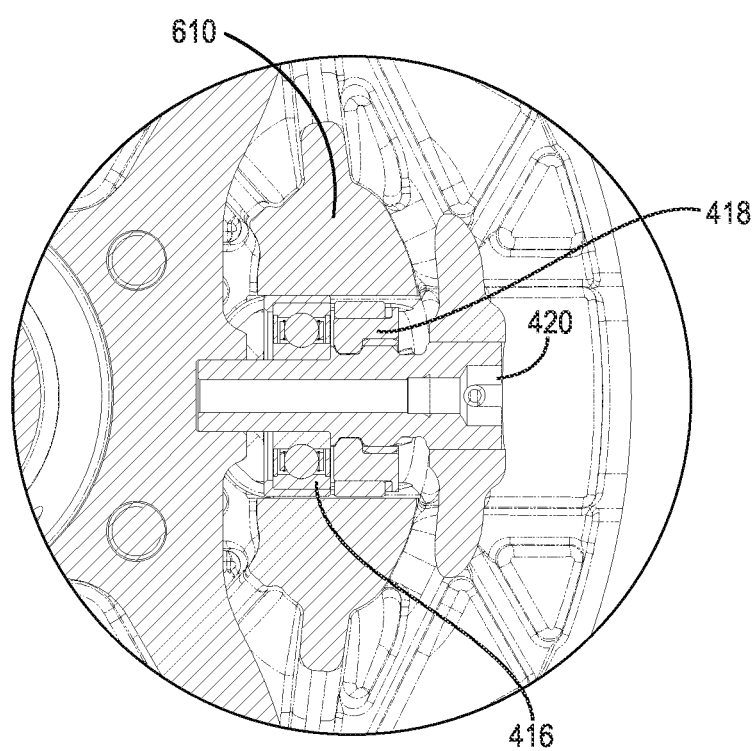
Figure 10G:
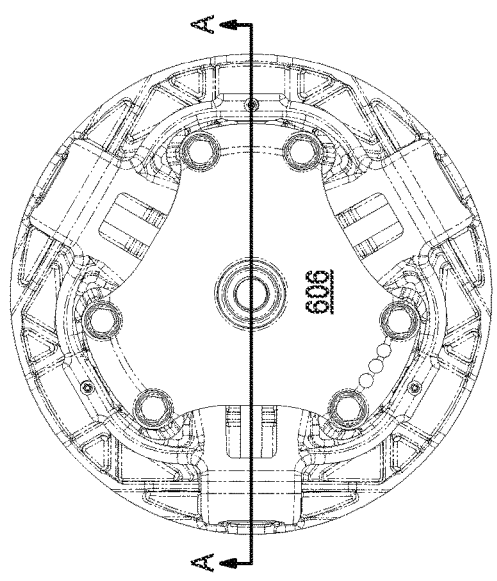
Figure 10H:
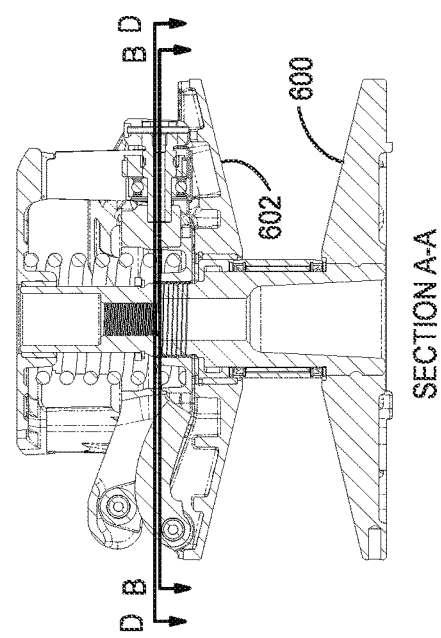
Figure 10I:
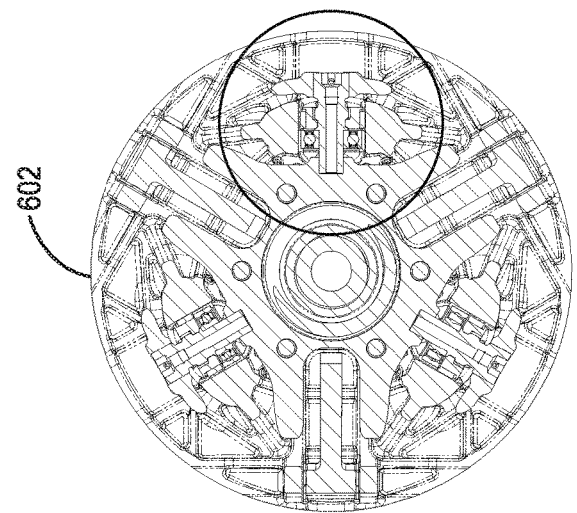
Figure 10J:
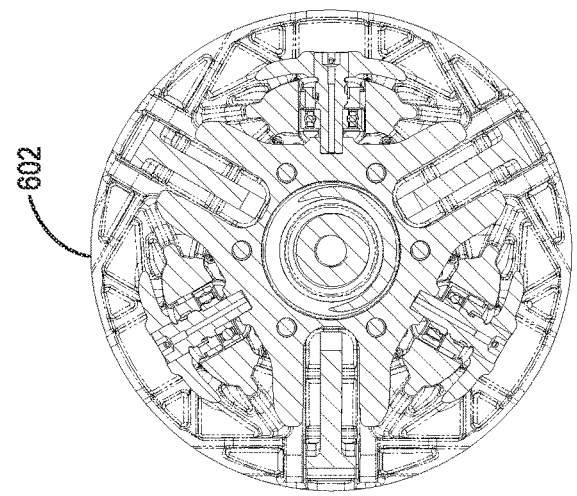

FIGS. 6A-H illustrate perspective and cross-sectional views of CVT drive clutch with roller-roller torque transfer assembly in a no wear and full shift configuration, according to some embodiments. In all fully shifted configurations, stationary sheave 600 and moveable sheave 602 are in close proximity or in contact near an axial line. As the drive clutch 302 shifts, the cam arms 608 push away from and on rollers 404, moving the sheaves 600, 602 together. The moveable sheave 602 rides along stationary post or shaft 604. The spider 402 is in contact with a plurality of towers 610 of the moveable sheave 602. The towers 610 are shorter and positioned further inward than traditional moveable sheaves 602. The torque transfer device assembly 412 is in contact with the towers 610, which can incur wear as the CVT is engaged. The enhanced cross-sectional view in FIG. 6H shows the offset gap 614 between eccentric roller assembly 418 and tower 610. FIGS. 7A-H illustrate perspective and cross-sectional views of CVT drive clutch with roller-roller torque transfer assembly in a wear and full shift configuration, according to some embodiments.

FIGS. 8A-I illustrate exploded, perspective and cross-sectional views of CVT drive clutch with roller-roller torque transfer assembly in a wear and no shift configuration, according to some embodiments. A stationary post or shaft 604 of a stationary sheave 600 can be in contact with one or more thrust washers 800, idler bearing 802, and collar 804 before assembly with moveable sheave 602. The collar 804 can act as an extension of the stationary shaft, concentric to the idler bearing allowing the moveable sheave to transition from collar to idler bearing 802 as the sheave travels axially. The collar 804 can be optionally integrated into the shaft 604. One of more of thrust washers 800 can be integrated with collar 804 or idler bearing 802. Alternatively, spider body 402 or hub 427 can integrate collar 804 and one or more thrust washers 800 or spacers/washers 816,818. In one embodiment, the hub can be machined to include spacers/washers 816, 818. An inner belt rides on the bearing 802 prior to clutch engagement. This configuration also allows for more consistent belt tensions and lessens or eliminates the need for a user to manually adjust driven clutch sheave spacing, affecting belt deflection and drive ratio. The idler bearing 802 can be a two-way or multi-directional roller bearing positioned on an input shaft (either directly or indirectly) and in contact with an interior surface of the belt. The positioning of bearing 802 allows for the input shaft to rotate while in idle without engaging the belt. The belt can maintain tension, even in idle, and a user does not have to periodically monitor and manually adjust belt tension. Further, the belt can now engage the sheaves at a lower position (closer to the input shaft) and in a lower powerband, accessing higher torque, lower speed applications.

Because the belt 306 is maintained at a higher tension (i.e., tighter) in idle, the neutral gap (gap between two sheaves when at idle state without belt) is larger and the sheaves move less to engage the belt 306. The belt gap (distance between the belt and each sheave) is also tighter, which contributes to more consistent belt 306 tension, better engagement out of idle and less movement needed by the sheaves to engage.

One or more cam arms 608 can be fastened to the moveable sheave with a cam arm pin 806 and cam arm pin fastener 808. Further, a spider body 402 engages the post 604 and sheave 602 at towers 610 and with calibration shim 816 and neutral gap washer 818. The calibration shim 816 affects the angle and range of cam arm 608 movement and pathing.

A cover 606 secures spring 612 (or other biasing member) while retaining ring 812 and optional shift stop 810 are installed onto the stationary shaft 604 prior to cover 606 and spring 612 installation. The spider 402 design allows for a greater recess to position spring 612. The retaining ring 812 provides an additional safety measure of securing the spider 402 in case of it loosening over time. The retaining ring 812 can be a snap ring for example. The ring 812 fits inside the diameter of the spring 612 and replaces the use of a traditional jam nut. In one embodiment, the retaining ring 812 can be positioned within a groove or recess (not shown) of the spider body 402 or shaft 604 Additionally, collar 804 can be positioned over the ring 812. The ring 812 can prevent full separation from stationary shaft 604. The shift stop 810 limits travel and prevents the sheaves 600, 602 from touching, preventing wear. The shift stop 810 can create a gap between sheaves 600, 602 of 0.1 mm to about 3.5 mm, about 0.5 mm to about 2.5 mm, or about 1 mm to about 2 mm, for example. The shift stop 810 can be in contact with a sheave shoulder 605, the shoulder configured in various thickness to speed or ratio requirements across different vehicle designs. Fasteners 814 secure the cover 606 to the spider body 402. A no shift configuration, the spring 612 provides tension to keep sheaves 600 and 602 apart until shifting is engaged. In a wear configuration, gap 614 shows the space between eccentric roller 418 and tower 610 and gap 616 shows the distance traveled up the helix of the torque pin 420.

Figure 11:
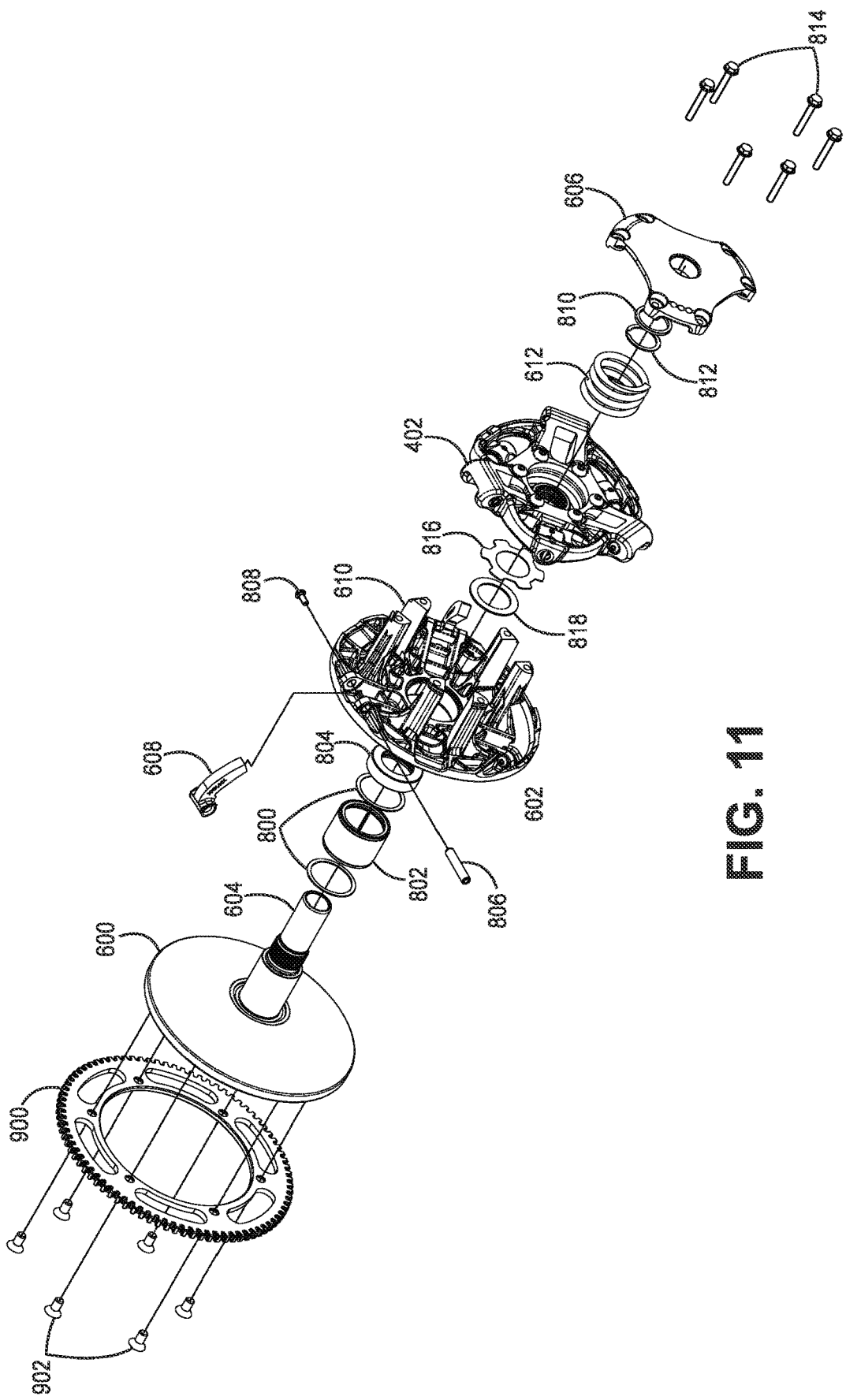
FIG. 11 illustrates an exploded view of CVT electric start drive clutch with button torque transfer assembly in a full shift configuration with shift stop, according to some embodiments.
Figure 12A:
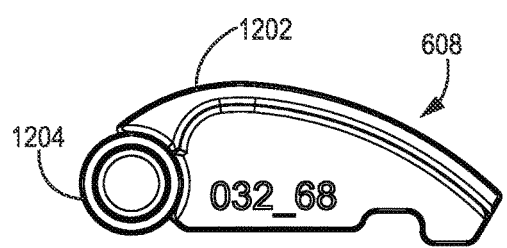
FIGS. 12A-I illustrate perspective and cross-sectional views of a cam arm, according to some embodiments.
Figure 12C:
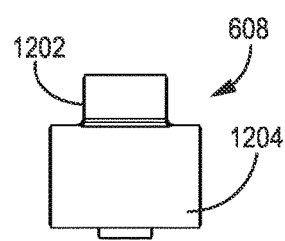
Figure 12E:
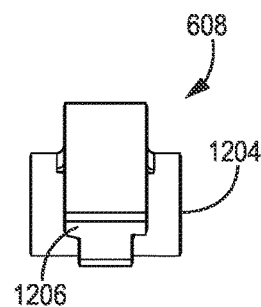
Figure 12B:
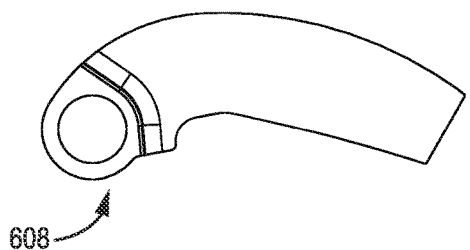
Figure 12D:
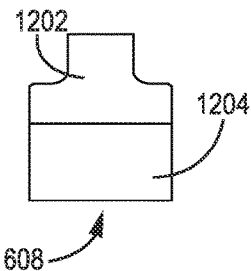
Figure 12F:
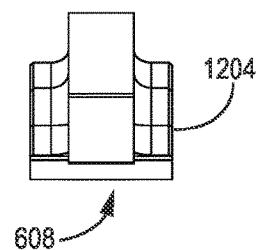
Figure 12G:
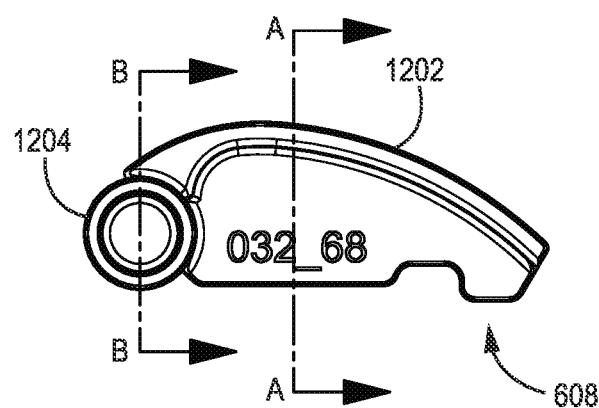
Figure 12H:
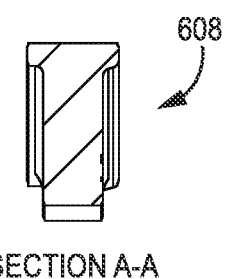
Figure 12I:
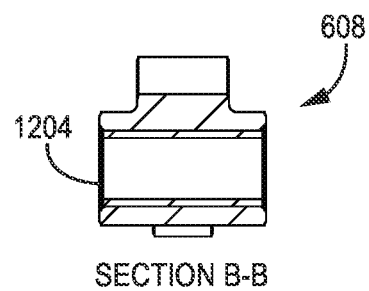
Figure 13A:
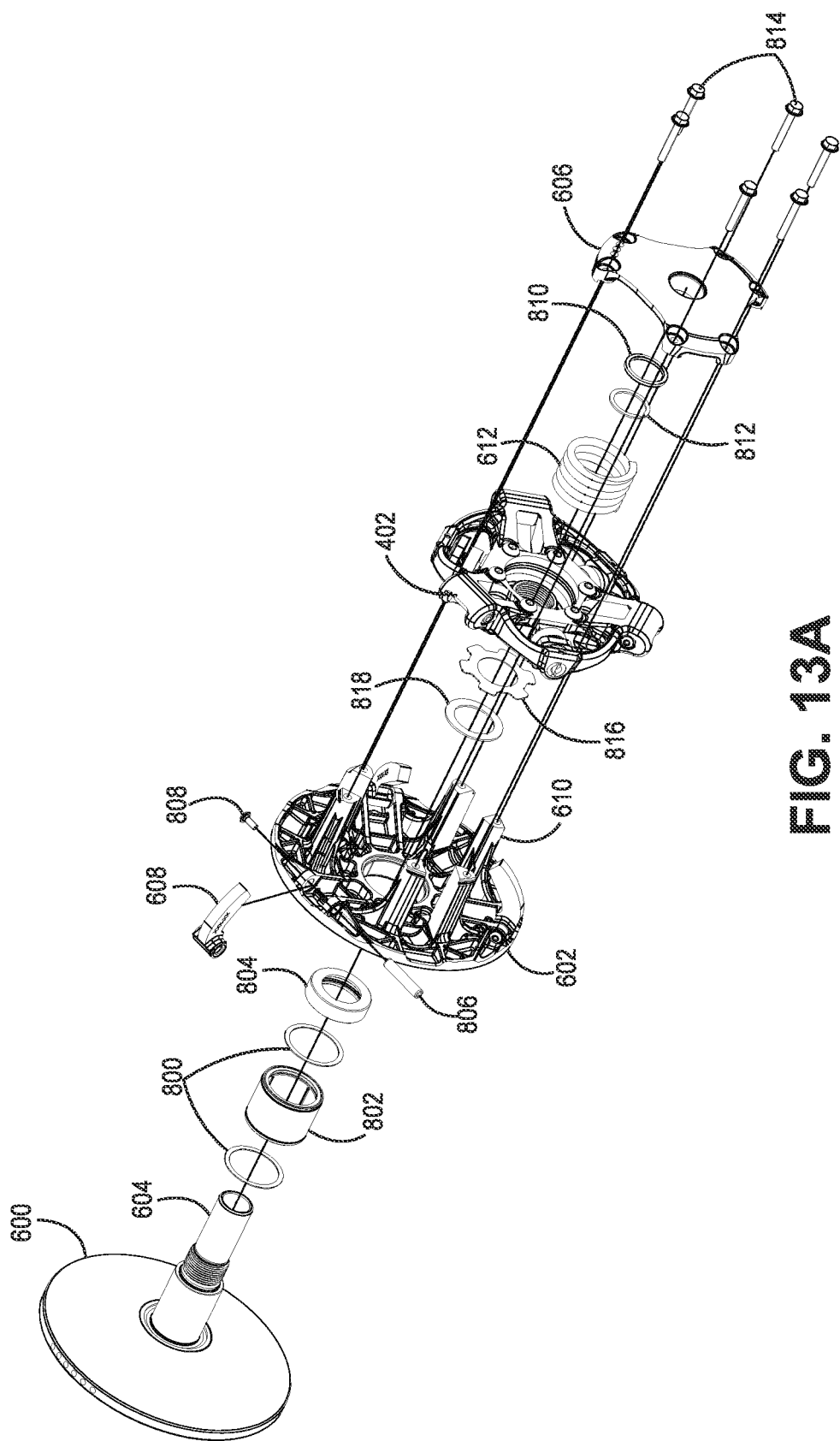
Figure 13F:
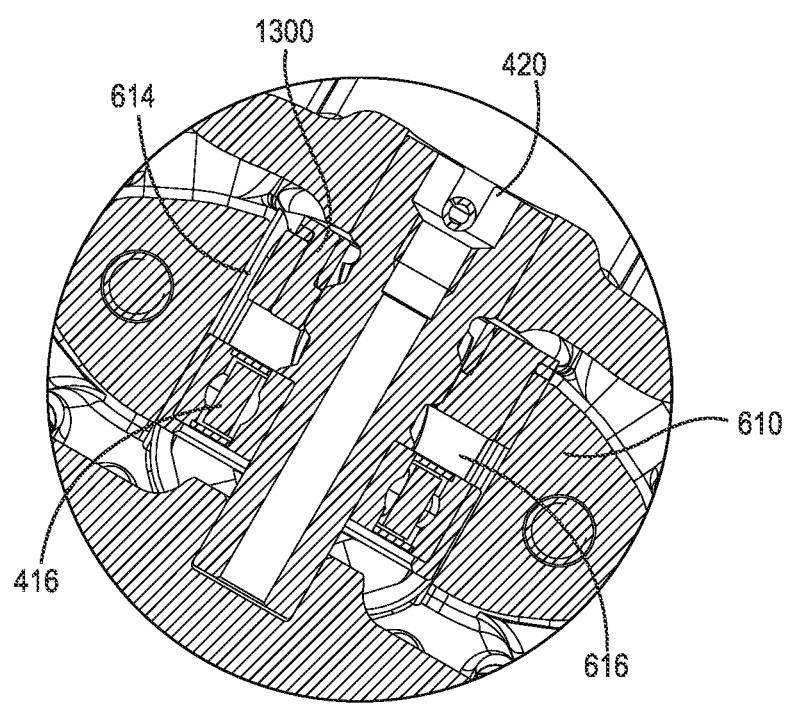
Figure 13G:
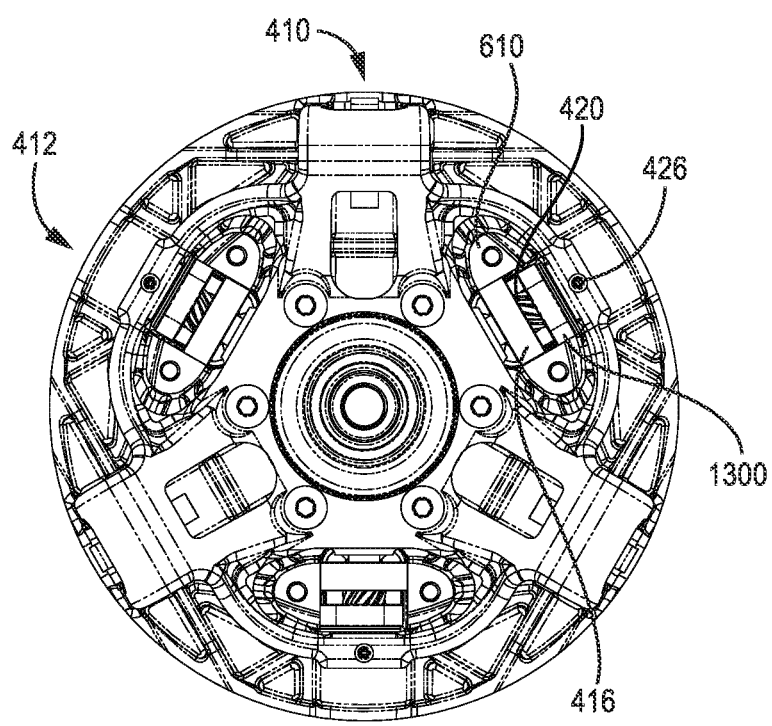
Figure 13H:
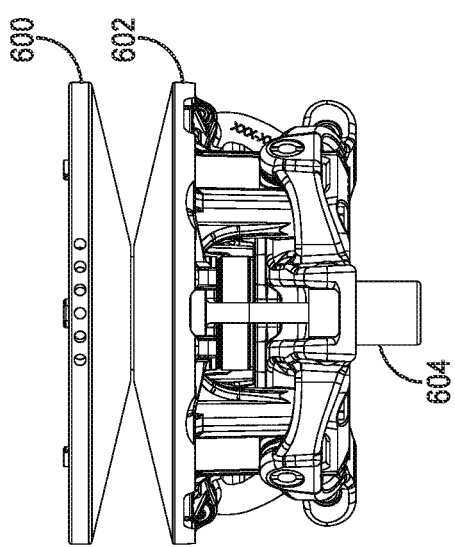
Figure 13I:
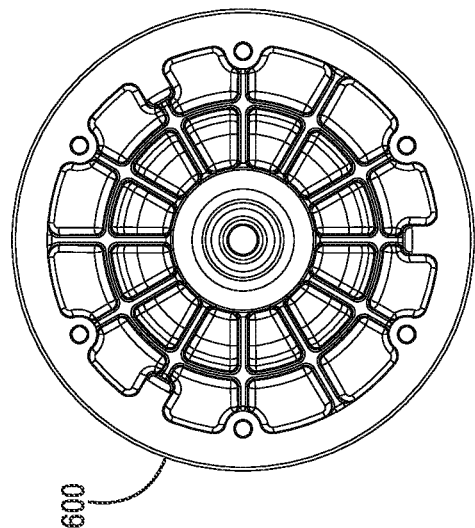
Figure 13J:
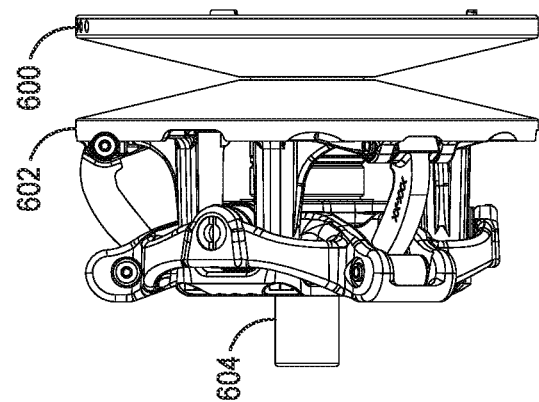
Figure 13K:
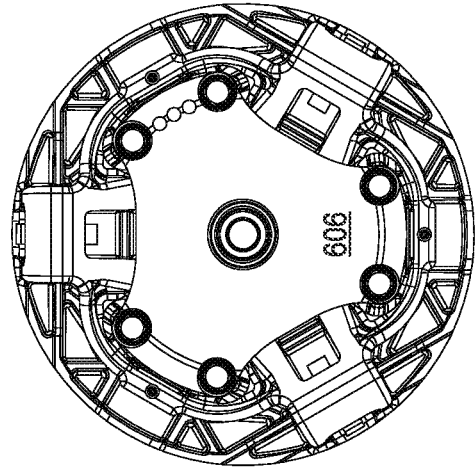
Figure 14D:
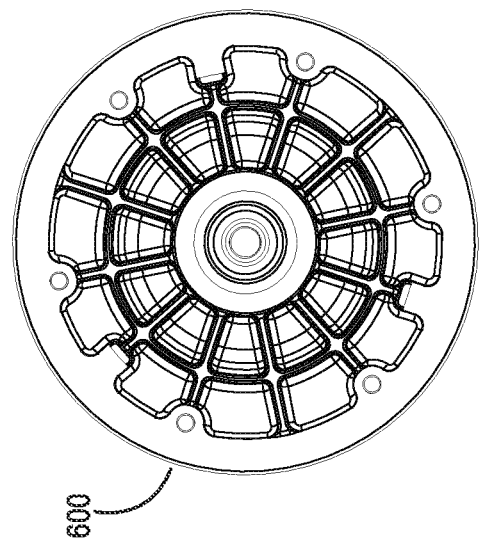
FIGS. 14A-J illustrate perspective and cross-sectional views of CVT drive clutch with slider-roller torque transfer assembly in a wear and no shift configuration, according to some embodiments.
Figure 14C:
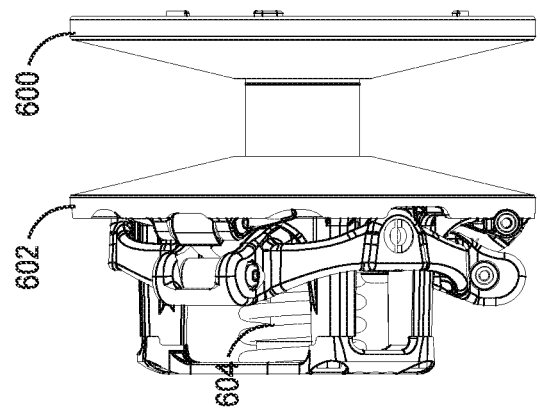
Figure 14A:
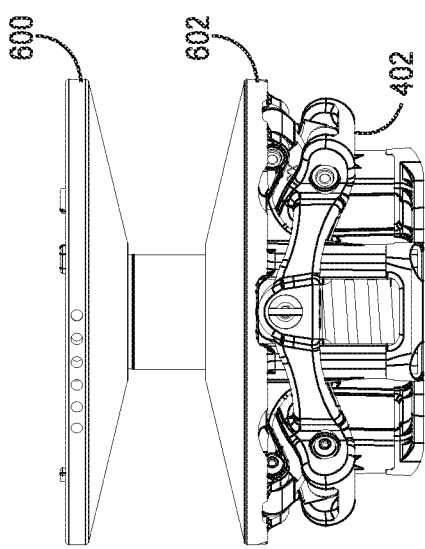
Figure 14B:
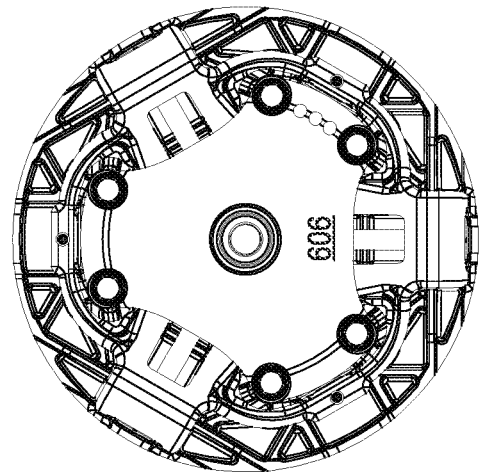
Figure 14E:
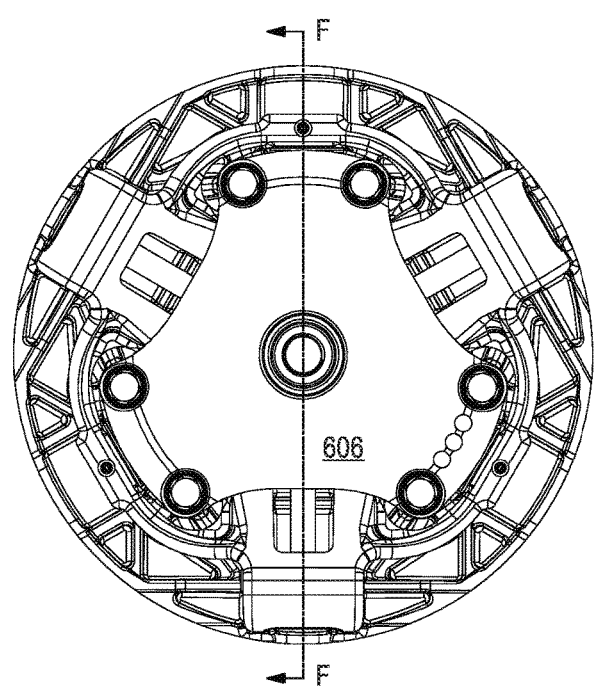
Figure 14F:
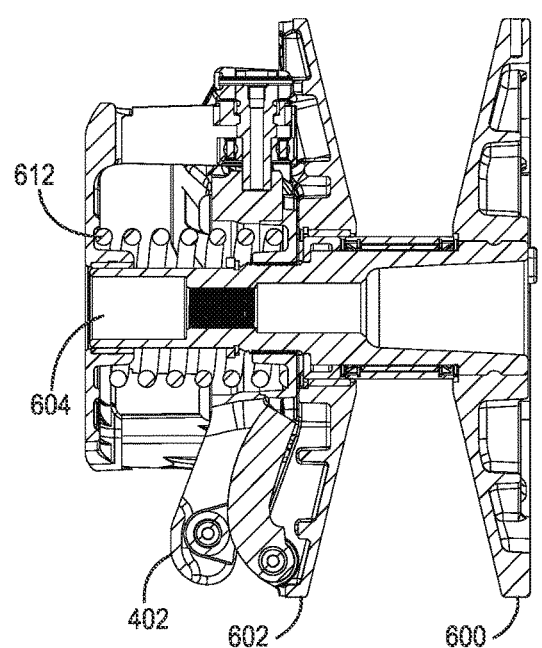
Figure 14G:
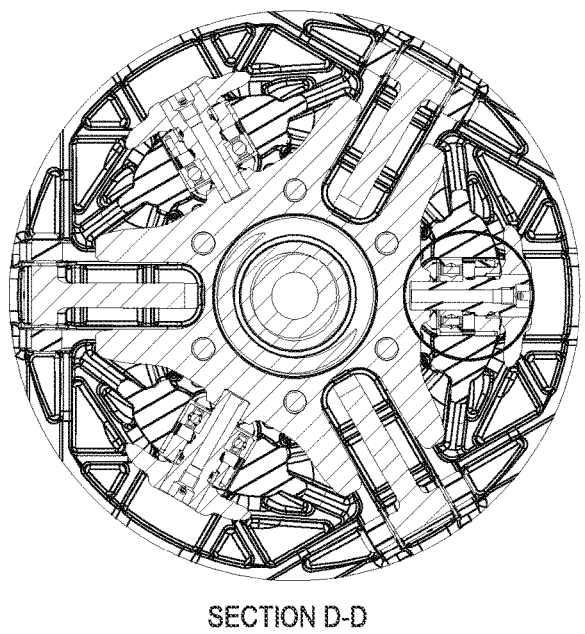
Figure 14H:
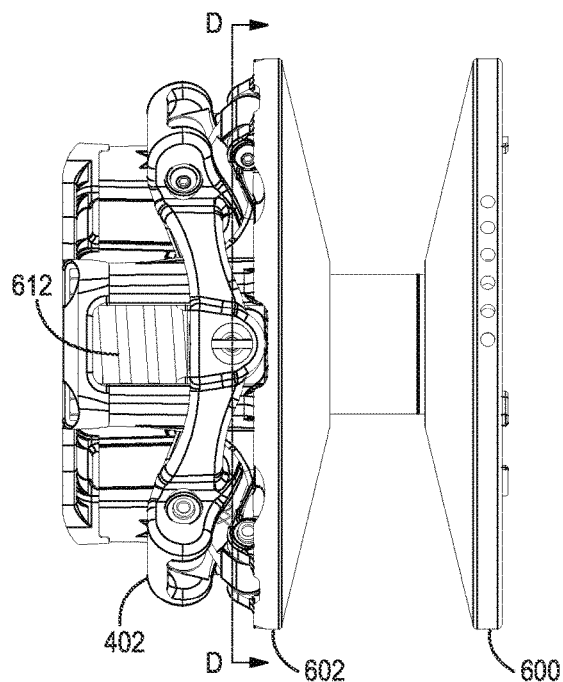
Figure 14I:
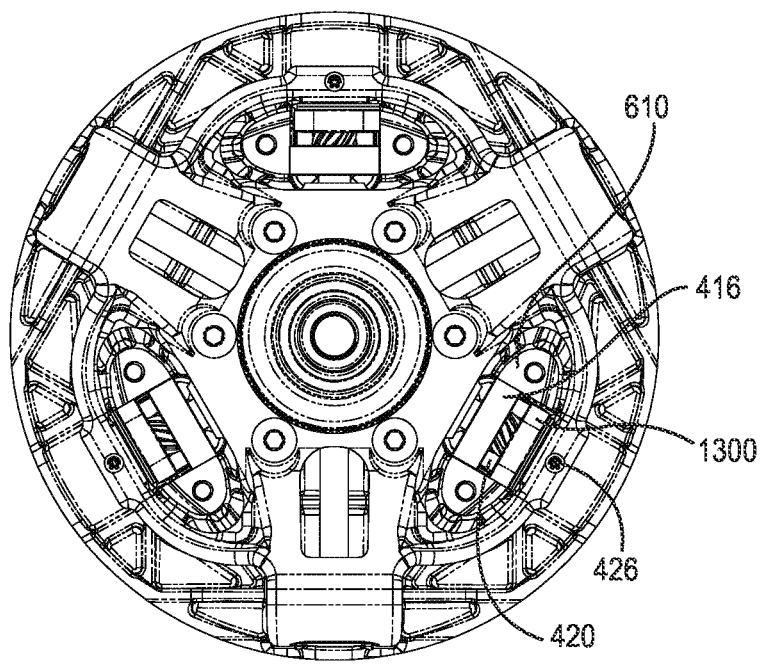
Figure 14J:
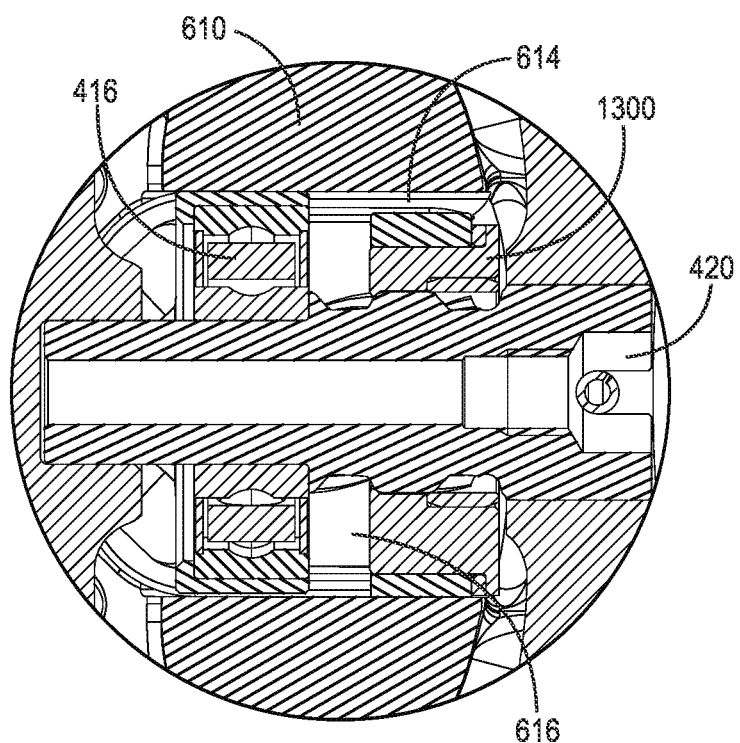
Figure 15A:
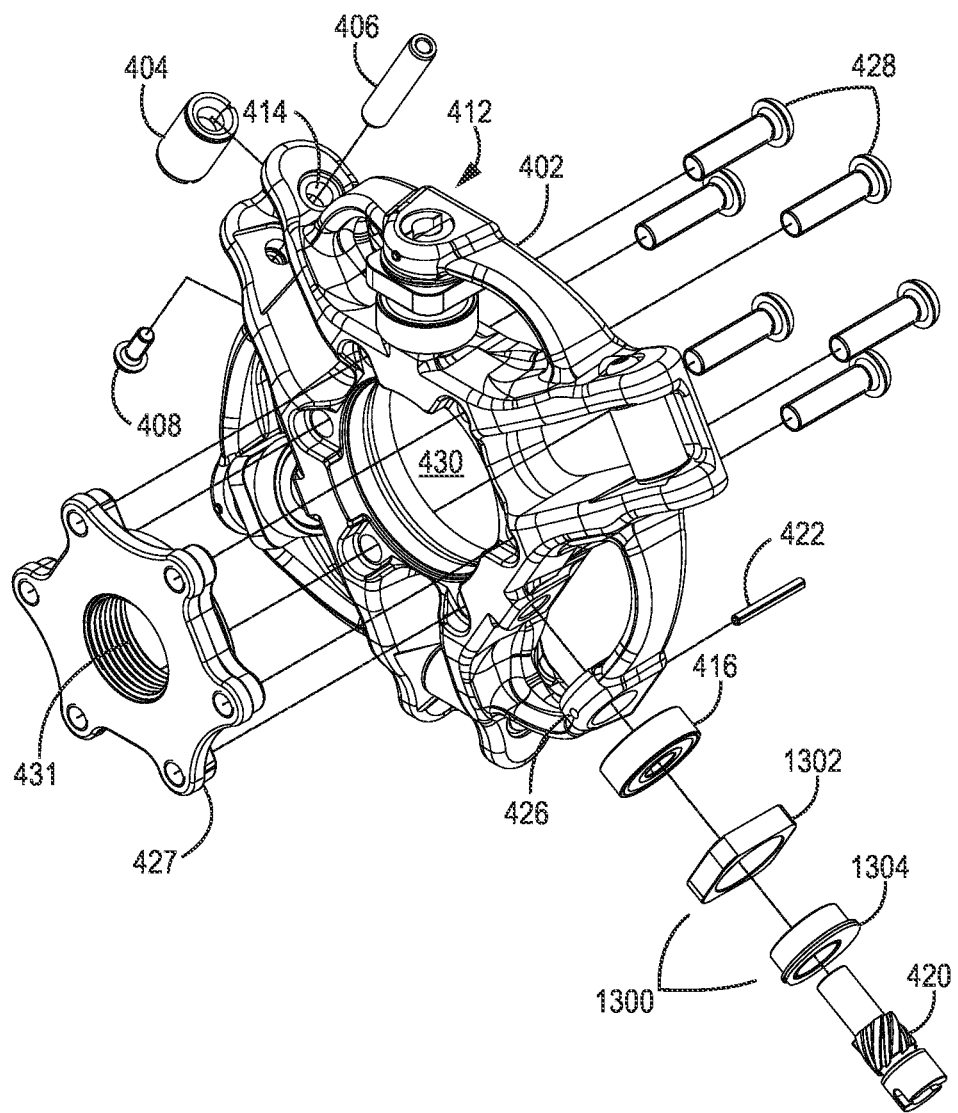
Figure 15F:
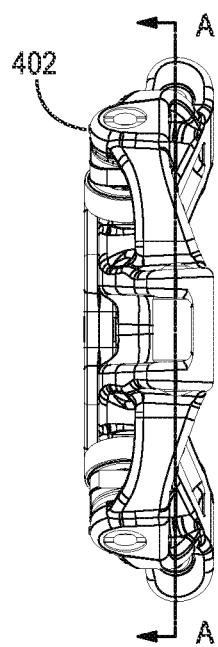
Figure 15G:
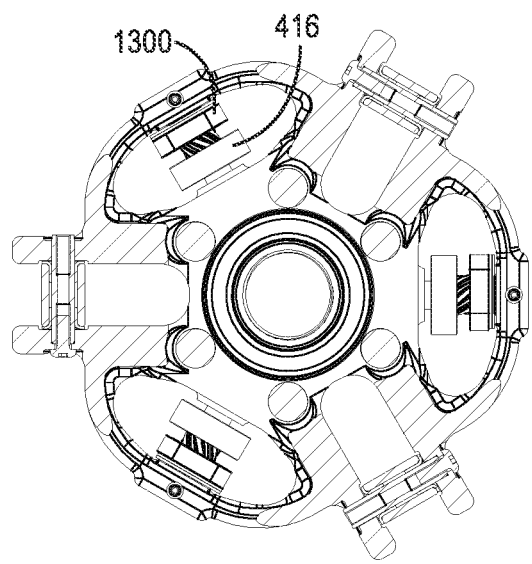
Figure 15H:
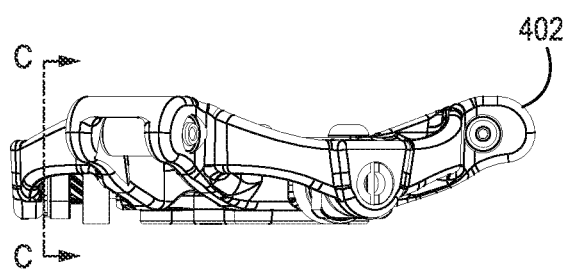
Figure 15I:
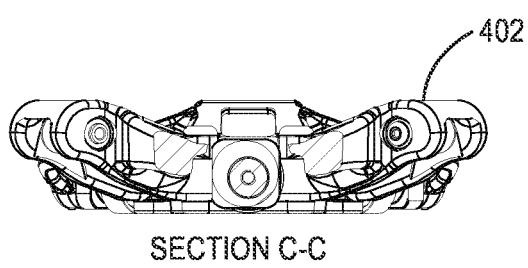
Figure 15J:
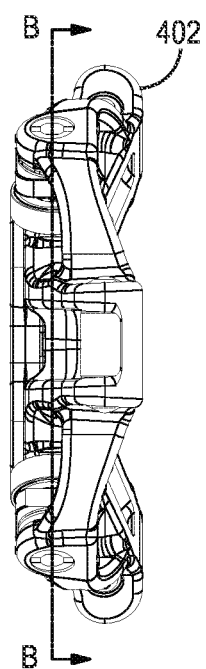
Figure 15K:
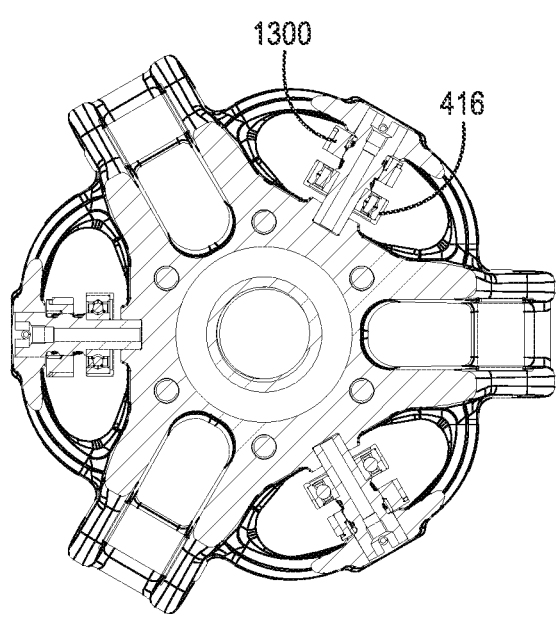
Figure 16A:
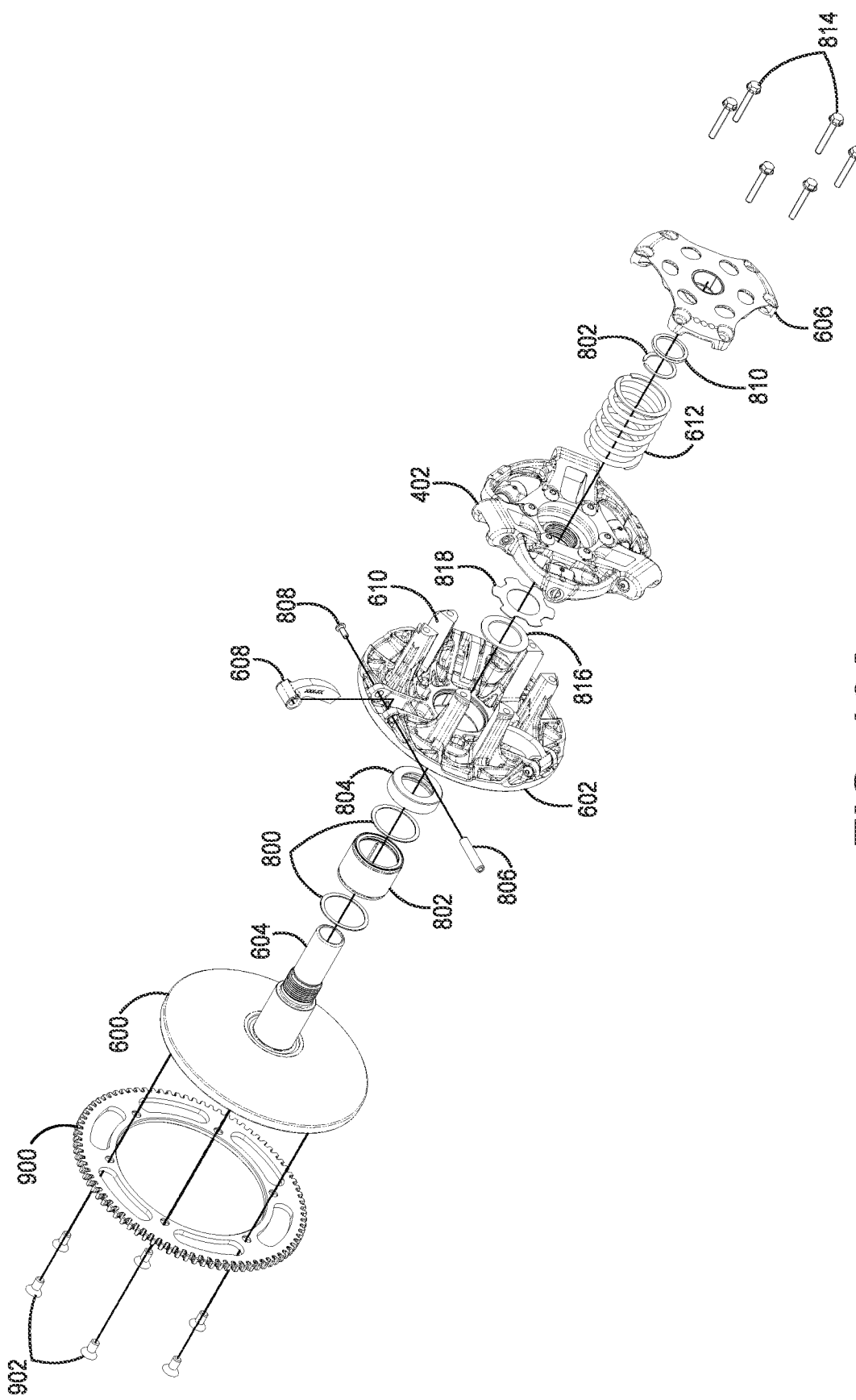
Figure 16D:
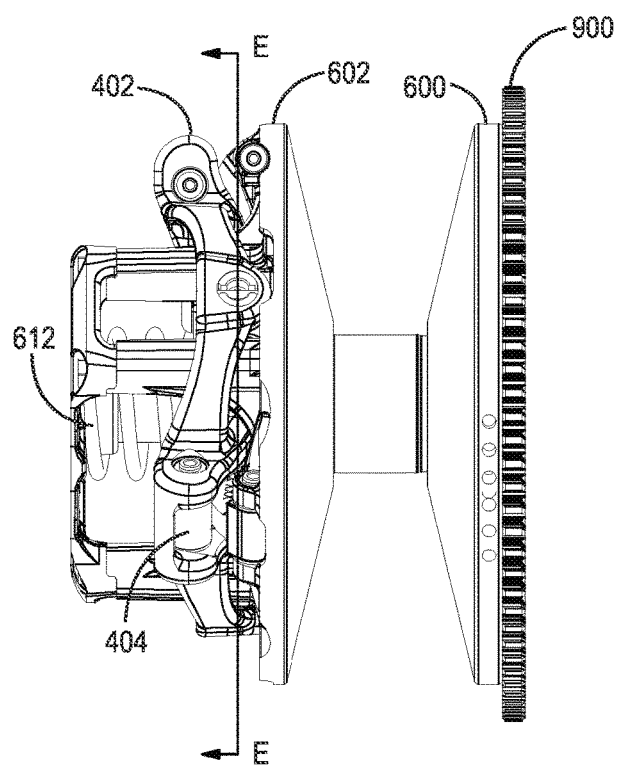
Figure 16E:
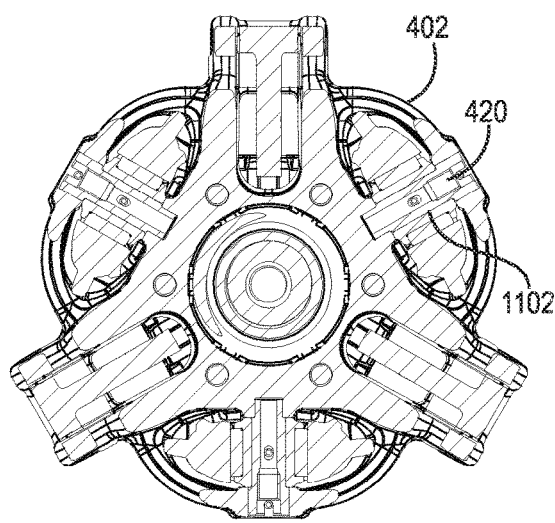
Figure 16F:
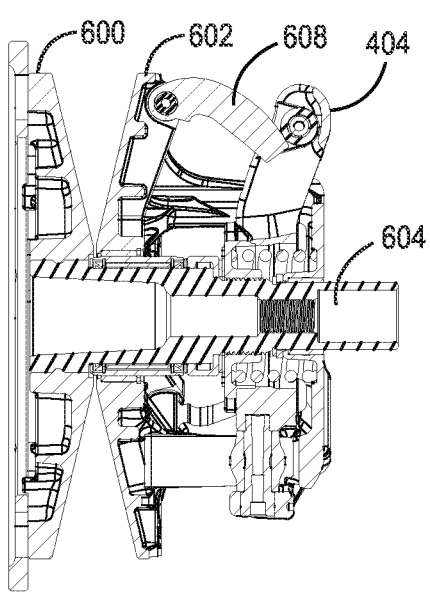
Figure 16G:
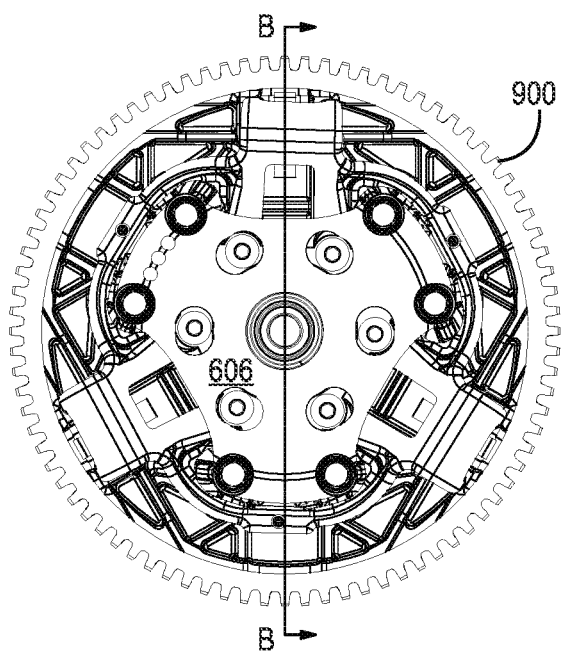
Figures 16H, 16I:
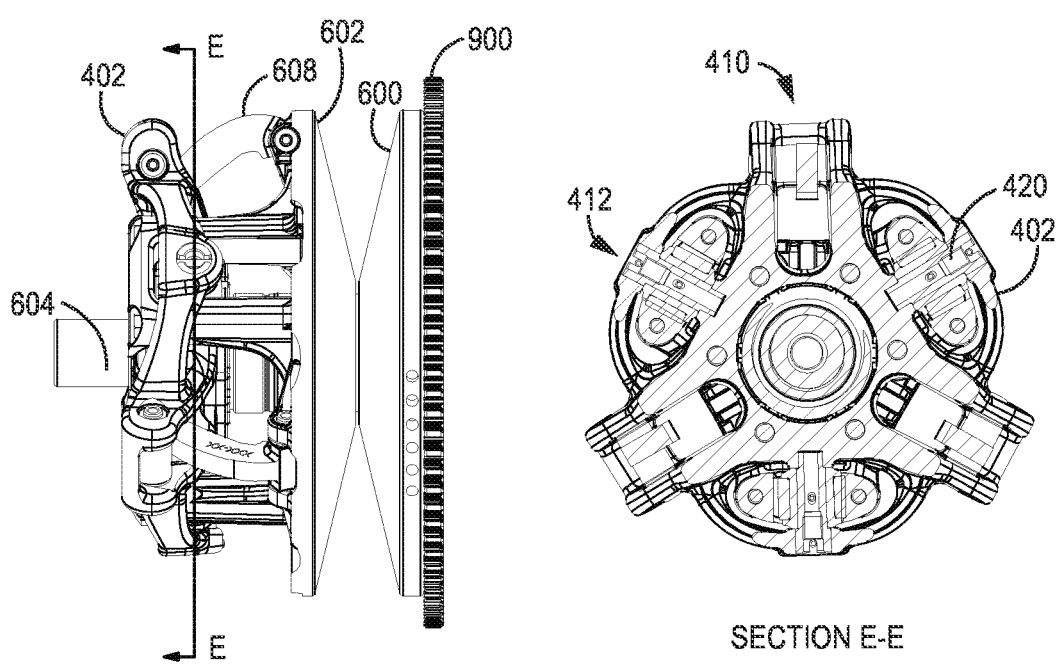
Figure 17A:
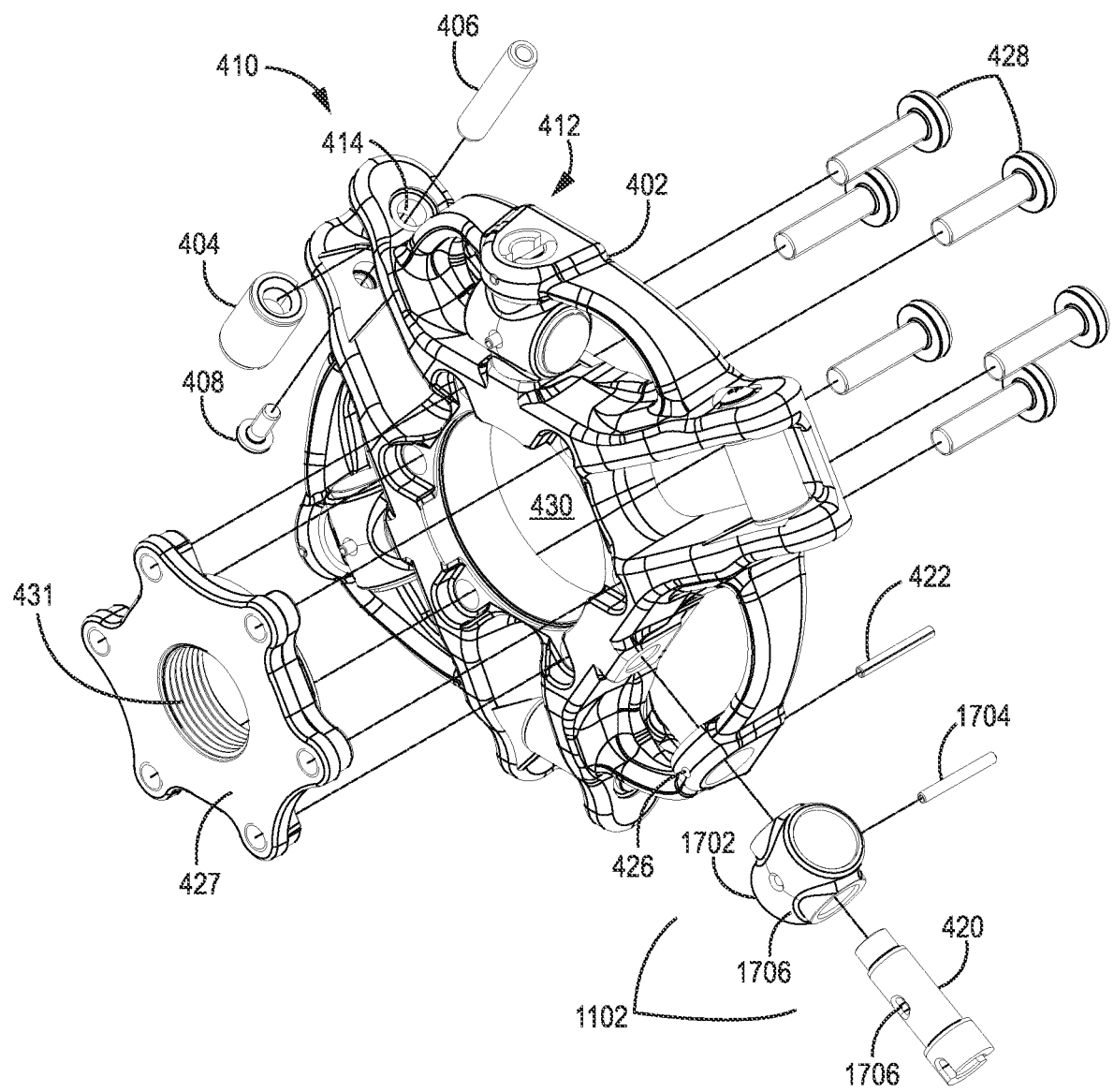
Figure 17D:
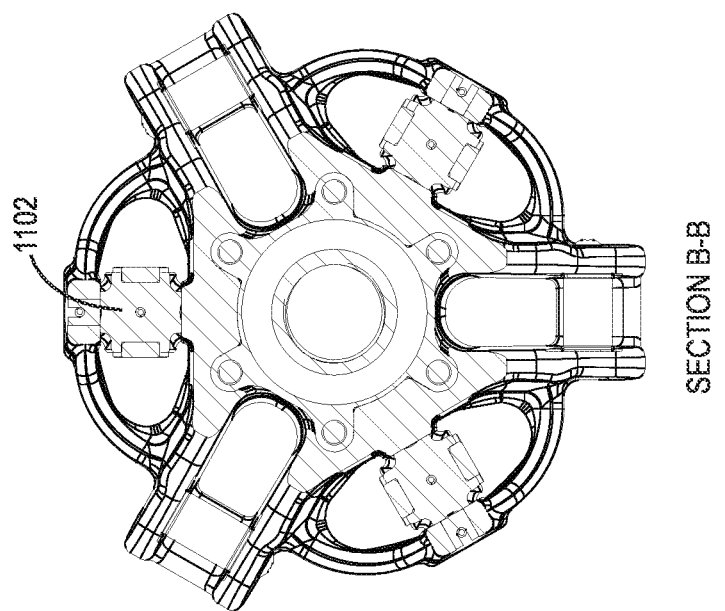
Figure 17C:
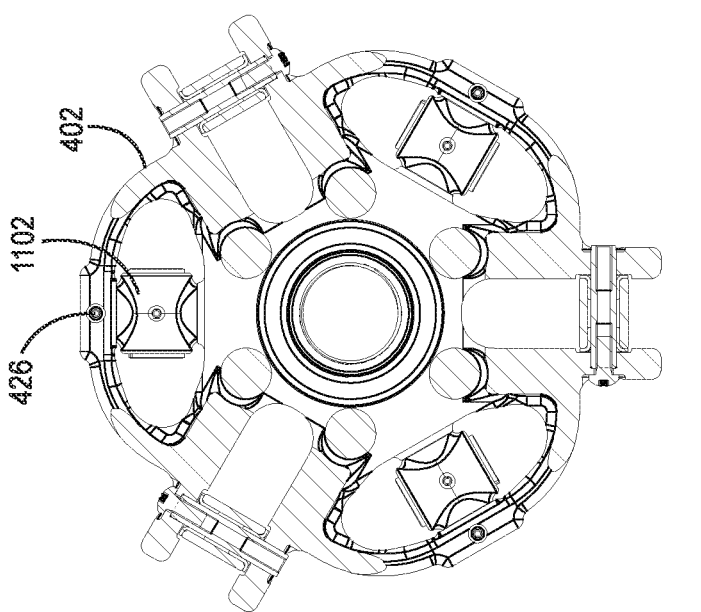
Figure 17B:
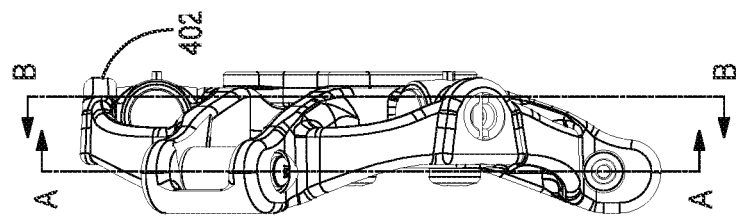
Figure 17E:
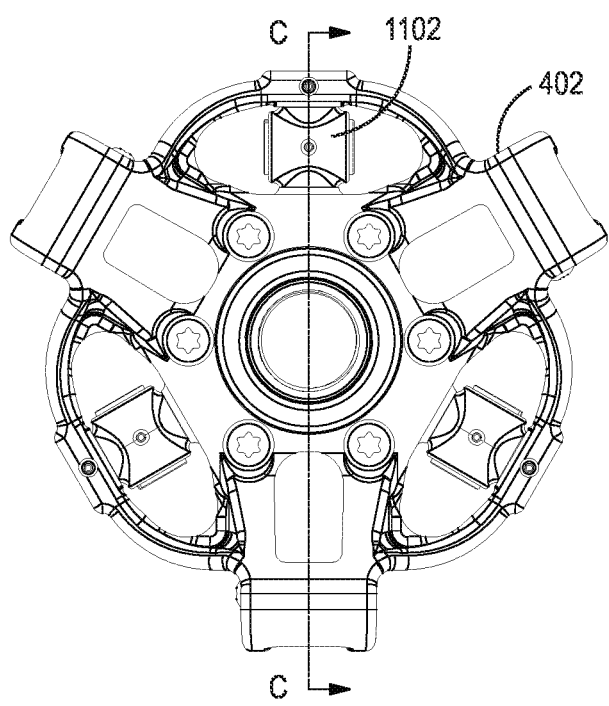
Figure 17F:
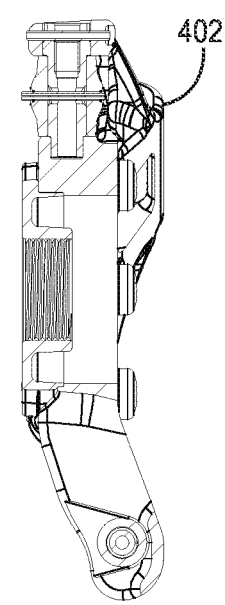
Figure 18A:
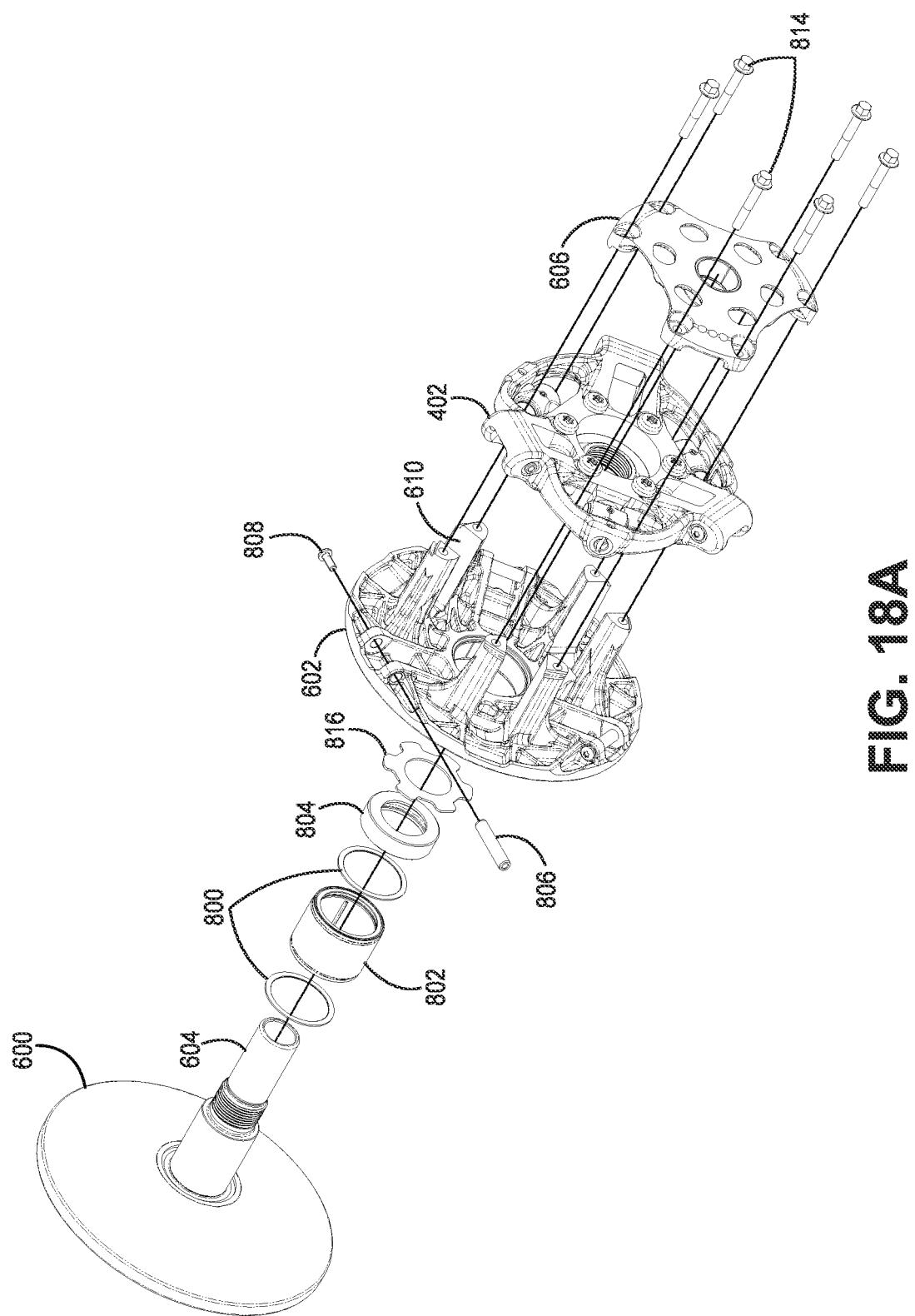
FIGS. 18A-E illustrate exploded, perspective and cross-sectional views of an uncalibrated CVT drive clutch with button block torque transfer assembly for use in a two-stroke engine in a no shift, no shift stop configuration, according to some embodiments.
Figure 18B:
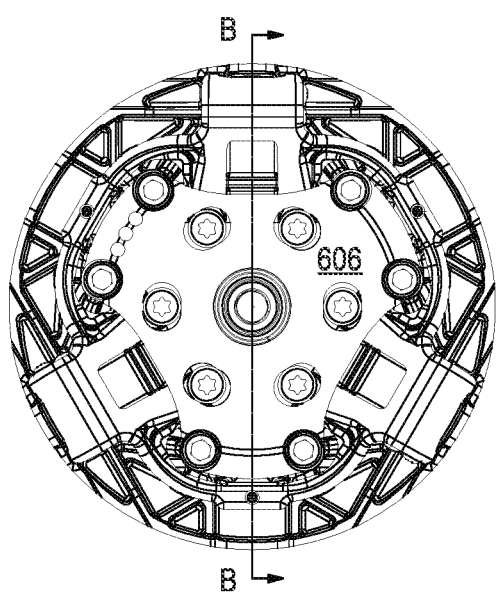
Figure 18C:
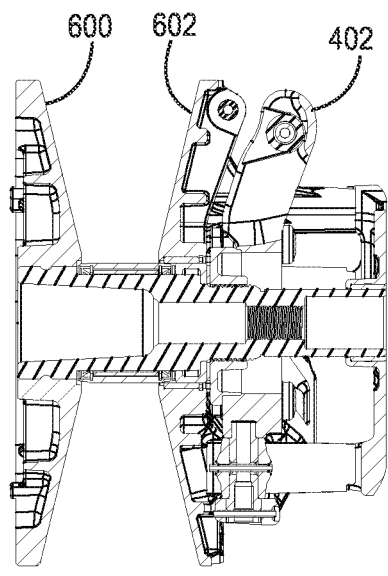
Figure 18D:
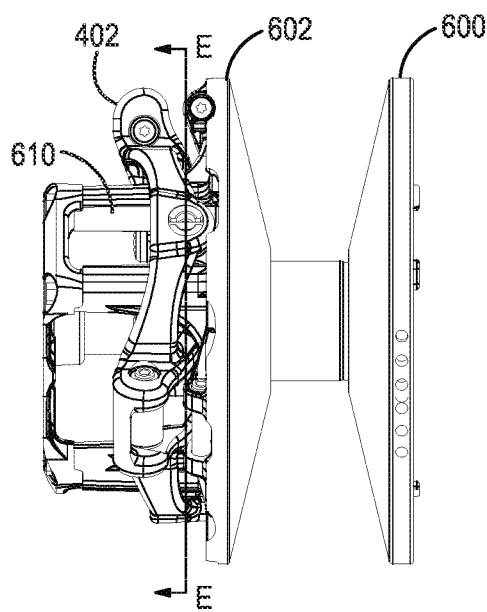
Figure 18E:
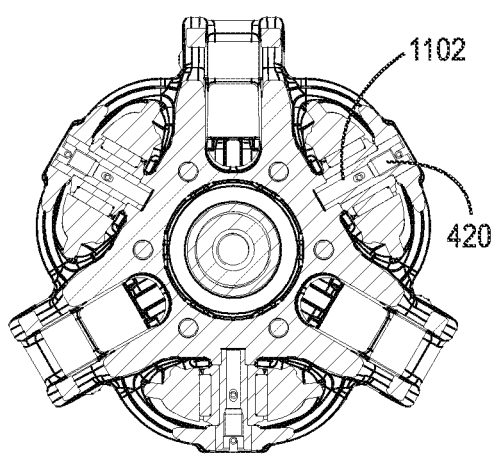
Figure 19A:
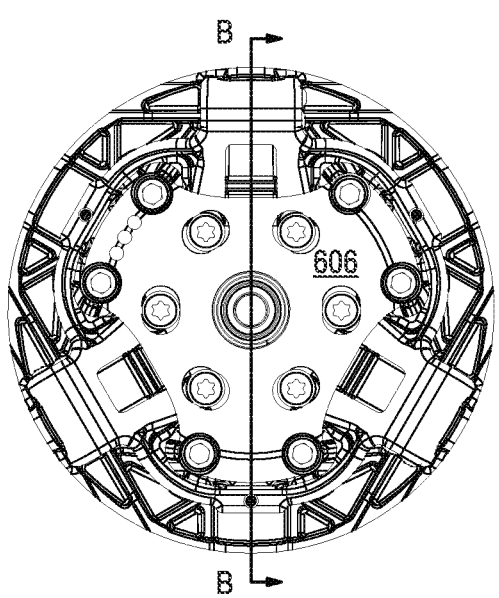
FIGS. 19A-D illustrate perspective and cross-sectional views of an uncalibrated CVT drive clutch with button block torque transfer assembly for use in a two-stroke engine in a full shift, no shift stop configuration, according to some embodiments.
Figure 19B:
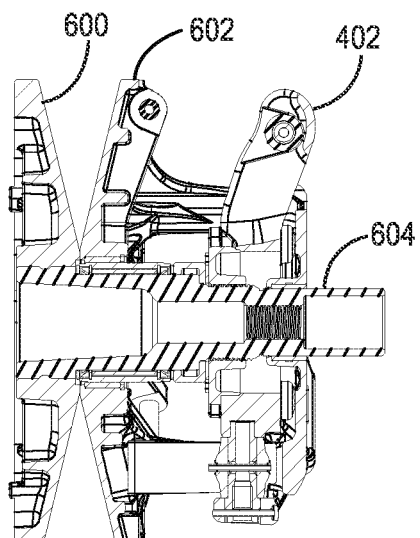
Figure 19C:
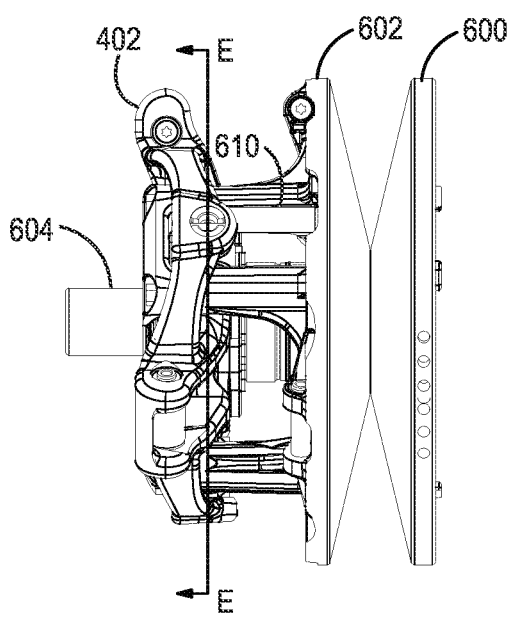
Figure 19D:
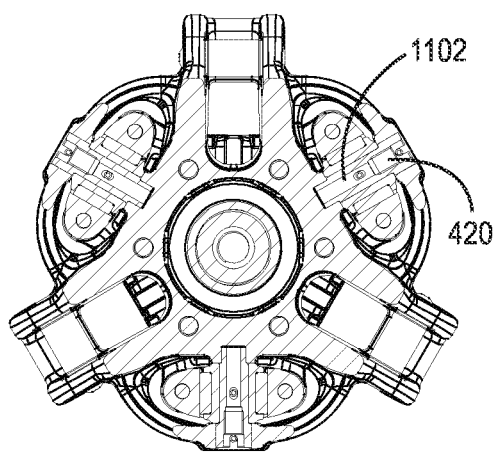
Figure 20A:
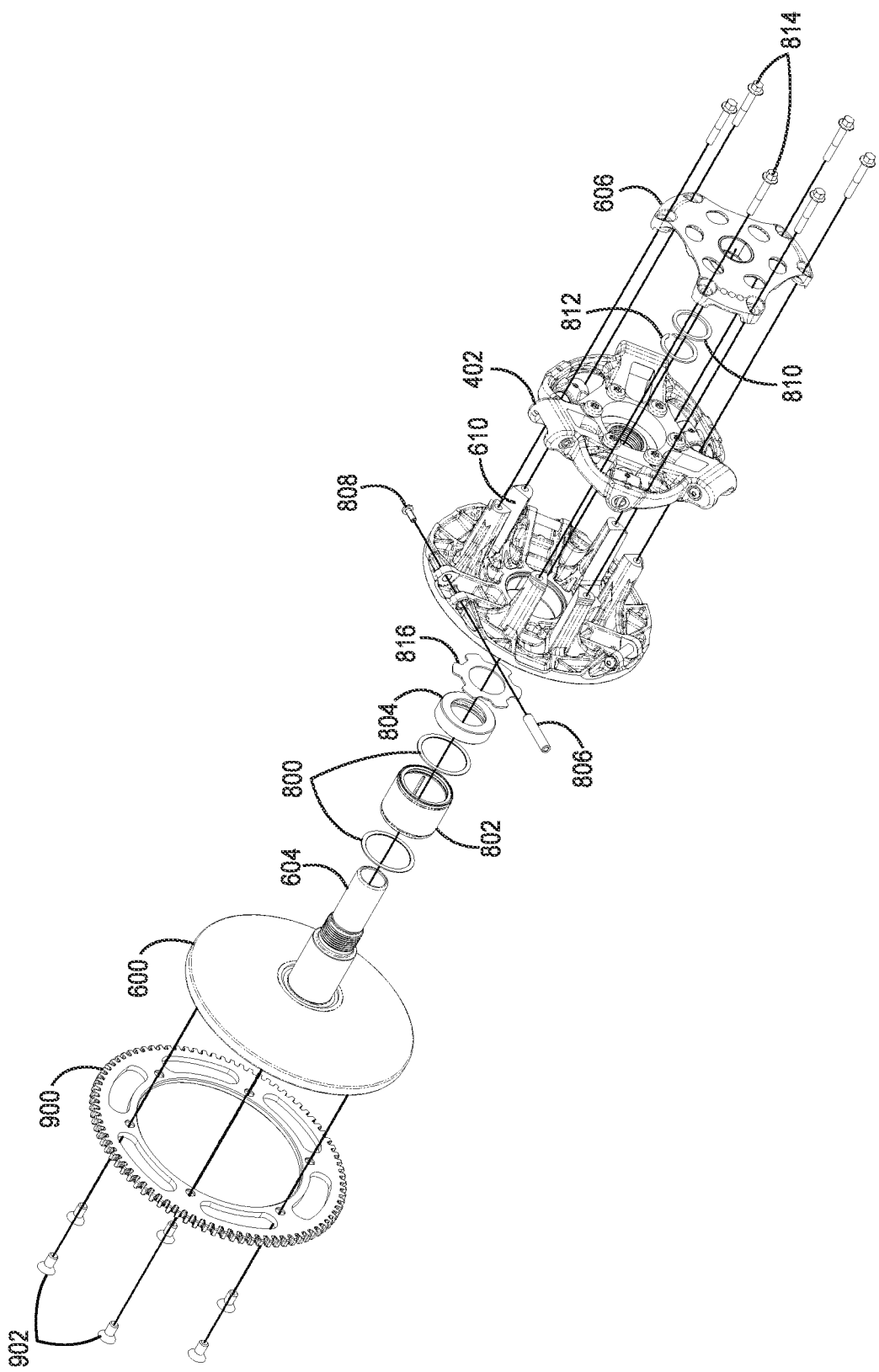
FIGS. 20A-E illustrate exploded, perspective and cross-sectional views of an uncalibrated electric start CVT drive clutch with button block torque transfer assembly for use in a two-stroke engine in a no shift configuration, according to some embodiments.
Figure 20B:
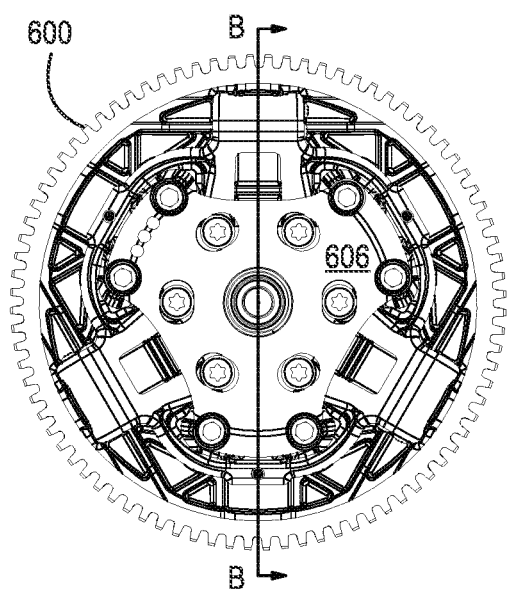
Figure 20C:
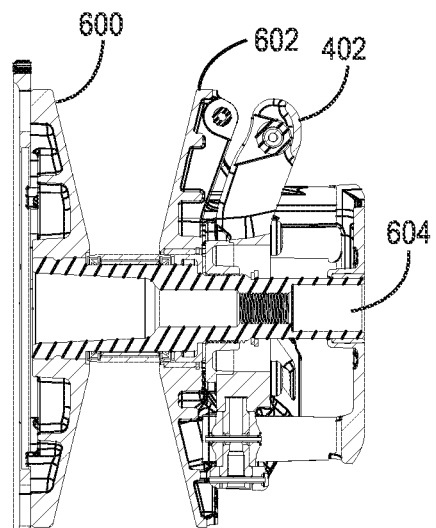
Figure 20D:
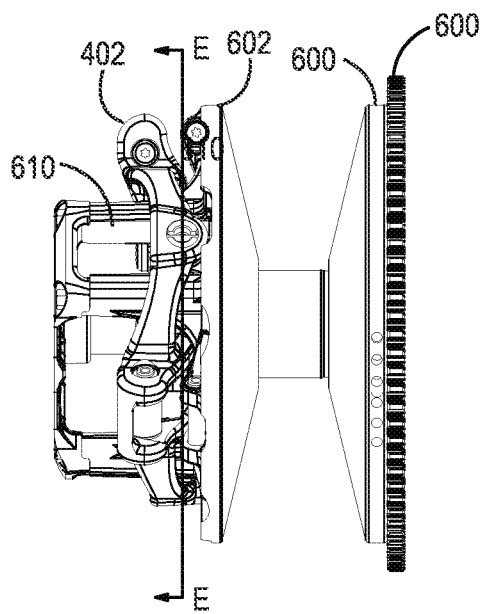
Figure 20E:
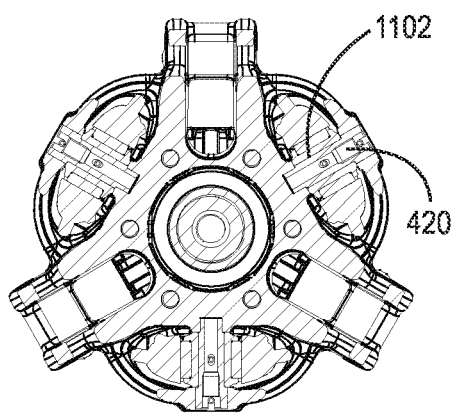
Figure 21A:
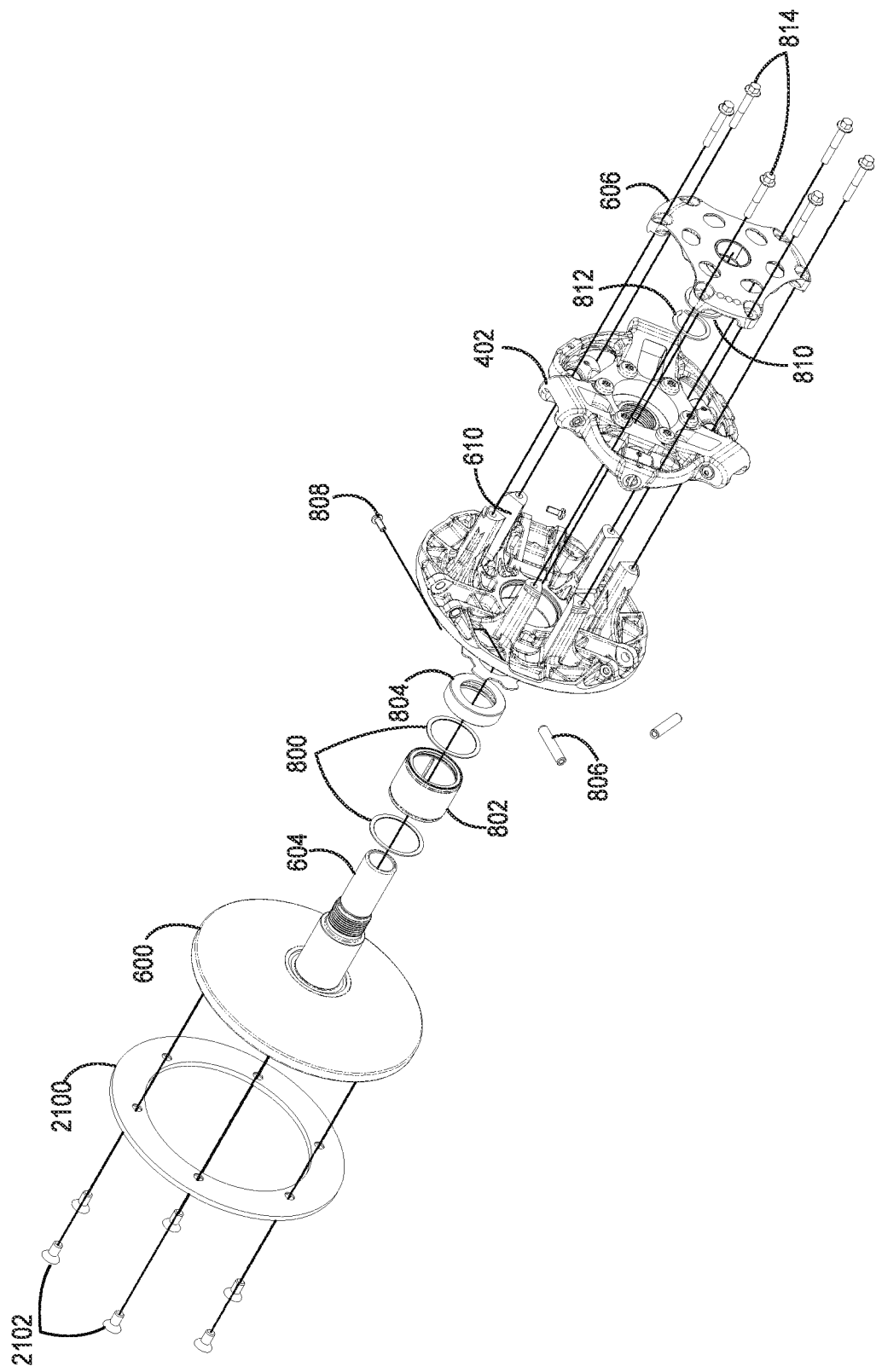
FIGS. 21A-F illustrate exploded, perspective and cross-sectional views of an uncalibrated CVT drive clutch with damper ring for use in a two-stroke engine in a full shift configuration, according to some embodiments.
Figure 21B:
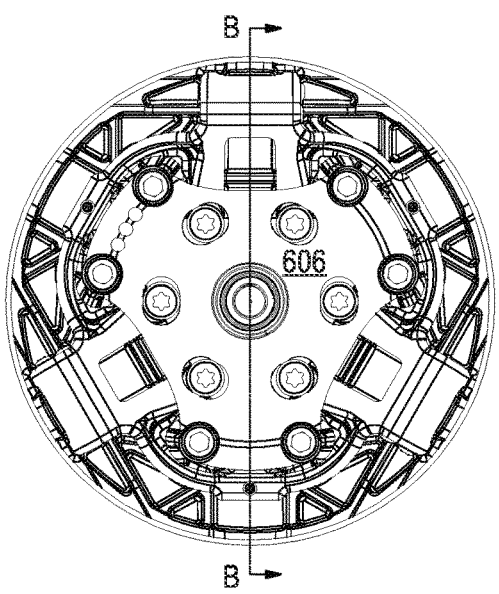
Figure 21C:
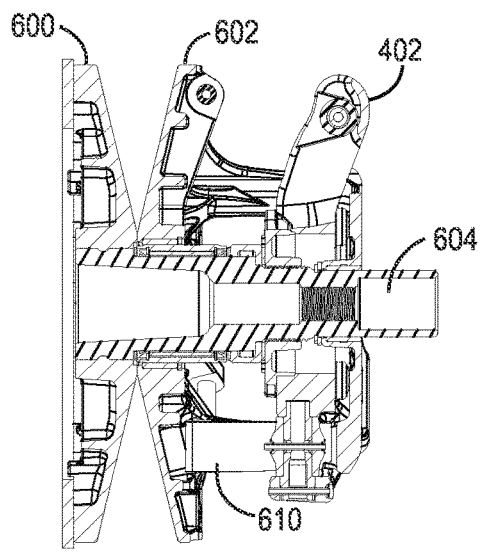
Figure 21D:
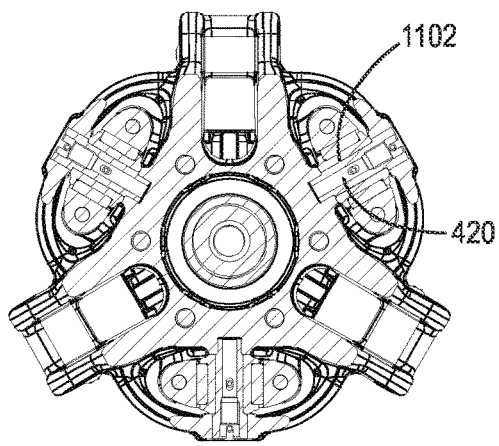
Figure 21E:
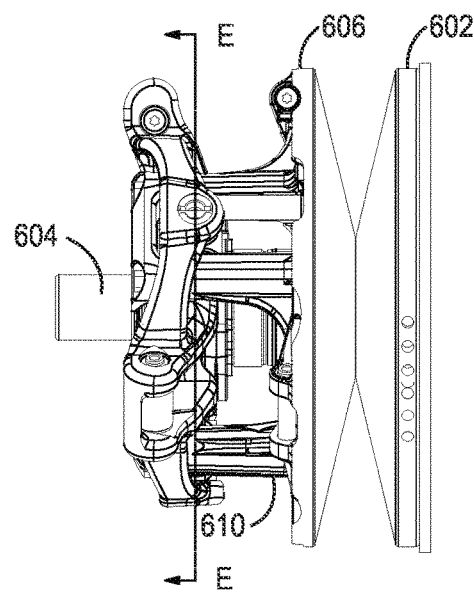
Figure 21F:
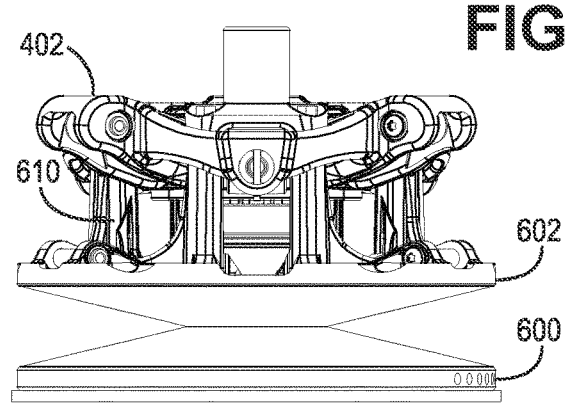
Figure 22A:
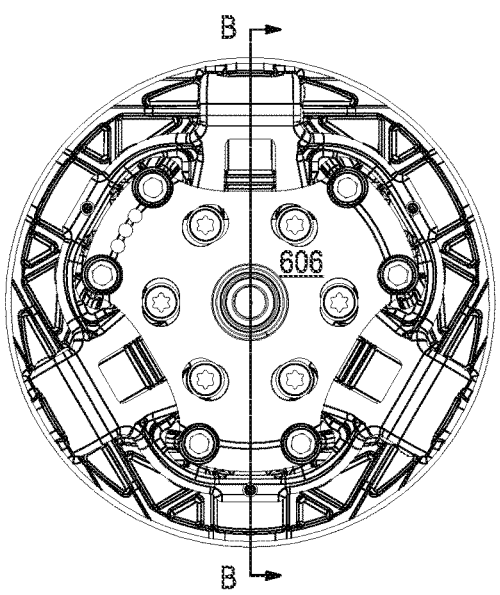
FIGS. 22A-E illustrate perspective and cross-sectional views of an uncalibrated CVT drive clutch with damper ring for use in a two-stroke engine in a no shift configuration, according to some embodiments.
Figure 22B:
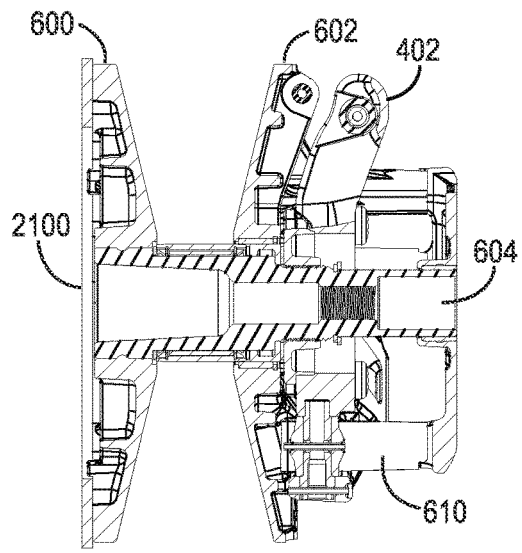
Figure 22C:
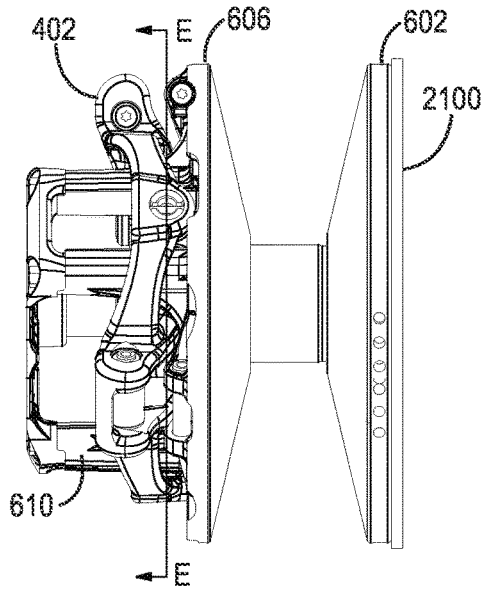
Figure 22D:
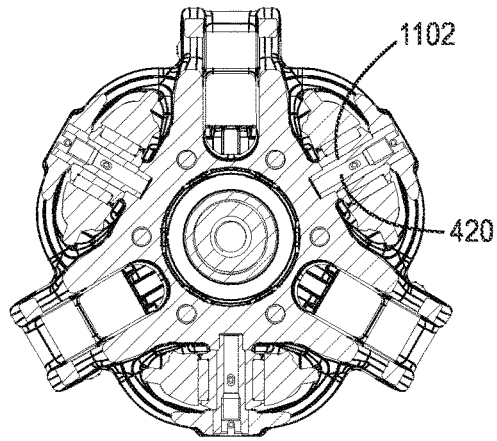
Figure 22E:
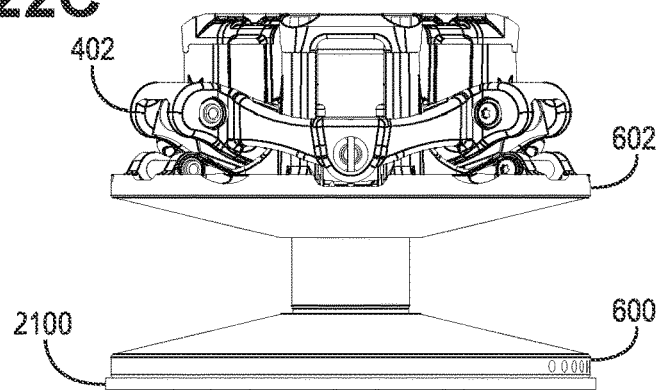
Figure 23A:
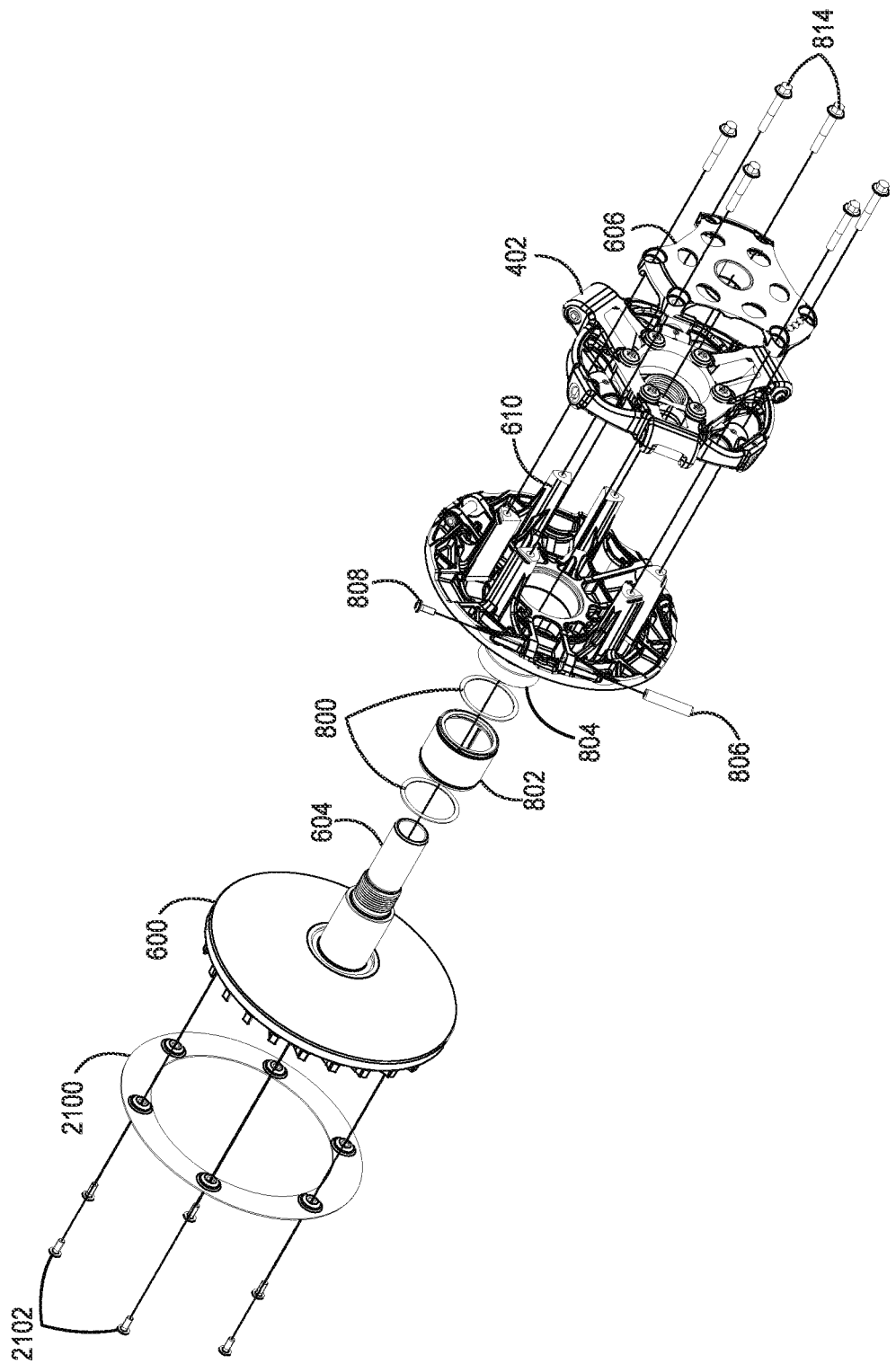
FIGS. 23A-I illustrate exploded, perspective and cross-sectional views of an ATV, side by side (SXS), snowbike, or motorcycle CVT drive clutch with windage plate for use in a two-stroke or four-stroke engine in a full shift, no shift stop, configuration, according to some embodiments.
Figure 23D:
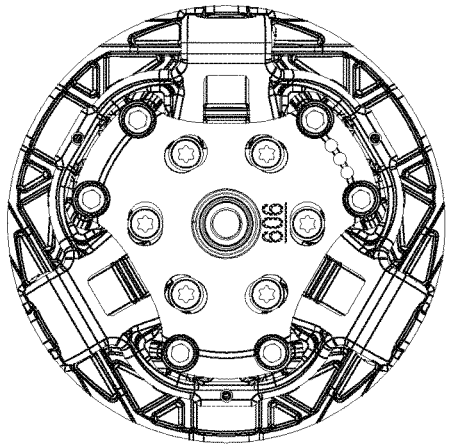
Figure 23C:
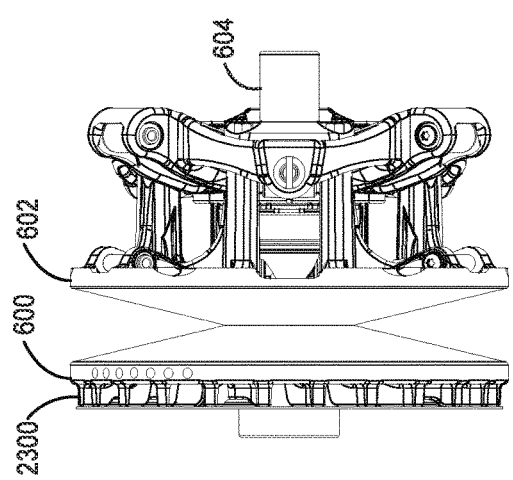
Figure 23B:
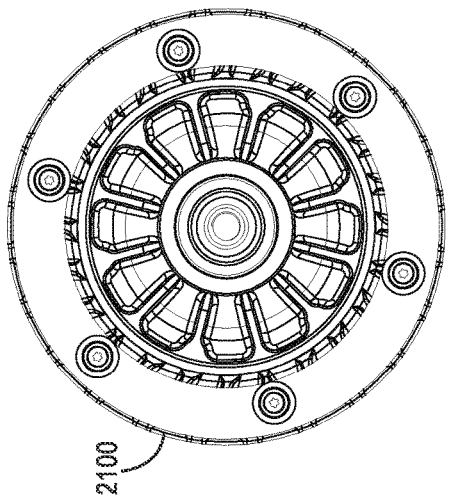
Figure 23F:
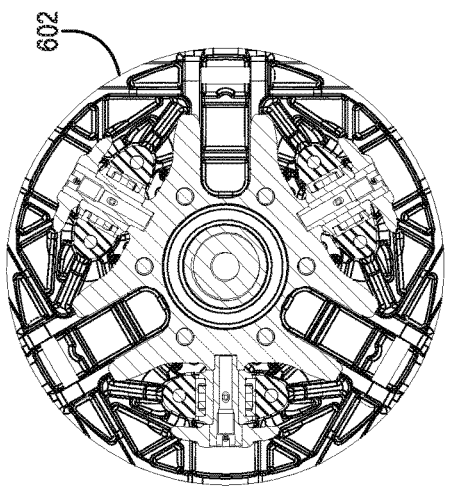
Figure 23E:
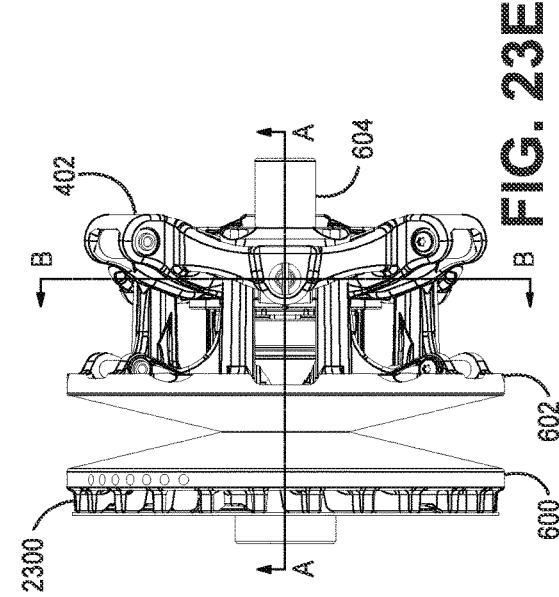
Figure 23G:
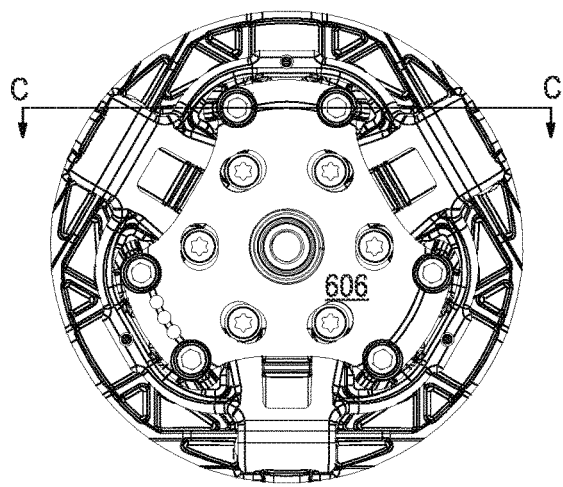
Figure 23H:
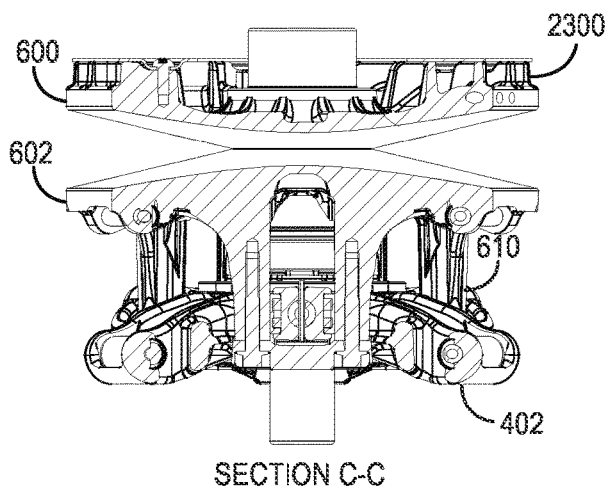
Figure 23I:
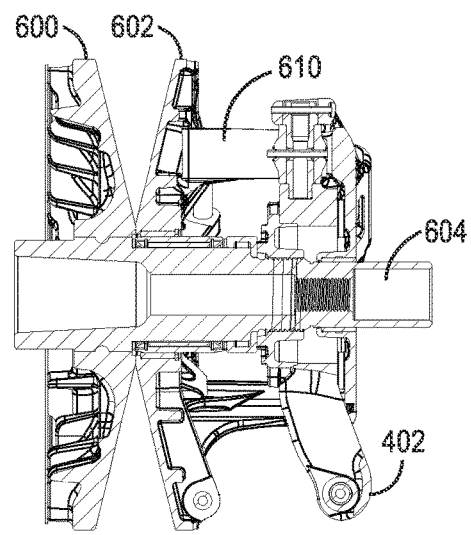
Figure 24C:
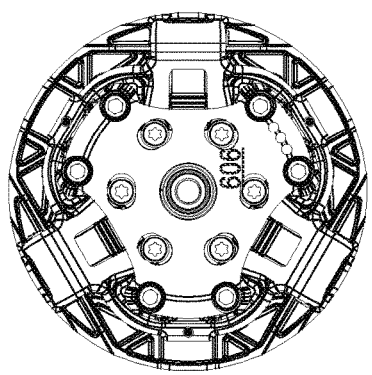
Figure 24B:
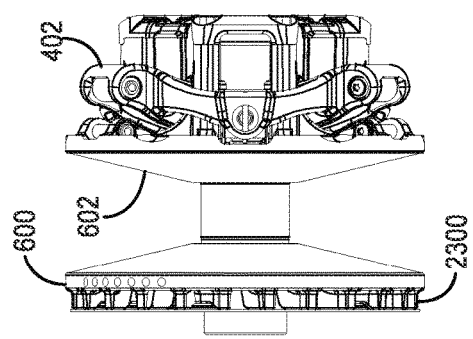
Figure 24E:
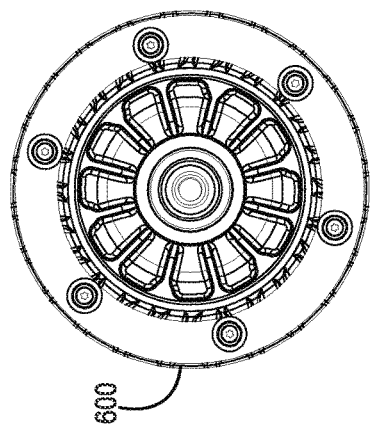
Figure 24D:
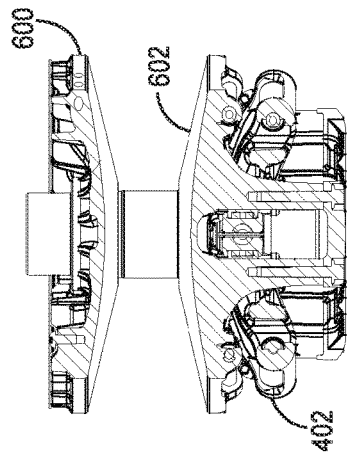
Figure 24F:
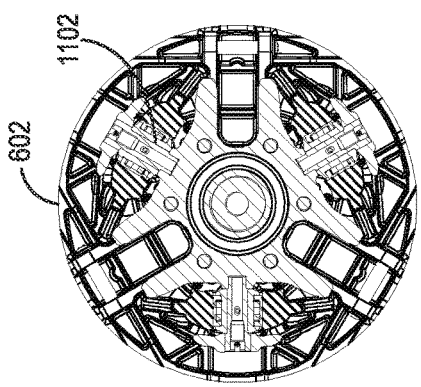
Figure 24G:
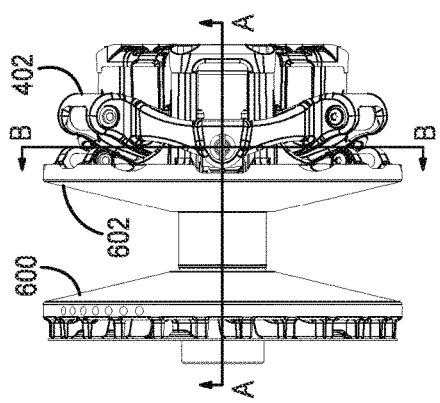
Figure 24H:
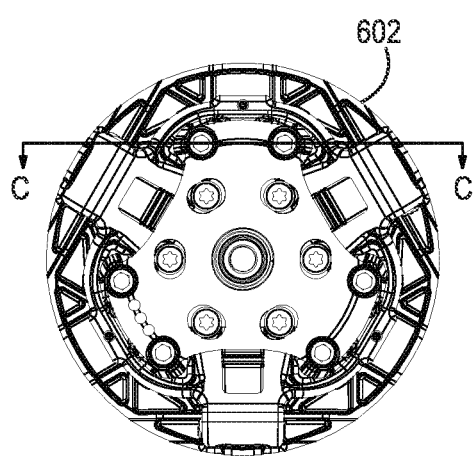
Figure 24I:
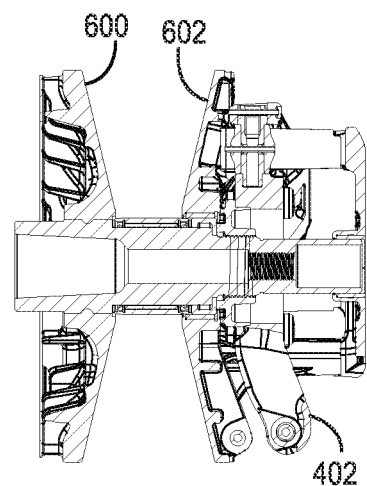
Figure 25:
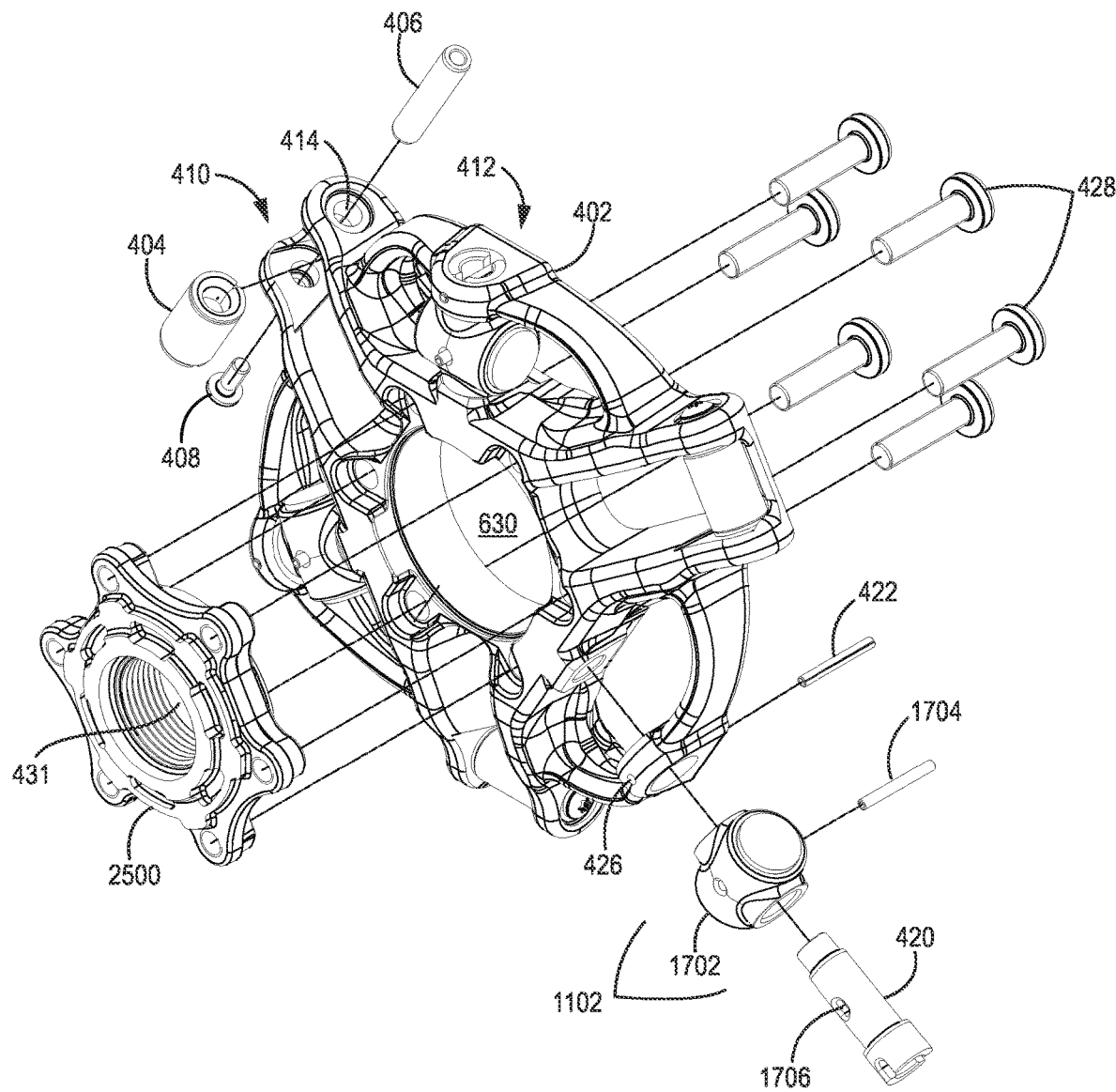
FIG. 25 illustrates a perspective view of an ATV or motorcycle CVT spider with button block assembly for use in a four-stroke engine, according to some embodiments.
Figures 28A, 28B:
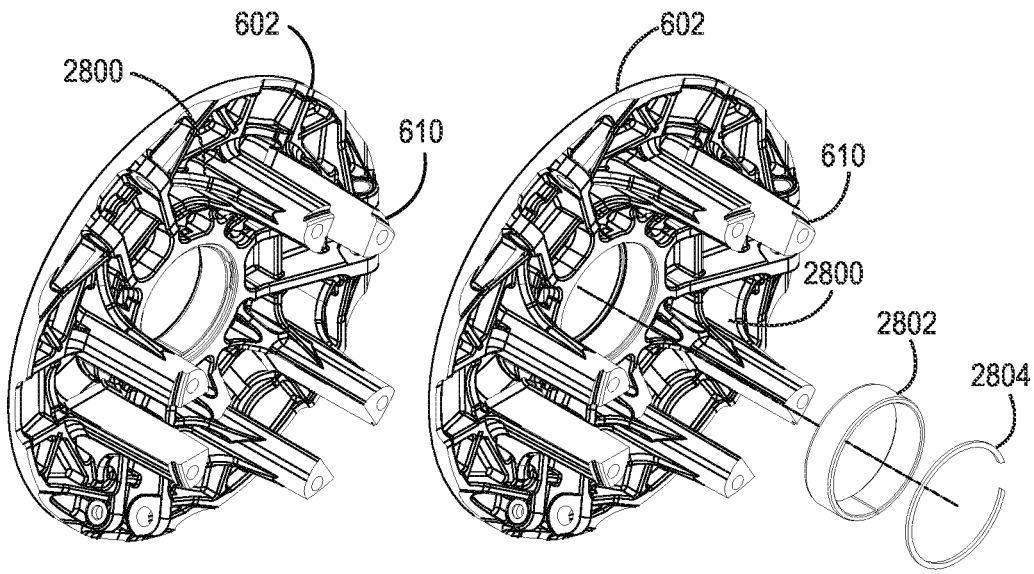
FIGS. 28A-K illustrate perspective and cross-sectional views of a CVT moveable sheave assembly, according to some embodiments.
Figures 28C, 28D:
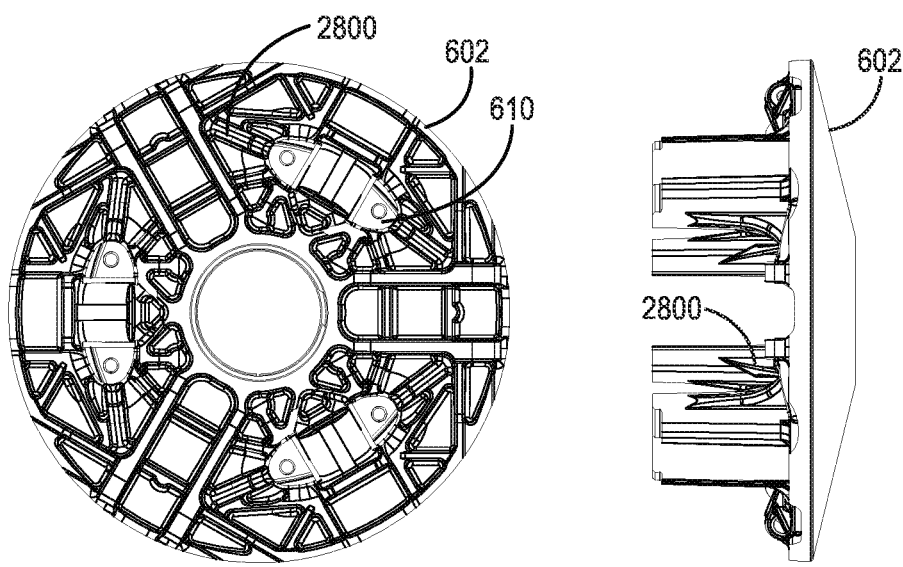
Figure 28E:
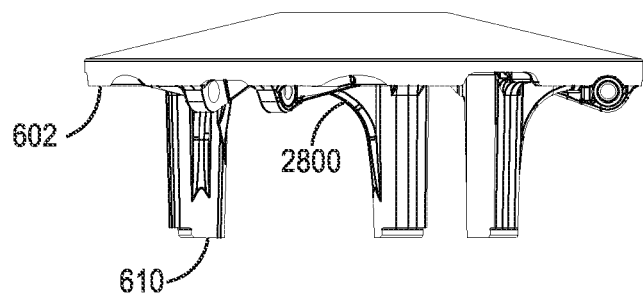
Figure 28F:
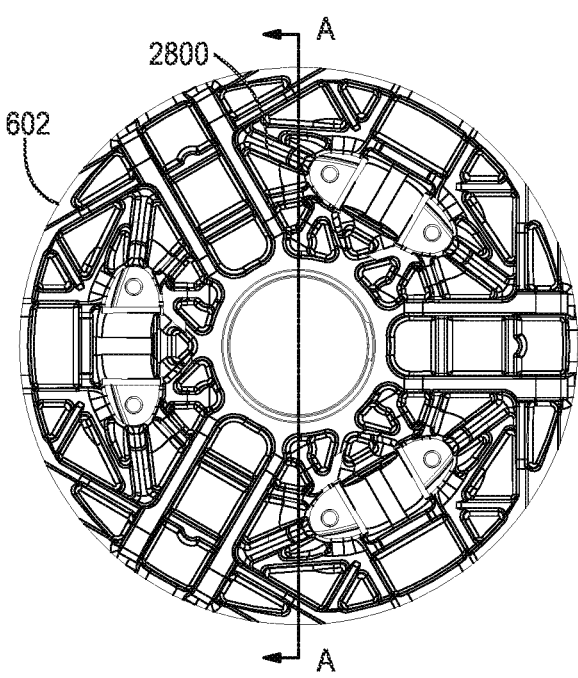
Figure 28G:
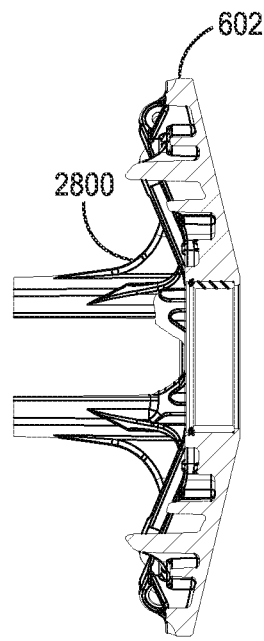
Figure 28H:
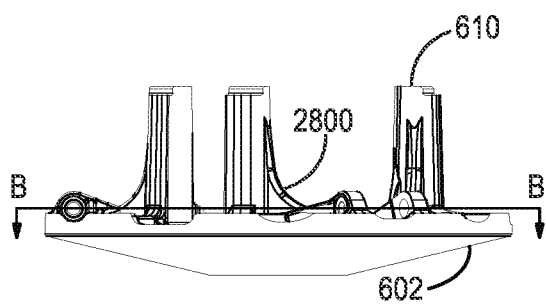
Figure 28I:
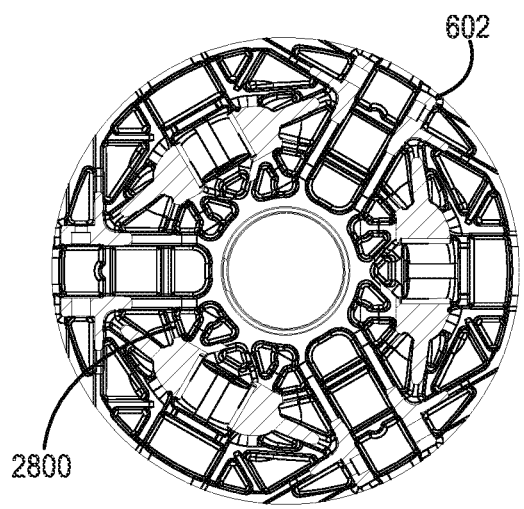
Figure 28J:
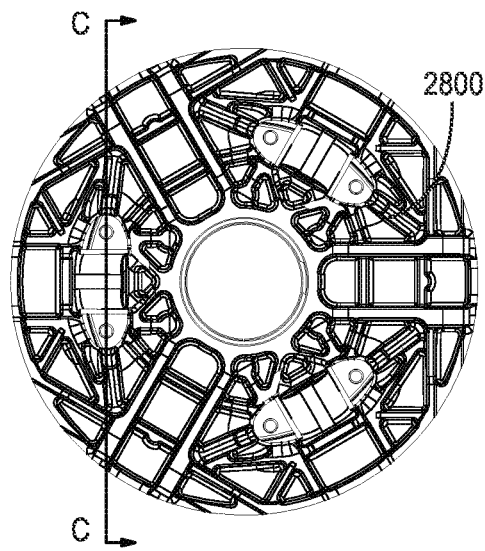
Figure 28K:
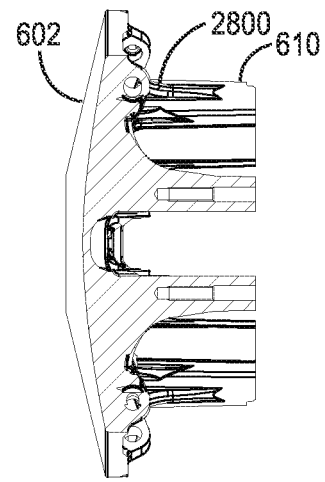

FIGS. 9A-I illustrate exploded, perspective and cross-sectional views of CVT electric start drive clutch with roller-roller torque transfer assembly in a wear and no shift configuration, according to some embodiments. An electric start ring 900, secured to the stationary sheave 600 by fasteners 902 is shown. FIGS. 10A-J illustrate exploded, perspective and cross-sectional views of CVT drive clutch with roller-roller torque transfer assembly in a no wear and no shift configuration, according to some embodiments. FIG. 11A illustrates an exploded view of CVT electric start drive clutch with button torque transfer assembly in a full shift configuration with shift stop, according to some embodiments. The torque transfer device assembly 412 includes a button block assembly 1102.

Referring to FIGS. 12A-I, perspective and cross-sectional views of a cam arm 608 is shown, according to some embodiments. Cam arm 608 includes upper contact area 1202, cam arm pin sleeve 1204, and upper contact area lip 1206. A traditional cam arm or flyweight 608 has a rectangular profile in a front view, such as in FIG. 12E. In this embodiment, the upper contact area 1202 that engages the spider body 402 to move the moveable sheave 602 has a T-shape, increasing surface area contacted. The lip 1206 can be symmetric to form a T-shape, or in one embodiment can be asymmetric or only present on one side to form an L-shape. The surface area of the upper contact area 1202 can be increased about 5%, about 10%, about 15%, about 20%, about 30%, or about 35% more over a rectangular (non-T shaped) profiled cam arm 608. By increasing the surface area of the upper contact area 1202, less stress is placed on the cam arm 608 over time and the overall weight of the cam arm 608 can be reduced.

By changing the shape and profile of the upper contact area 1202, the center of mass of cam arm 608 can be changed. Cam arm 608 mass varies based on uncalibrated clutch positioning of the roller on the spider and the cam arm pin 806. The mass also varies based on the shape of the upper contact area 1202. The cam arm pin sleeve 1204 (e.g., bushing) receives cam arm pin 806 for securing to the moveable sheave 602. Cam arm 608 can be manufactured of powdered metal (e.g., iron with binder), steel, composite materials, etc., The cam arm 608 material can be chosen based on cost, density, and durability.

In a T-shaped configuration, each lip 1206 can be about 5% of the total width of the upper contact area. The width of each lip can be about 10%, about 15%, or about 20% of the total width of the upper contact are 12002 width, for example.

FIGS. 13A-K illustrate exploded, perspective and cross-sectional views of CVT drive clutch with slider-roller torque transfer assembly in a wear and full shift configuration with shift stop, according to some embodiments. In this embodiment, the torque transfer device assembly 412 includes a slider block assembly 1300. FIGS. 14A-J illustrate perspective and cross-sectional views of CVT drive clutch with slider-roller torque transfer assembly in a wear and no shift configuration with shift stop, according to some embodiments. FIGS. 15A-J illustrate perspective and cross-sectional views of CVT spider with roller-slider torque transfer assembly in a wear configuration, according to some embodiments. The slider block assembly 1300 includes eccentric slider block 1302 and eccentric slider cam 1304. Unlike a roller, the slider block assembly 1300 slides up and down the tower 610 as opposed to rolling. Using the helixed path of torque pin 420, the torque transfer device 412 can reduce wear and extend the life of the assembly. FIGS. 16A-I illustrate exploded, perspective and cross-sectional views of CVT drive clutch calibrated with button block assembly for use in a two-stroke engine, according to some embodiments. A calibrated system fully includes cam arms 608 and spring 612. Calibration can also refer to the position of the spider body 402 in relation to the moveable sheave 602.

FIGS. 17A-J illustrate perspective and cross-sectional views of CVT spider with button block assembly for use in a two-stroke engine, according to some embodiments. The torque transfer device assembly 412 includes button block assembly 1102. The assembly 1102 includes button block body 1702 and securing pin 1704 through securing pin apertures 1706. Securing pin 1704 can provide orientation of the button block body 1702 by securing pin apertures 1706 relative to the spider 412. The spider 412 can be equipped with or without securing pin 1704 depending on the application.

FIGS. 18A-E illustrate exploded, perspective and cross-sectional views of an uncalibrated CVT drive clutch with button block torque transfer assembly for use in a two-stroke engine in a no shift, no shift stop configuration, according to some embodiments. FIGS. 19A-D illustrate perspective and cross-sectional views of an uncalibrated CVT drive clutch with button block torque transfer assembly for use in a two-stroke engine in a full shift, no shift stop configuration, according to some embodiments. FIGS. 20A-E illustrate exploded, perspective and cross-sectional views of an uncalibrated electric start CVT drive clutch with button block torque transfer assembly for use in a two-stroke engine in a no shift configuration, according to some embodiments.

FIGS. 21A-F illustrate exploded, perspective and cross-sectional views of an uncalibrated CVT drive clutch with damper ring for use in a two-stroke engine in a full shift configuration with shift stop, according to some embodiments. A damper ring 2100 can be secured to sheave 602 with fasteners 2102. The damper ring 2100 can provide additional inertia to the engine, especially in cases where an electric start is absent. FIGS. 22A-E illustrate perspective and cross-sectional views of an uncalibrated CVT drive clutch with damper ring for use in a two-stroke engine in a no shift configuration with shift stop, according to some embodiments. FIGS. 23A-I illustrate exploded, perspective and cross-sectional views of an ATV, side by side (SXS), snowbike, or motorcycle CVT drive clutch with damped button block torque transfer assembly and windage plate for use in a two-stroke or four-stroke engine in a full shift configuration, according to some embodiments. Additionally, a fan 2300 can be integrated with stationary sheave 600 for dirt applications. Dirt, or non-snow, applications tend to operate in higher ambient temperature environments and the CVT is often encased in an enclosed shroud (i.e., box) to protect from debris. These factors lead increased air flow considerations. FIGS. 24A-I illustrate exploded, perspective and cross-sectional views of an ATV, side by side (SXS), snowbike, or motorcycle CVT drive clutch with damped button block torque transfer assembly and windage plate for use in a two-stroke or four-stroke engine in a no shift, no shift stop configuration, according to some embodiments.

FIGS. 25 and 26A-I illustrate perspective and cross-sectional views of an ATV or motorcycle CVT spider with button block assembly for use in a two- or four-stroke engine, according to some embodiments. Hub 2500 includes additional thickness and structural features as an option for a four-stroke engine application that can function as neutral gap and calibration shims as previously seen.

FIGS. 27A-E illustrate perspective and cross-sectional views of a CVT cover assembly, according to some embodiments. Cover 606 can be secured to moveable sheave 602 with fasteners and stationary post 604 with bearing 2700, for example. Cover 606 supports towers 610 and further secures the towers 610 from moving or flexing outward. FIGS. 28A-K illustrate perspective and cross-sectional views of a CVT moveable sheave assembly, according to some embodiments. Moveable sheave 602 can be secured using bearing 2802 and retaining ring 2804, for example. Structural ribbing 2800 or features can be included to provide additional strength to the moveable sheave 602 and drive clutch 302 assembly. The ribbing 2800 can reduce movement or stress on the towers and allows for placement of towers 610 on the moveable sheave 602, as opposed to positioning on the spider body 402. The structural ribbing 2800 can be fabricated or attached between towers 610 and an inner surface of the sheave or between features in contact with the inner surface of the sheaves. The ribbing 2800 can include 2 or more, 5 or more, 20 or more, or 30 or more features. The surface area covered by the ribbing 2800 on an inner surface of the sheave 602 can include 3% or more, 10% or more, 40% or more or 70% or more of the total surface area. The ribbing 2800 further secures the towers 610 from deflection and wear. The ribbing 2800 can include major and minor ribbing features.

Figures 29A, 29B:
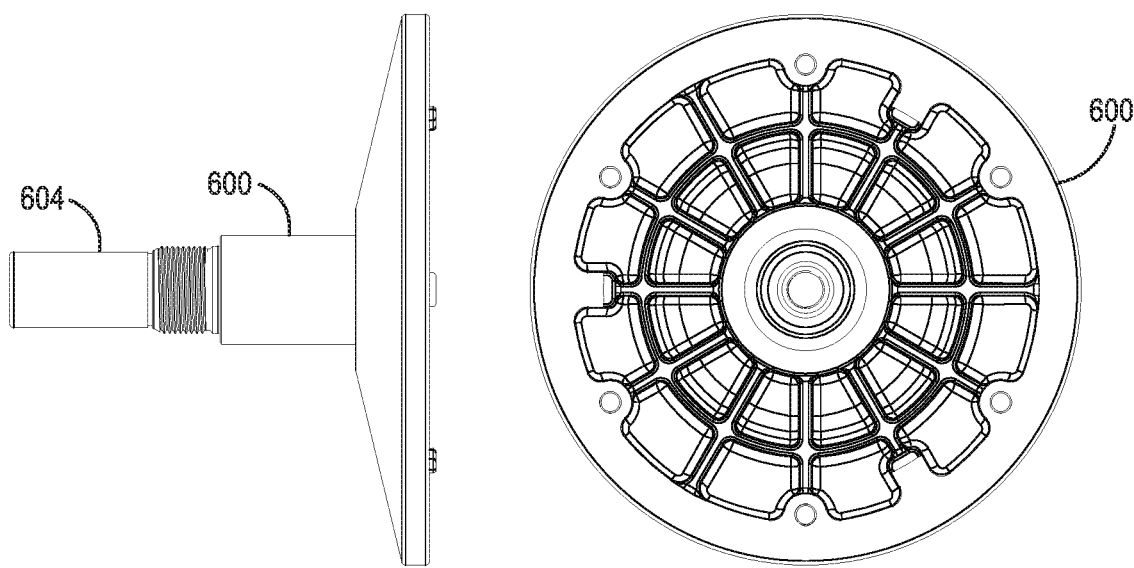
FIGS. 29A-B illustrate perspective and cross-sectional views of a CVT stationary sheave assembly, according to some embodiments.
Figure 31A:
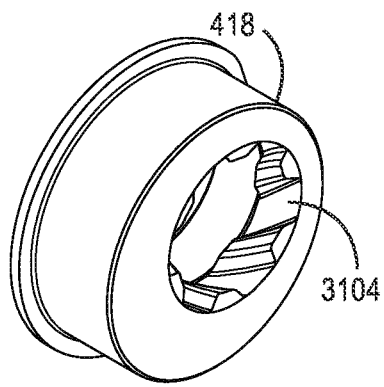
FIGS. 31A-G illustrate perspective and cross-sectional views of a CVT eccentric cam assembly, according to some embodiments.
Figure 31B:
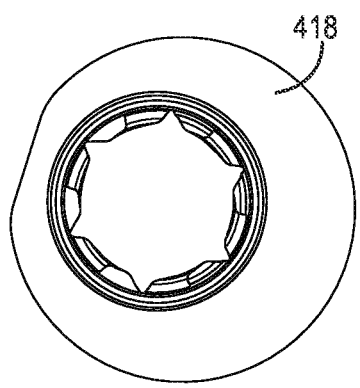
Figure 31C:
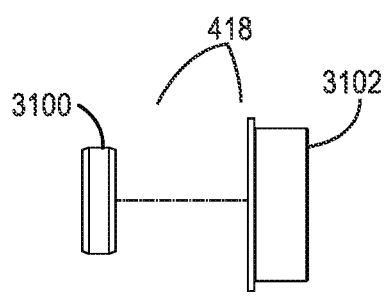
Figure 31D:
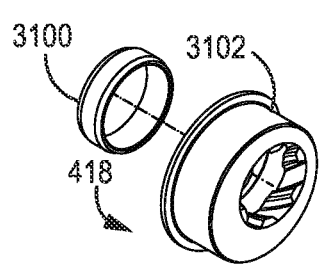
Figure 31E:
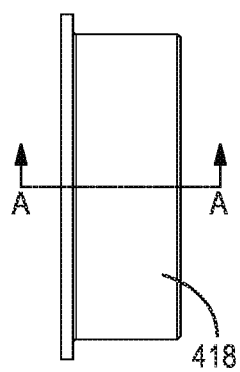
Figure 31F:
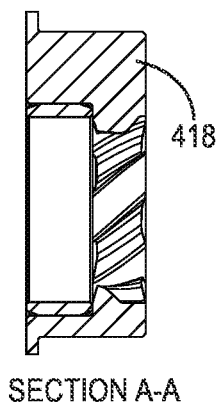
Figure 31G:
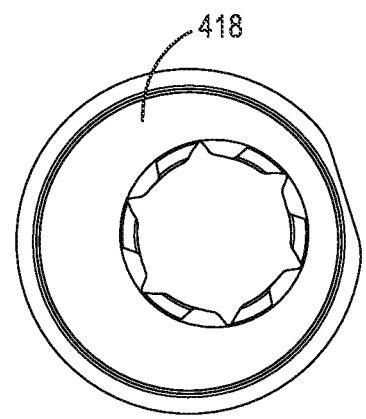
Figure 32A:
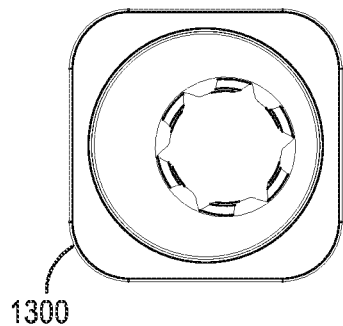
FIGS. 32A-E illustrate perspective and cross-sectional views of a CVT eccentric cam slider block assembly, according to some embodiments.
Figure 32B:
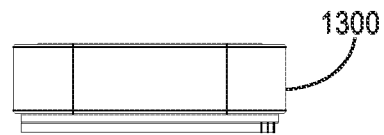
Figure 32C:
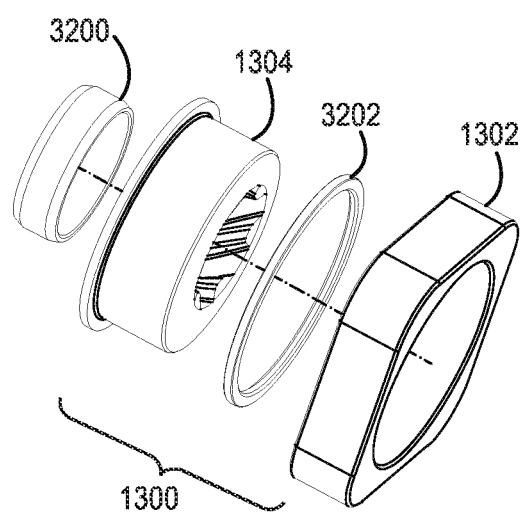
Figure 32D:
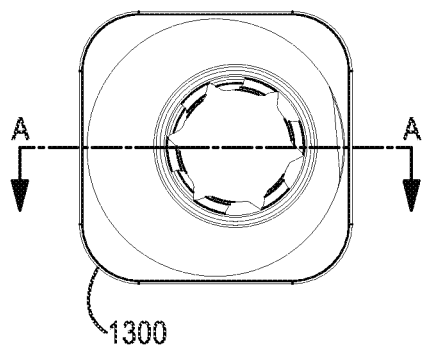
Figure 32E:
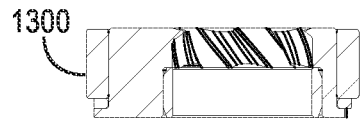
Figure 34A:
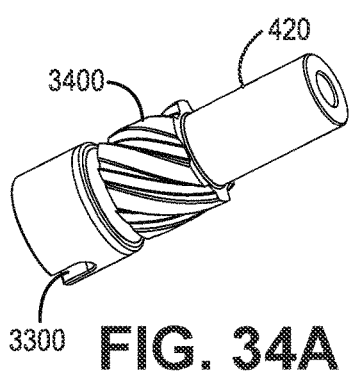
FIGS. 34A-J illustrate perspective and cross-sectional views of a CVT torque pin with helix, according to some embodiments.
Figure 34B:
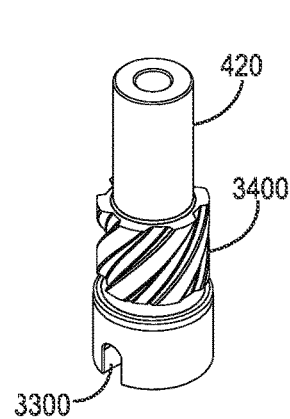
Figure 34C:
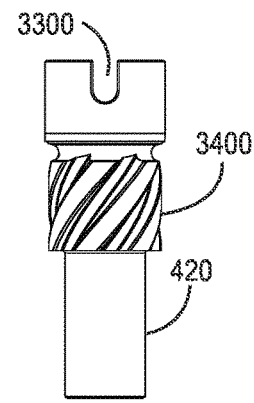
Figure 34D:
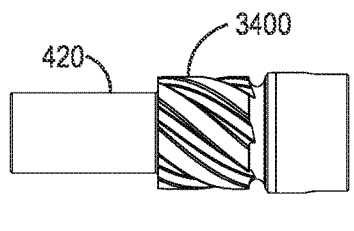
Figure 34E:
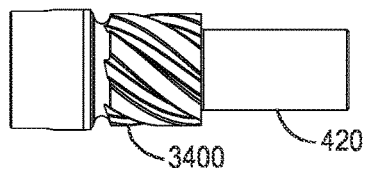
Figure 34F:
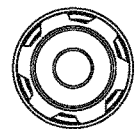
Figure 34G:
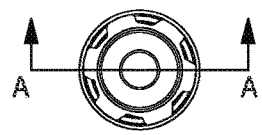
Figure 34H:
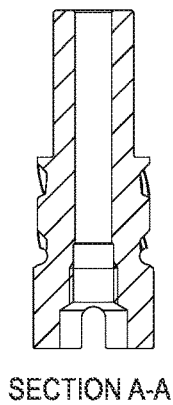
Figure 34I:
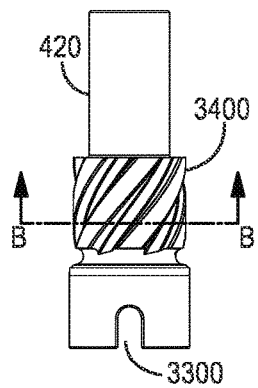
Figure 34J:
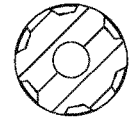
Figure 35A:
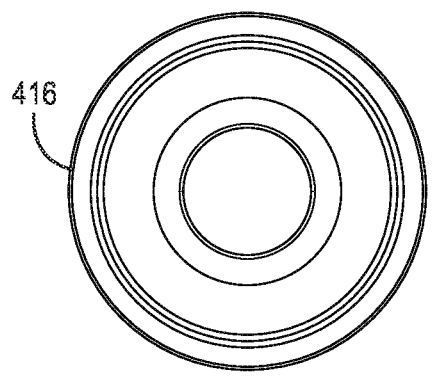
FIGS. 35A-G illustrate perspective and cross-sectional views of a CVT wear-sleeved bearing assembly, according to some embodiments.
Figure 35B:
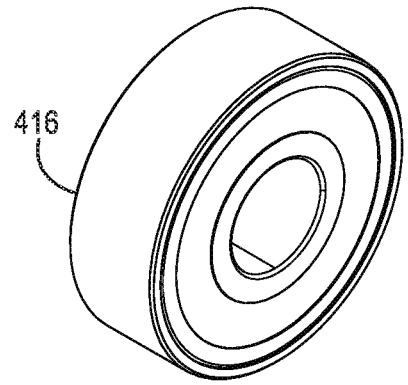
Figure 35C:
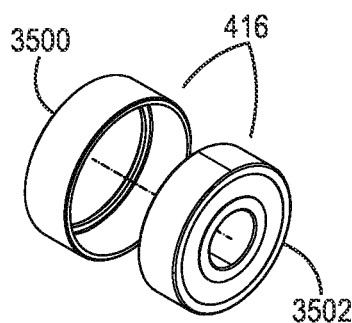
Figure 35D:
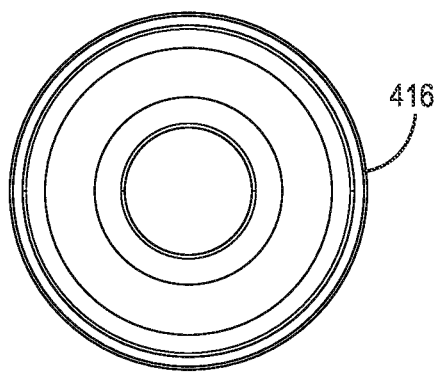
Figure 35E:
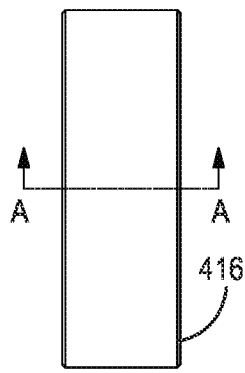
Figure 35F:
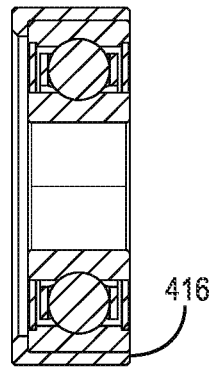
Figure 35G:
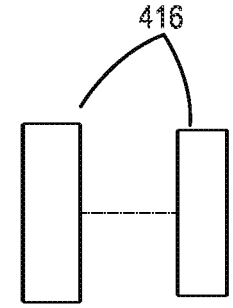
Figure 36A:
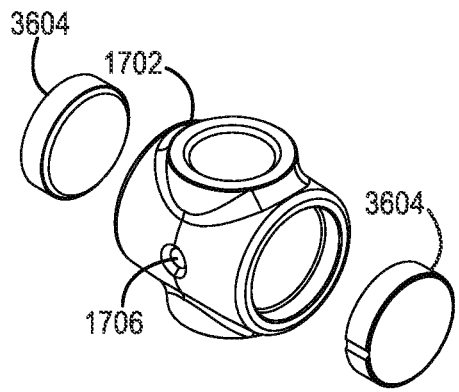
FIGS. 36A-E illustrate perspective and cross-sectional views of a CVT button block assembly, according to some embodiments.
Figure 36B:
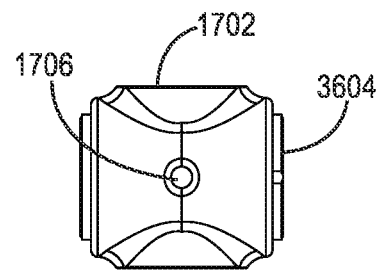
Figure 36C:
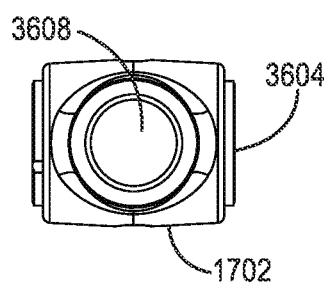
Figure 36D:
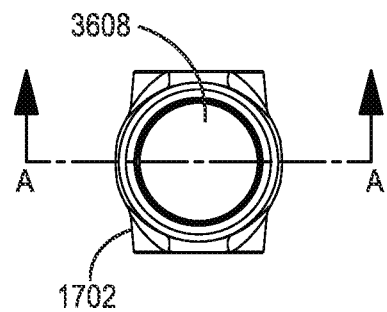
Figure 36E:
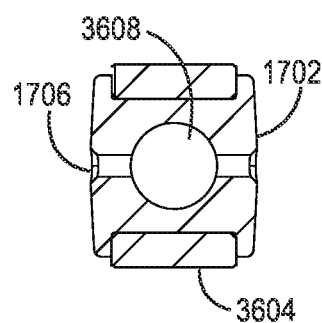
Figure 38A:
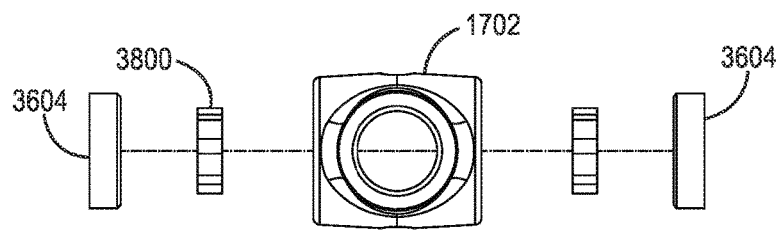
FIGS. 38A-H illustrate perspective and cross-sectional views of a CVT button block assembly with dampers, according to some embodiments.
Figure 38B:
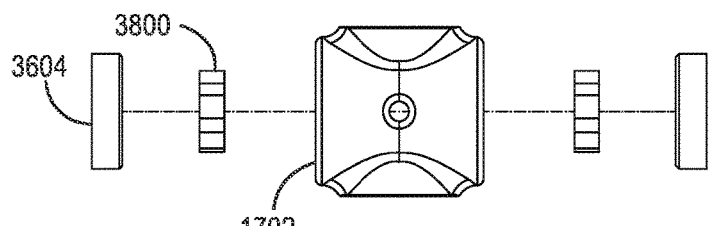
Figure 38C:
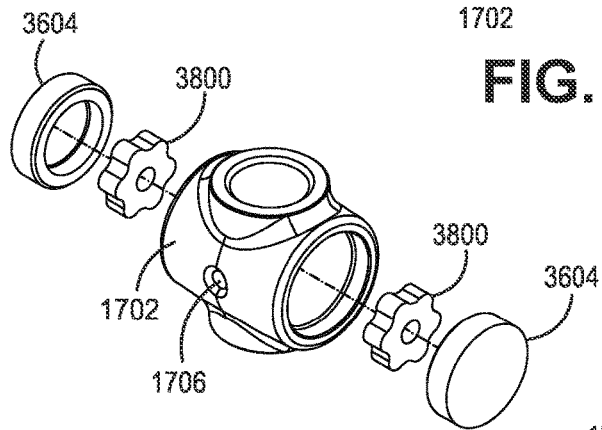
Figure 38D:
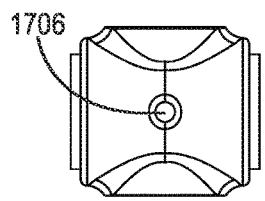
Figure 38E:
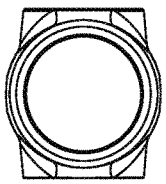
Figure 38F:
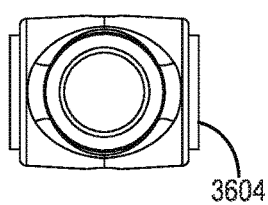
Figure 38G:
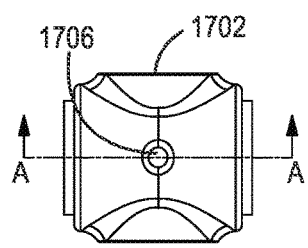
Figure 38H:
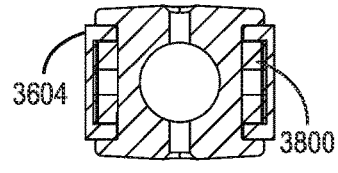

FIGS. 29A-B illustrate perspective and cross-sectional views of a CVT stationary sheave assembly, according to some embodiments. The sheave 600 can be in contact with a crankshaft from an engine. Four-stroke engines in recreational vehicles often utilize 30 mm taper. In a two-stroke application and four-stroke dirt bike/ATV application, the crankshaft taper is often 33 mm. FIGS. 30A-E illustrate perspective and cross-sectional views of a CVT hub, according to some embodiments. As discussed above, the hub 427 can include a taper or conical shape to interface with corresponding spider body 402.

FIGS. 31A-G illustrate perspective and cross-sectional views of a CVT eccentric cam assembly, according to some embodiments. An eccentric roller assembly 418 can include roller insert or bearing 3100, pathing features 3104 or one-way clutch, and eccentric roller 3102. The insert 3100 can be optionally integrated into the roller 3102. The pathing 3104 mates or contacts with helix on torque pin 420 to create an eccentric path up the pin 420 as wear occurs.

FIGS. 32A-E illustrate perspective and cross-sectional views of a CVT eccentric cam slider block assembly, according to some embodiments. An eccentric slider block assembly 1300 can include bearing 3200, eccentric slider cam 1304, retaining ring (or thrust washer) 3202, and slider block 1302.

FIGS. 33A-H illustrate perspective and cross-sectional views of a CVT torque pin, according to some embodiments. In some embodiments, a torque pin 420 can include aperture 1706 for receiving a first securing pin and U-channel 3300 for receiving a second securing pin. The U-channel securing mechanism provides additional safety by preventing the torque pin 420 from dislodging during use, in addition to providing additional alignment. FIGS. 34A-J illustrate perspective and cross-sectional views of a CVT torque pin with helix, according to some embodiments. A helix or helixed section 3400 can be utilized to guide an eccentric cam roller or slider, for example.

FIGS. 35A-G illustrate perspective and cross-sectional views of a CVT wear-sleeved bearing assembly, according to some embodiments. A wear-sleeved bearing assembly 416 can include bearing outer shell 3500 and bearing 3502. In addition to a roller bearing, the bearing 3502 can include needle bearing, plastic or metallic bushing, for example.

FIGS. 36A-E illustrate perspective and cross-sectional views of a CVT button block assembly, according to some embodiments. A button block assembly 1102 can include body 1702, securing pin aperture 1706 and buttons 3604. The body 1702 can be manufactured of aluminum, for example. The buttons 3604 can be made of engineered plastic, such as VESPEL that provides durability and low friction. A torque pin aperture 3608 runs transversely to aperture 1706 for securing the torque pin 420.

FIGS. 37A-E illustrate perspective and cross-sectional views of a CVT roller assembly, according to some embodiments. The roller assembly 404 can include flanged or cylindrical bearing caps 3704.

FIGS. 38A-H illustrate perspective and cross-sectional views of a CVT button block assembly with dampers, according to some embodiments. In some embodiments, the button block assembly 1102 further includes dampers 3800. In some applications the dampers 3800 can be utilized to reduce vibrational noise from an output shaft. The dampers 3800 can be positioned within caps 3604, such as by pressing. The dampers 3800 can be replaced and can be manufactured of an engineered plastic. The material can also include a controlled dampening coefficient.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A drive pulley for a continuously variable transmission comprising:
 a stationary sheave, including a stationary shaft;
 a movable sheave axially movable relative to the stationary sheave and in contact with the stationary shaft;
 a spider in contact with at least the movable sheave and the stationary shaft;
 a spring member, biasing the movable sheave axially away from the stationary sheave;
 at least one centrifugal actuator including an arm pivotally connected to one of the movable sheave and the spider; and
 a torque transfer assembly operatively connected to at least one of the spider and the movable sheave, the torque transfer assembly including:
  a button block assembly including a body, one or more buttons, and a damper, and
  a torque pin connected to the spider,
 wherein the body of the button block assembly is removably securable to the spider via the torque pin, and wherein the one or more buttons and the damper are removable from the body of the button block assembly.

2. The drive pulley of claim 1, wherein the button block assembly is positioned on the torque pin, the torque pin extending through the body of the button block assembly.

3. The drive pulley of claim 2, wherein the torque pin defines a longitudinal axis pointing at the stationary shaft.

4. The drive pulley of claim 1, wherein the damper is configured to reduce vibrational noise from an output shaft, whereby the damper is manufactured of a material including a controlled dampening coefficient.

5. The drive pulley of claim 1, wherein the one or more buttons may include a recess to at least partially receive the damper.

6. The drive pulley of claim 1, wherein the torque transfer assembly includes a securing pin and a securing pin aperture extending through the torque pin, wherein the securing pin is inserted through the securing pin aperture to secure the torque pin to the body of the button block assembly.

7. The drive pulley of claim 1, wherein the body of the button block assembly includes a torque pin aperture, the torque pin aperture configured to receive the torque pin therethrough.

8. The drive pulley of claim 1, wherein the one or more buttons and the damper are configured to move along a longitudinal axis of the body of the button block assembly.

9. The drive pulley of claim 1, wherein the arm is configured to pivot away from the one of the movable sheave and the spider as a speed of rotation of the drive pulley increases, wherein the arm pushes against another one of the movable sheave and the spider as the arm pivots away from the one of the movable sheave and the spider thereby moving the movable sheave axially toward the stationary sheave, wherein the at least one centrifugal actuator being disposed radially outward of the stationary shaft.

10. A drive pulley for a continuously variable transmission, comprising:
   a stationary sheave, including a stationary shaft;
   a movable sheave axially movable relative to the stationary sheave and in contact with the stationary shaft;
   a spider in contact with at least the movable sheave and the stationary shaft;
   a spring member, biasing the movable sheave axially away from the stationary sheave;
   at least one centrifugal actuator including an arm pivotally connected to one of the movable sheave and the spider; and
   a torque transfer assembly disposed on the spider, the torque transfer assembly including:
      a torque pin removably securable to the spider, the torque pin defining a longitudinal axis, and
      a button block assembly having a body and one or more buttons,
   wherein the one or more buttons is configured to slidably engage with an engagement surface of the movable sheave, and wherein the longitudinal axis defined by the torque is oriented non-orthogonal to the engagement surface.

11. The drive pulley of claim 10, wherein the torque pin is at least partially received within the spider, wherein a removable securing pin secures the torque pin to the spider.

12. The drive pulley of claim 11, wherein the body of the button block assembly includes a torque pin aperture configured to receive the torque pin.

13. The drive pulley of claim 12, wherein the torque pin aperture extends through the body of the button block assembly, the torque pin aperture oriented to point toward the stationary shaft.

14. The drive pulley of claim 10, wherein the longitudinal axis of the torque pin is pointed at the stationary shaft.

15. The drive pulley of claim 10, wherein the one or more buttons is configured to slidably engage with a tower of the movable sheave.

* * * * *